(12) United States Patent
Clegg et al.

(10) Patent No.: US 7,849,142 B2
(45) Date of Patent: Dec. 7, 2010

(54) MANAGING CONNECTIONS, MESSAGES, AND DIRECTORY HARVEST ATTACKS AT A SERVER

(75) Inventors: Paul J. Clegg, Pacifica, CA (US); Eric C. Huss, San Francisco, CA (US); Craig Sprosts, San Francisco, CA (US); Krishna Srinivasan, San Bruno, CA (US); Peter Schlampp, San Francisco, CA (US); Shun Chen, Union City, CA (US); Robert Brahms, San Ramon, CA (US); Daniel Quinlan, San Bruno, CA (US)

(73) Assignee: Ironport Systems, Inc., San Bruno, CA (US)

( * ) Notice: Subject to any disclaimer, the term of this patent is extended or adjusted under 35 U.S.C. 154(b) by 1068 days.

(21) Appl. No.: 11/139,114

(22) Filed: May 27, 2005

(65) Prior Publication Data

US 2006/0031359 A1    Feb. 9, 2006

Related U.S. Application Data

(60) Provisional application No. 60/575,658, filed on May 29, 2004.

(51) Int. Cl.
*G06F 15/16* (2006.01)
(52) U.S. Cl. .................................. 709/206; 709/207
(58) Field of Classification Search .................. 709/206
See application file for complete search history.

(56) References Cited

U.S. PATENT DOCUMENTS 5,319,776 A    6/1994   Hile et al.
5,623,600 A    4/1997   Ji et al.

(Continued)

FOREIGN PATENT DOCUMENTS

WO    WO 01/67330 A1    9/2001

(Continued)

OTHER PUBLICATIONS

R. Hinden, ed., Applicability Statement for the Implementation of Classless Inter-Domain Routing (CIDR), RFC 1517, Sep. 1993.*

(Continued)

*Primary Examiner*—Saleh Najjar
*Assistant Examiner*—Robert Shaw
(74) *Attorney, Agent, or Firm*—Hickman Palermo Truong & Becker LLP

(57) ABSTRACT

A method and apparatus for managing connections, email messages, and directory harvest attacks at a server is disclosed. The server maintains a count of a parameter and compares the count to a specified maximum value, such that when the specified maximum value is met or exceeded, an action is taken by the server to limit the connections, email messages, or directory harvest attack. Actions include controlling the number of connections to the server from senders, controlling the flow of email messages injected to the server by senders, and controlling when rejection response messages are sent for invalid recipient email addresses to thwart a directory harvest attack. Senders are identified by one or more sender identifiers, which can be used to group senders together so that the same maximum value is applied collectively to all senders in the group.

46 Claims, 7 Drawing Sheets

U.S. PATENT DOCUMENTS

| | | | |
|---|---|---|---|
| 5,802,178 A | 9/1998 | Holden et al. | |
| 5,805,810 A | 9/1998 | Maxwell | |
| 5,828,881 A | 10/1998 | Wang | |
| 5,832,208 A | 11/1998 | Chen et al. | |
| 5,889,943 A | 3/1999 | Ji et al. | |
| 5,915,087 A | 6/1999 | Hammond et al. | |
| 5,933,416 A | 8/1999 | Schenkel et al. | |
| 5,958,005 A | 9/1999 | Thorne et al. | |
| 5,966,685 A | 10/1999 | Flanagan et al. | |
| 5,968,176 A | 10/1999 | Nessett et al. | |
| 5,983,270 A | 11/1999 | Abraham et al. | |
| 5,983,350 A | 11/1999 | Minear et al. | |
| 5,999,967 A | 12/1999 | Sundsted | |
| 6,003,084 A | 12/1999 | Green et al. | |
| 6,052,709 A | 4/2000 | Paul | |
| 6,072,942 A | 6/2000 | Stockwell et al. | |
| 6,073,142 A | 6/2000 | Geiger et al. | |
| 6,073,154 A | 6/2000 | Narasimhan et al. | |
| 6,073,165 A | 6/2000 | Narasimhan et al. | |
| 6,119,236 A | 9/2000 | Shipley | |
| 6,131,110 A | 10/2000 | Bates et al. | |
| 6,161,130 A | 12/2000 | Horvitz et al. | |
| 6,192,114 B1 | 2/2001 | Council | |
| 6,195,587 B1 | 2/2001 | Hruska et al. | |
| 6,212,558 B1 | 4/2001 | Antur et al. | |
| 6,226,670 B1 | 5/2001 | Ueno et al. | |
| 6,233,618 B1 | 5/2001 | Shannon | |
| 6,266,664 B1 | 7/2001 | Russell-Falla et al. | |
| 6,266,692 B1 | 7/2001 | Greenstein | |
| 6,289,105 B1 | 9/2001 | Murota | |
| 6,321,264 B1 | 11/2001 | Fletcher et al. | |
| 6,330,590 B1 | 12/2001 | Cotton | |
| 6,341,309 B1 | 1/2002 | Vaid et al. | |
| 6,393,568 B1 | 5/2002 | Ranger et al. | |
| 6,408,336 B1 | 6/2002 | Schneider et al. | |
| 6,415,313 B1 | 7/2002 | Yamada et al. | |
| 6,421,709 B1 | 7/2002 | McCormick et al. | |
| 6,434,600 B2 | 8/2002 | Waite et al. | |
| 6,453,327 B1 * | 9/2002 | Nielsen | 715/205 |
| 6,460,050 B1 | 10/2002 | Pace et al. | |
| 6,484,203 B1 | 11/2002 | Porras et al. | |
| 6,484,261 B1 | 11/2002 | Wiegel | |
| 6,499,081 B1 * | 12/2002 | Nataraj et al. | 711/108 |
| 6,502,131 B1 | 12/2002 | Vaid et al. | |
| 6,507,866 B1 | 1/2003 | Barchi | |
| 6,539,430 B1 | 3/2003 | Humes | |
| 6,546,416 B1 | 4/2003 | Kirsch | |
| 6,587,550 B2 | 7/2003 | Council et al. | |
| 6,591,291 B1 | 7/2003 | Gabber et al. | |
| 6,609,196 B1 | 8/2003 | Dickinson, III et al. | |
| 6,650,890 B1 * | 11/2003 | Irlam et al. | 455/412.1 |
| 6,654,787 B1 | 11/2003 | Aronson et al. | |
| 6,675,162 B1 | 1/2004 | Russell-Falla et al. | |
| 6,687,732 B1 * | 2/2004 | Bector et al. | 709/200 |
| 6,708,205 B2 | 3/2004 | Sheldon et al. | |
| 6,732,157 B1 | 5/2004 | Gordon et al. | |
| 6,748,422 B2 | 6/2004 | Morin et al. | |
| 6,785,712 B1 | 8/2004 | Hogan et al. | |
| 6,785,732 B1 | 8/2004 | Bates et al. | |
| 6,802,012 B1 | 10/2004 | Smithson et al. | |
| 6,886,099 B1 | 4/2005 | Smithson et al. | |
| 6,894,981 B1 | 5/2005 | Coile et al. | |
| 6,941,348 B2 * | 9/2005 | Petry et al. | 709/206 |
| 7,023,852 B1 * | 4/2006 | Mar et al. | 370/392 |
| 7,024,431 B1 | 4/2006 | Kornelson et al. | |
| 7,054,907 B1 * | 5/2006 | Sherwood | 709/206 |
| 7,072,942 B1 * | 7/2006 | Maller | 709/206 |
| 7,093,018 B1 * | 8/2006 | Sievers et al. | 709/227 |
| 7,149,778 B1 | 12/2006 | Patel et al. | |
| 7,171,450 B2 | 1/2007 | Wallace et al. | |
| 7,181,498 B2 | 2/2007 | Zhu et al. | |
| 7,184,971 B1 | 2/2007 | Ferber | |
| 7,206,814 B2 | 4/2007 | Kirsch | |
| 7,272,853 B2 | 9/2007 | Goodman et al. | |
| 7,331,061 B1 | 2/2008 | Ramsey et al. | |
| 7,366,761 B2 | 4/2008 | Murray et al. | |
| 7,406,503 B1 * | 7/2008 | Little et al. | 709/206 |
| 7,409,708 B2 | 8/2008 | Goodman et al. | |
| 7,475,118 B2 | 1/2009 | Leiba et al. | |
| 7,490,128 B1 * | 2/2009 | White et al. | 709/206 |
| 7,523,168 B2 | 4/2009 | Chadwick et al. | |
| 7,543,052 B1 | 6/2009 | Cesa Klein | |
| 7,577,736 B1 | 8/2009 | Ovenden | |
| 7,627,670 B2 | 12/2009 | Haverkos | |
| 7,647,411 B1 * | 1/2010 | Schiavone et al. | 709/229 |
| 7,716,351 B1 * | 5/2010 | White et al. | 709/229 |
| 2001/0005885 A1 | 6/2001 | Elgamal et al. | |
| 2001/0039593 A1 | 11/2001 | Hariu | |
| 2002/0004908 A1 * | 1/2002 | Galea | 713/200 |
| 2002/0016824 A1 | 2/2002 | Leeds | |
| 2002/0023135 A1 | 2/2002 | Shuster | |
| 2002/0026487 A1 * | 2/2002 | Ogilvie et al. | 709/206 |
| 2002/0040394 A1 * | 4/2002 | Shapira | 709/224 |
| 2002/0059385 A1 | 5/2002 | Lin | |
| 2002/0059418 A1 | 5/2002 | Bird et al. | |
| 2002/0116463 A1 | 8/2002 | Hart | |
| 2002/0120600 A1 * | 8/2002 | Schiavone et al. | 707/1 |
| 2002/0133469 A1 | 9/2002 | Patton | |
| 2002/0165902 A1 | 11/2002 | Robb et al. | |
| 2002/0169954 A1 * | 11/2002 | Bandini et al. | 713/153 |
| 2002/0184315 A1 | 12/2002 | Earnest | |
| 2002/0184533 A1 | 12/2002 | Fox | |
| 2002/0198950 A1 | 12/2002 | Leeds | |
| 2002/0199095 A1 | 12/2002 | Bandini et al. | |
| 2003/0014490 A1 | 1/2003 | Bates et al. | |
| 2003/0050988 A1 * | 3/2003 | Kucherawy | 709/207 |
| 2003/0055908 A1 * | 3/2003 | Brown et al. | 709/207 |
| 2003/0069933 A1 * | 4/2003 | Lim et al. | 709/206 |
| 2003/0069935 A1 | 4/2003 | Hasegawa | |
| 2003/0079142 A1 | 4/2003 | Margalit et al. | |
| 2003/0093689 A1 | 5/2003 | Elzam et al. | |
| 2003/0097591 A1 | 5/2003 | Pham et al. | |
| 2003/0110224 A1 | 6/2003 | Cazier et al. | |
| 2003/0115485 A1 | 6/2003 | Milliken | |
| 2003/0131063 A1 * | 7/2003 | Breck | 709/206 |
| 2003/0149726 A1 * | 8/2003 | Spear | 709/206 |
| 2003/0158905 A1 * | 8/2003 | Petry et al. | 709/206 |
| 2003/0167402 A1 | 9/2003 | Stolfo et al. | |
| 2003/0172050 A1 | 9/2003 | Decime et al. | |
| 2003/0172291 A1 | 9/2003 | Judge et al. | |
| 2003/0191969 A1 * | 10/2003 | Katsikas | 713/201 |
| 2003/0212791 A1 | 11/2003 | Pickup | |
| 2003/0225850 A1 | 12/2003 | Teague | |
| 2003/0233418 A1 | 12/2003 | Goldman | |
| 2004/0003255 A1 | 1/2004 | Apvrille et al. | |
| 2004/0019651 A1 | 1/2004 | Andaker | |
| 2004/0024632 A1 | 2/2004 | Perry | |
| 2004/0054742 A1 | 3/2004 | Gruper et al. | |
| 2004/0054917 A1 | 3/2004 | Obrecht et al. | |
| 2004/0058673 A1 | 3/2004 | Irlam et al. | |
| 2004/0064371 A1 | 4/2004 | Crapo | |
| 2004/0068542 A1 * | 4/2004 | Lalonde et al. | 709/206 |
| 2004/0073617 A1 | 4/2004 | Milliken et al. | |
| 2004/0083230 A1 | 4/2004 | Caughey | |
| 2004/0093384 A1 | 5/2004 | Shipp | |
| 2004/0111381 A1 | 6/2004 | Messer et al. | |
| 2004/0117648 A1 * | 6/2004 | Kissel | 713/200 |
| 2004/0139165 A1 | 7/2004 | McMillan et al. | |
| 2004/0148493 A1 | 7/2004 | Chu et al. | |
| 2004/0167964 A1 | 8/2004 | Rounthwaite et al. | |
| 2004/0167968 A1 | 8/2004 | Wilson et al. | |
| 2004/0177120 A1 * | 9/2004 | Kirsch | 709/206 |
| 2004/0181581 A1 | 9/2004 | Kosco | |
| 2004/0186891 A1 | 9/2004 | Panec et al. | |

| | | | |
|---|---|---|---|
| 2004/0199592 | A1 | 10/2004 | Gould et al. |
| 2004/0199627 | A1* | 10/2004 | Frietsch .................. 709/224 |
| 2004/0210422 | A1 | 10/2004 | Takahashi et al. |
| 2004/0215977 | A1 | 10/2004 | Goodman et al. |
| 2004/0221016 | A1* | 11/2004 | Hatch et al. ................ 709/207 |
| 2004/0250127 | A1* | 12/2004 | Scoredos et al. ............ 713/201 |
| 2004/0250134 | A1 | 12/2004 | Kohler et al. |
| 2004/0254990 | A1 | 12/2004 | Mittal |
| 2004/0260922 | A1 | 12/2004 | Goodman et al. |
| 2005/0005107 | A1 | 1/2005 | Touboul |
| 2005/0015456 | A1* | 1/2005 | Martinson .................. 709/207 |
| 2005/0060295 | A1 | 3/2005 | Gould et al. |
| 2005/0060643 | A1 | 3/2005 | Glass et al. |
| 2005/0064850 | A1 | 3/2005 | Irlam et al. |
| 2005/0071485 | A1 | 3/2005 | Ramagopal |
| 2005/0080855 | A1 | 4/2005 | Murray |
| 2005/0080856 | A1* | 4/2005 | Kirsch ........................ 709/206 |
| 2005/0080857 | A1 | 4/2005 | Kirsch et al. |
| 2005/0091319 | A1 | 4/2005 | Kirsch |
| 2005/0108518 | A1 | 5/2005 | Pandya |
| 2005/0182959 | A1 | 8/2005 | Petry et al. |
| 2005/0193429 | A1 | 9/2005 | Demopoulos et al. |
| 2005/0198518 | A1 | 9/2005 | Kogan et al. |
| 2005/0203994 | A1 | 9/2005 | Palmer et al. |
| 2005/0204005 | A1 | 9/2005 | Purcell et al. |
| 2005/0240617 | A1* | 10/2005 | Lund et al. ................. 707/102 |
| 2005/0246440 | A1 | 11/2005 | Yu |
| 2005/0265319 | A1 | 12/2005 | Clegg et al. |
| 2005/0283837 | A1 | 12/2005 | Olivier et al. |
| 2006/0031306 | A1 | 2/2006 | Haverkos |
| 2006/0095410 | A1 | 5/2006 | Ostrover et al. |
| 2006/0161988 | A1 | 7/2006 | Costea et al. |
| 2006/0168006 | A1 | 7/2006 | Shannon et al. |
| 2008/0104186 | A1 | 5/2008 | Wieneke et al. |
| 2008/0104187 | A1 | 5/2008 | Wilson et al. |
| 2008/0256072 | A1 | 10/2008 | Logan et al. |
| 2008/0270540 | A1 | 10/2008 | Larsen |
| 2009/0019126 | A1 | 1/2009 | Adkins |

FOREIGN PATENT DOCUMENTS

| | | |
|---|---|---|
| WO | WO/ 02/19069 A2 | 3/2002 |
| WO | WO 02/25464 A1 | 3/2002 |
| WO | WO 02/39356 A1 | 5/2002 |
| WO | WO 02/019069 A | 7/2002 |

OTHER PUBLICATIONS

Y. Rekhter & T. Li, eds. , An Architecture for IP Address Allocation with CIDR, RFC 1518, Sep. 1993.*
R. Malhotra, IP Routing, O'Reilly Media, Inc., Jan. 24, 2002, ISBN-13: 978-0-596-00275-6, Chapter 7.*
Microsoft Computer Dictionary, Fifth Edition ( May, 2002) ISBN-10:0-7356-1495-4 ISBN-13: 978-0-7356-1495-6.*
R. Hinden, ed., Applicability Statement for the Implementation of Classless Inter-Domain Routing (CIDR) , RFC 1517, Sep. 1993.*
Y. Rekhter & T. Li, eds. , An Architecture for IP Address Allocation with CIDR, RFC 1518, Sep. 1993.*
NISSC Technical Note Feb. 2004, Spam Mitigation Techniques, Feb. 27, 2004.*
Evan Harris, The Next Step in the Spam Control War: Greylisting Aug. 21, 2003 http://web.archive.org/web/20031008063916/projects.puremagic.com/greylisting/.*
Kephart, Jeffrey O., et al., "Biologically Inspired Defenses Against Computer Viruses", International Joint Conference on Artificial Intelligence, 1995, 12 pages.
European Patent Office, "Communication pursuant to Article 96 (2) EPC", European application No. 05 723 433.8-1244, received Aug. 22, 2007, 5 page.
Claims, European application No. 05 723 433.8-1244, 13 pages.
Klensin, J., "Simple mail Transfer Protocol," Network Working Group, RFC 2821, dated Apr. 2001, 79 pages.
International Searching Authority, "Notification of Transmittal of the International Search Report and the Written Opinion of the International Searching Authority, or the Declaration," PCT/US05/18999, Feb. 6, 2007, 8 pages.
Current Claims, PCT/US05/18999, 14 pages.
International Searching Authority, "Notification Transmittal of the International Search Report and the Written Opinion of the International Searching Authority, or the Declaration," PCT/US05/19143, Dated Apr. 7, 2006, 8 pages.
Current Claims, PCT/US05/19143, 24 pages.
The American Heritage® Dictionary of the English Language—definition "aggregate" Feb. 2010 (2 pages).
Wong, J. 1998. Preventing Spams and Relays. Linux J. 1998, 56es (Dec. 1998), 10.
Wong, J., "Preventing Spams and Relays", Linux J, Dec. 1998, 10 pages.
Ironport Messaging Gateway Appliances: http://web.archive.org/web/2000421095627/http://ironport.com/ http://web.archive.org/web/20030405102438/www.senderbase.com/ http://web.archive.org/web/20030724022036/www.ironport.com/pdf/ironport_c60_brochure.pdf (17 pages).
R. Hiden, et al., "Applicability Statement for the Implementation of Classless Inter-Domain Routing (CIDR)", RFC 1517, Sep. 1993.
Y. Rekhter & T. Li, eds., "An Architecture for IP Address Allocation with CIDR," RFC 1518, Sep. 1993.
Harris, E., "GreyListing Whitepaper" (2003) http://projects.puremagic.com/greylisting/whitepaper.html (20 pages).
CAPSA- Packet. Inspector: http://web.archive.org/web20030118183455, http://www.javvin.com/packet.html, http://web.archive.org/web/20030416233408/, http://javvin.com/packet.html, 10 pages.
Microsoft Computer Dictionary, Fifth Edition (May 2002) ISBN-10: 0-7356-1495-4 ISBN-13: 978-0-7356-1495-6 (5 pages).
Wong, "Preventing Spams and Relays", Linux, 1998, Dec. 1998, 7 pages.
Spam Assassin, retrieved from http://web.archive.org, retrieved Dec. 2008, 60 pages.
Ironport, "Messaging Gateway Appliances", http://web.archive.org, Dec. 2008, 14 pages.
Microsoft, "Microsoft Computer Dictionary", Fifth Edition, May 2002, 7 pages.
Smith, Roderick, W., "Advanced Linux Networking", Addison Wesley Professional, Jun. 2002, 62 pages.
Mertz, David, "Spam Filtering Techniques", Aug. 2002, 8 pages.
International Searching Authority, "Notification of transmittal of the international search report and the written opinion of the written opinion of the international searching authority, or the declaration," International Application No. PCT/US05/19037, dated Oct. 24, 2005, 10 pages.
Current claims, PCT/US05/19037, 12 pages.
International Searching Authority, "Notification of Transmittal of the International Search Report and the Written Opinion of the International Searching Authority, or the Declaration," PCT/US04/00969, Aug. 18, 2004, 10 pages. (Reference on CD-ROM).
Current Claims in PCT patent application, International Application No. PCT/US03/37417, 16 pages. (Reference on CD-ROM).
Current Claims in International Application, application No. PCT/US04/00969, 19 pages. (Reference on CD-ROM).
International Searching Authority, "Notification of Transmittal of the International Search Report or the Declaration," PCT/US03/37417, Jun. 8, 2004, 7 pages. (Reference on CD-ROM).
Declude, "List of All Known DNS-based Spam Databases," Apr. 20, 2004, http://www.declude.com/Articles.asp?ID=97, data retrieved Jun. 27, 2005, pp. 1-21. (Reference on CD-ROM).
Dwork, Cynthia, et al., "Pricing via Processing or Combatting Junk Mail," Draft of full version, preliminary version of this paper was presented at Crypto '92, pp. 1-11. (Reference on CD-ROM).
eSOFT.COM, "InstaGate EX2-the Firewall with a Future," eSoft Incorporated, 2001, 9 pages. (Reference on CD-ROM).
"eTrust Secure Content Manager," Computer Associates International Inc., 2003, pp. 1-7. (Reference on CD-ROM).
"Fighting Fire with Fire," Computer Reseller News, n757, pp. 143-152, Oct. 6, 1997, 14 pages. (Reference on CD-ROM).

"F-Secure Internet Gatekeeper," F-Secure Data Sheet, F-Secure Corporation, 2 pages. (Reference on CD-ROM).

Google Groups, "MIME mail bombs," Message 1 thread from Selden E. Ball Jr., dated Feb. 28, 1995, 3 pages. (Reference on CD-ROM).

Kent, Stephen T., "Internet Privacy Enhanced Email," Communications of the ACM, vol. 36, No. 8, Aug. 1993, pp. 48-60. (Reference on CD-ROM).

MIMEsweeper 2.0 Press Release, "Integralis releases MIMEsweeper Version 2.0 with SMTP mail security support," [online], Jan. 15, 1996, [retrieved on Jun. 8, 2004]Retrieved from the internet: http://webarchive.org/web/19961112103826/www.nha.com/rel20.htm (Reference on CD-ROM).

"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm (Reference on CD-ROM).

Olawsky, Duane et al., "Developing and Using a 'Policy Neutral' Access Control Policy," Secure Computing Corporation, Dec. 2, 1996, pp. 60-67.

Oppliger, Rolf, "Internet Security; Firewalls and Bey," Communication of the ACM, vol. 40, No. 5, May 1997, pp. 92-102. (Reference on CD-ROM).

Weisband, Suzanne P. et al., "Managing User Perceptions of Email Privacy," Communications of the ACM, vol. 38, No. 12, Dec. 1995, pp. 40-47. (Reference on CD-ROM).

International Searching Authority, "Notification of transmittal of the international search report and the written opinion of the international searching authority, or the declaration," international application No. PCT/US2005/005498, dated May 12, 2005, 12 pages. (Reference on CD-ROM).

Current Claims, PCT/US2005/005498, 14 pages. (Reference on CD-ROM).

International Searching Authority, "Notification of transmittal of the international search report and the written opinion of the international searching authority, or the declaration," International Application No. PCT/US05/18569, dated Oct. 17, 2005, 10 pages.

Current claims, PCT/US05/18569, 7 pages.

BrightMail, "Anti-Spam 4.0" Data Sheet (2002), 2 pages.

BrightMail, "Anti-Virus 4.0", Data Sheet (2002), 2 pages.

Wong, J. 1998, Preventing Spams and Relays, Linux J. 1998, 56es (Dec. 1998), 10.

* cited by examiner

MANAGING CONNECTIONS, MESSAGES, AND DIRECTORY HARVEST ATTACKS AT A SERVER

PRIORITY CLAIM AND RELATED APPLICATION

This application claims domestic priority under 35 U.S.C. §119(e) from prior U.S. provisional application Ser. No. 60/575,658, entitled "PROVIDING TEMPORARY ACCESS TO A NETWORK DEVICE, USING DESTINATION DOMAIN-BASED BOUNCE PROFILES, MONITORING THE FLOW OF MESSAGES FROM SENDERS, AND CONTROLLING THE FLOW OF MESSGES FROM SENDERS," filed May 29, 2004, naming Paul J. Clegg, Charlie S. Slater, R. Brian Harrison, Lonhyn Jasinskyj, Ben Cottrell, Eric Huss, Craig Sprosts, Krishna Srinivasan, Peter Schlampp, Shun Chen, Robert Brahms, Daniel Quinlan, and Brennan H. Evans as inventors, the entire disclosure of which is hereby incorporated by reference for all purposes as if fully set forth herein.

This application is related to: (1) co-pending non-provisional application Ser. No. 11/139,090, filed concurrently with the present application, entitled "MONITORING THE FLOW OF MESSAGES RECEIVED AT A SERVER," naming Charlie S. Slater, Paul J. Clegg, Brennan H. Evans, and Peter Schlamp as inventors, and (2) co-pending non-provisional application Ser. No. 11/140,314, filed concurrently with the present application, entitled "MANAGING CONNECTIONS AND MESSAGES AT A SERVER BY ASSOCIATING DIFFERENT ACTIONS FOR BOTH DIFFERENT SENDERS AND DIFFERENT RECIPIENTS," naming Paul J. Clegg, Eric Huss, Craig Sprosts, Shun Chen, Robert Brahms, and Daniel Quinlan as inventors.

FIELD OF THE INVENTION

The present invention generally relates to processing electronic messages, and more specifically, to managing the number of connections for receiving messages at a server, managing the number of messages received at the server, and limiting directory harvest attacks against the server.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Mail transfer agents (MTA's) typically receive a large number of email messages from many different senders for delivery to many recipients. The number of email messages can range from hundreds of messages per hour to hundreds of thousands of messages per hour. Because of the increasing problems of the tremendous volume of unsolicited commercial email (i.e., spam) and from a significant percentage of email messages being infected with viruses, administrators of MTA's would like to be able to control the number of connections to the MTA's and to manage the delivery of the many email messages to in an easy and efficient manner as part of the efforts to deal with spam and virus infected email messages.

However, traditional approaches for managing the connections to an MTA from different senders treat each sender separately. For example, if the administrator of the MTA has observed that a particular Internet Protocol (IP) address has been sending a large amount of spam to the MTA, the administrator can configure the MTA to refuse to accept incoming connections from the particular IP address. Over time, the administrator will likely identify a large number of IP addresses that send spam to the MTA, and for each such IP address, the administrator must separately configure the MTA to reject the incoming connections from the offending IP addresses. The same situation can arise for email messages from particular IP addresses that are identified as being infected with a virus.

Due to the growing proliferation of spam and viruses, the administrator is faced with the dilemma of either constantly monitoring the flow of email messages for spam and virus infected email messages and continually reconfiguring the MTA to reject incoming connections from the offending IP addresses, or the administrator can limit the time spent in such efforts to dealing with just the biggest sources of such offending email messages while letting other smaller sources go unchecked.

Also, traditional approaches for controlling the flow of email messages from different senders through an MTA provide two options: allow everything from a sender or allow nothing from a sender. For example, the administrator of the MTA can create a "whitelist" of IP addresses from which email messages should never be rejected, and a "blacklist" of IP addresses from which email messages should never be accepted. Taken together, these types of lists can be termed an "all or nothing" approach.

However, a problem with the "all or nothing" approach is that both the whitelist and the blacklist are over inclusive. For example, if the administrator of the MTA adds a particular IP address to the whitelist, and then the server for that IP address is used by the owner of an email account on that server to send out thousands of spam email messages, that spam will always be allowed by the MTA, and the users served by that MTA will be inundated with the spam. Similarly, if the user blacklists a particular IP address, any bona fide users associated with that IP address that do not send spam would not be able to get any email messages through the MTA.

Another problem with traditional approaches for managing email messages at an MTA is in dealing with directory harvest attacks in which a sender, typically a spammer, floods the MTA with a large number of email messages addressed to many recipients. The recipient email addresses are from a large list of email addresses that typically include many common and randomly generated usernames. By flooding the MTA with the large number of email messages and keeping track of which recipient addresses are accepted by the MTA and which recipient addresses result in rejection of the email message by the MTA and usually a message rejection message (i.e., a "bounce" message) that tells the sender that the MTA rejected the email message, the spammer can effectively reconstruct a directory of valid recipient email addresses for the MTA. The reconstructed directory can then be used for subsequent spam campaigns or may even be used in a virus attack.

One traditional approach for dealing with directory harvest attacks is to configure the MTA to never generate a bounce message. As a result, the spammer may believe that all the recipient email addresses are valid and will include all such email addresses in the reconstructed directory. But the later use of that reconstructed directory will be very ineffective because the directory will typically contain many more invalid recipient email addresses than valid recipient email addresses. On the other hand, if the spammer notices that none of the attempted recipient addresses are generating any bounces, the spammer will know that the MTA has been configured to not generate bounce messages, and the spammer will not pursue the directory harvest attack further because the MTA is not allowing the spammer to determine which email addresses are valid and which are invalid.

One problem in configuring the MTA to not generate any bounce messages is that some email messages received by the MTA should generate a bounce message back to the sender to let the sender know that the email address is invalid. For example, if a bona fide sender simply mistypes an email address or uses an email address that in the past was valid but currently is not valid (e.g., the email address is for an ex-employee), the administrator of the MTA would generally want the sender of such email messages to know that they used an invalid email address so that the sender can try again or make other efforts to determine what the problem is with the invalid email address. If the MTA does not generate a bounce message, then bona fide senders that make simple typographical mistakes in addressing email messages will never know of the invalid email addresses and thus will be led to incorrectly believe that the email messages were delivered to the intended recipients. This could be particularly problematic if the sender is a customer of the company served by the MTA.

Another problem with configuring the MTA to not generate any bounce messages is that the administrator of the MTA has no way of knowing whether a directory harvest attack has occurred. For example, if the administrator learns that a spammer is conducting a directory harvest attack, and then the administrator reconfigures the MTA to stop generating bounce messages, the administrator has no way of knowing when the spammer gives up the attack, so that the administrator can turn the bounce messages back on. If the administrator turns the bounce messages back on while the attack is still underway, the spammer will be able to identify more valid email addresses. However, if the administrator waits for a while to turn the bounce messages back on, or in the extreme case never turns the bounce messages back on, then the administrator will never know when the directory harvest attack ends, nor would the administrator be aware of any subsequent directory harvest attacks that the administrator would usually want to be made aware.

Based on the foregoing, it is desirable to provide improved techniques for managing the flow of email messages to an MTA that can enable the administrator of the MTA to more efficiently and effectively deal with different senders of undesired email messages. Furthermore, there is a need for approaches for controlling the number of connections to an MTA, for controlling the flow of email messages through the MTA, and for dealing with directory harvest attacks.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Figure 1:
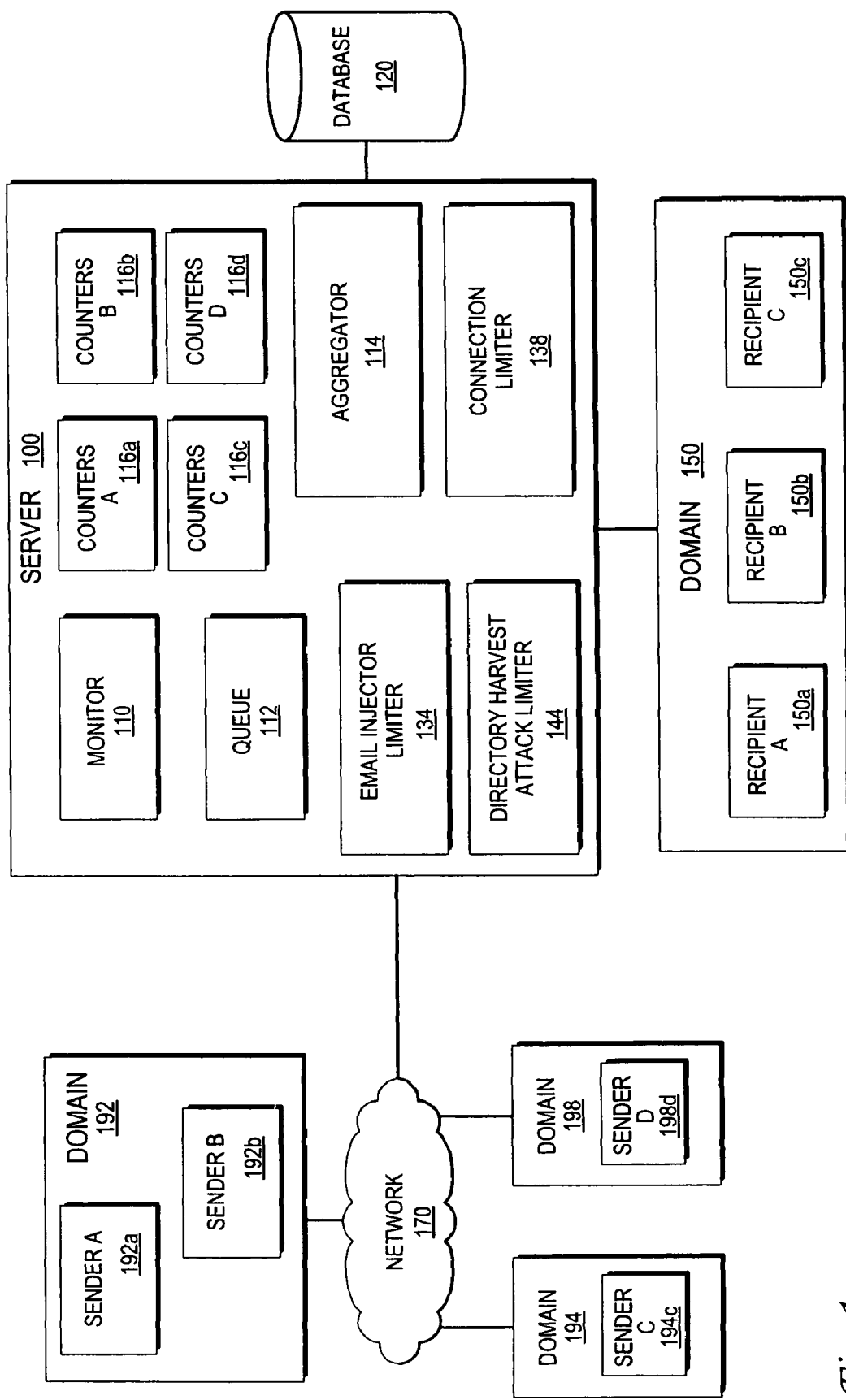
FIG. 1 is a block diagram that depicts a high level overview of a system for managing connections, email messages, and directory harvest attacks, according to an embodiment.

A method and apparatus for managing connections, email messages, and directory harvest attacks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. STRUCTURAL AND FUNCTIONAL OVERVIEW
   A. Introduction
   B. Structural Overview of Managing Connections, Email Messages, and Directory Harvest Attacks
   C. Functional Overview of Managing Connections, Email Messages, and Directory Harvest Attacks
   D. Sender Identifiers and Sender Identifier Groups
II. CONTROLLING THE CONNECTIONS TO A SERVER FROM DIFFERENT SENDERS
   A. Introduction to Controlling Connections
   B. Controlling the Connections to a Server by Sender Identifier
   C. Using the Host Access Table (HAT) for Controlling Connections
III. CONTROLLING EMAIL MESSAGES AT A SERVER FROM DIFFERENT SENDERS
   A. Introduction to Controlling Email Messages
   B. Controlling the Injection of Email Messages by Sender Identifier
   C. Using the Host Access Table (HAT) for Controlling Mail Injection
IV. LIMITING DIRECTORY HARVEST ATTACKS
   A. Introduction to Limiting Directory Harvest Attacks
   B. Limiting Directory Harvest Attacks by Tracking Invalid Recipient Email Addresses
   C. Using the Recipient Access Table (RAT) for Limiting Directory Harvest Attacks
   D. Command Line Interface for Limiting Directory Harvest Attacks
V. IMPLEMENTATION MECHANISMS AND EXAMPLES
   A. Aggregated Time-Based Counters
   B. Connection Attributes
   C. Graphical User Interface for Managing Connections, Email Messages, and Directory Harvest Attacks
   D. Example HAT
   E. Example RAT
   F. Additional Parameters for Use in the HAT and RAT G. Collecting and Aggregating Message Information
H. Managing Information Relating to Electronic Messages
I. Determining a Reputation Score for a Sender
J. Logging the Entire Byte Stream of SMTP Conversations VI. HARDWARE OVERVIEW
  A. General Hardware Overview
  B. Hardware Examples
VII. EXTENSIONS AND ALTERNATIVES

I. STRUCTURAL AND FUNCTIONAL OVERVIEW

A. Introduction

Techniques are provided for managing connections, email messages, and directory harvest attacks at a server, such as an MTA, by maintaining a count of a relevant parameter and comparing that count to a specified maximum value, such that when the specified maximum value is met or exceeded, one or more actions are taken by the server to control the connections, email messages, or directory harvest attack. Such actions can include, but are not limited to, limiting the number of connections to the server from one or more senders, limiting the number of email recipients or email messages injected to the server by one or more senders, and limiting when rejection response messages (e.g., "bounce" messages) are sent for invalid recipient email addresses.

B. Structural Overview of Managing Connections, Email Messages, and Directory Harvest Attacks FIG. 1 is a block diagram that depicts a high level overview of a system for managing connections, email messages, and directory harvest attacks, according to an embodiment. For simplicity, FIG. 1 only depicts a limited number of senders of email messages and recipients of those email messages, although in practice any number of senders and recipients can accommodated by the approaches described herein.

FIG. 1 depicts a server 100 that is communicatively coupled to a network 170 that is also communicatively coupled to domains 192, 194, 198. For example, server 100 can be implemented as an MTA connected to the Internet to which a number of domains are also connected. For simplicity, FIG. 1 depicts only three domains, but in practice there can be any number of domains communicatively coupled to network 170.

As shown in FIG. 1, domain 192 includes a sender A 192a and a sender B 192b, domain 194 includes sender C 194c, and domain 198 includes sender D 198d. However, in practice each domain can include any number of senders.

Server 100 is communicatively coupled to a database 120 that can be used to store information generated as part of a mail flow monitoring process. Finally, server 100 is communicatively coupled to a domain 150 that includes recipients 150a-150c that are identified as a recipient A 150a, a recipient B 150b, and a recipient C 150c.

Server 100 includes a monitor 110, a queue 112, an aggregator 114, and a set of counters 116a-116d that are identified as counters A 116a, counters B 116b, counters C 116c, and counters D 116d. Server 100 also includes an email injector limiter 134, a connection limiter 138, and a directory harvest attack limiter 144.

Monitor 110 determines connection information for incoming connections to server 100 and message information for email messages received by server 100 from the senders of the email messages.

The connection information and message information is stored in queue 112 that can be subsequently processed by aggregator 114 to aggregate the connection information for connections to server 100 from different senders and to aggregate the message information for message information for the email messages from different senders for the recipients serviced by server 100. After the message information for an email message is stored in queue 112, the processing of the email message is performed, which can include application of recipient access table (RAT) that can associate different actions to be taken with respect to email messages for different recipients. Depending on the actions from the RAT, the email message may or may not be delivered to the intended recipient in domain 150, such as recipient A 150a, recipient B 150b, or recipient C 150c.

By having monitor 110 store the message information in queue 112 for subsequent processing by aggregator 114, the impact of the monitoring process on the handling of incoming connections and the subsequent flow and processing of email messages by server 100 is minimized. The analysis of the information stored in queue 112 by aggregator 114 may lag the receipt of email messages by server 100 by a relatively short time, such as a few seconds or a couple of minutes, so that the aggregate information produced by aggregator 114 is generated substantially in real time with the receipt of email messages by server 100.

As a specific example, server 100 can create a "mailFlowHost" object for each IP address and store the objects in an in-memory dictionary, which is represented by queue 112 in FIG. 1. The key to the dictionary is a tuple containing the remote IP address, local IP address, remote port, and local port. For a current time period, such as the current minute, each mailFlowHost object records message information in 10 second intervals. An in-memory dictionary, referred to as the "current dictionary," stores the information for the current interval. At the end of each 10 second interval, the "old" dictionaries are stored in an interval table, which are represented in FIG. 1 by counters A 116a, counters B 116b, counters C 116c, and counters D 116d.

As message information is obtained from the incoming email messages, monitor 110 gets the mailFlowHost object for the current interval from the current dictionary until the current time minute is over, after which monitor 110 creates new mailFlowHost objects for the next minute, with the current dictionary being used for the current 10 second interval of the next minute in the same fashion. Data from the dictionaries corresponding to old minutes are aggregated and written to disk, such as database 120, and from there the minute data is rolled up into longer time periods, such as hours and days.

The mail flow monitoring approach described herein can track one or more statistics for each sender, such as the number of messages received by server 100 from the sender, the number of recipients for which email messages are received from the sender, the amount of information (e.g., the number of kB) received from the sender, and the number of connections received from the sender. The mail flow monitoring approach described herein can also track the later application of one or more policies to the email messages from the sender, such as how many are blacklisted, whitelisted, or greylisted, or the percentage of messages received from the sender in a particular time period that are determined to be spam or that fail a virus check.

At the end of periodic intervals, such as at the end of every minute, the information in counters A 116a, counters B 116b, counters C 116c, and counters D 116d are stored by aggregator 114 in database 120. Then counters A 116a, counters B 116b, counters C 116c, and counters D 116d can be reset to zero or replaced with new sets of counters to count for the next time interval, such as the next minute.

Although not shown in FIG. 1, a graph module can be included in server 100. The graph module accesses the data for a set of time intervals that is stored in database 120 and generates one or more graphs or plots to be presented through a display that is communicatively coupled to server 100 so that a user, such as the email administrator for server 100, can review and analyze the data and then specify actions, as appropriate, for the handling of future email messages from a particular sender. For example, a GUI can include on the display a graph of the number of recipients injected to server 100 over the last hour from a particular sender, such as a specified IP address. The GUI can include a button to allow an administrator of server 100 to ad the specified IP address to a blacklist, such that when the administrator clicks on the "blacklist" button, the IP address is included in a rule in a mapping (e.g., a host access table) so that the specified IP address to a "blacklist" variable in the mapping that is defined elsewhere in the mapping to correspond to a reject action. As a result, future email messages from the specified IP address will be rejected.

Data stored in database 120 can also be aggregated in any of a number of ways. For example, the data in database 120 can be aggregated over longer time periods, such as by each hour for a day, and presented to the administrator by the graph module through the display. Data stored in database 120 can also be aggregated for multiple senders, such as by combining data for sender A 192a and sender B 192b, and then displaying the compiled data on all email received from domain 192 to an administrator of server 100 through a display.

Connection limiter 138 is used to manage the connections to server 100 from different senders or hosts, such as the MTA's for domains 192, 194, 198. For example, connection limiter 138 can access database 120 to determine the current number of connections to server 100 from domain 192. Connection limiter 138 can compare the current number of connections to a specified maximum number of connections for domain 192. When an incoming connection from domain 192 is received by server 100, if the current number of connections is already equal to the specified maximum number of connections for domain 192, server 100 rejects the incoming connection from domain 192. When subsequent incoming connections are received by server 100 from domain 192, if the number of connections from domain 192 has fallen to less than the specified maximum number of connections for domain 192, the incoming connections would not be rejected for exceeding the specified maximum.

Email injector limiter 134 is used to manage the email messages from different senders or hosts, such as the MTA's for domains 1942 194, 198. For example, email injector limiter 134 can access database 120 to determine the current number of recipients that have been injected to server 100 from domain 194 in the current hour. Email injector limiter 134 can compare the current number of injected recipients to a specified maximum number of injected recipients for domain 194. When an email message is received from domain 194 by server 100, if the current number of injected recipients is already equal to the specified maximum number of injected recipients for domain 194, server 100 rejects the email message from domain 194 for a recipient of domain 150. Typically, the number of injected recipients is counted and tracked for each hour for domain 194, so that every hour the current count of injected recipients for domain 194 is reset to zero, thereby allowing email messages received thereafter to not be limited until the current number of injected recipients once again reaches the specified maximum number of injected recipients for domain 194.

Directory harvest attack limiter 144 is used to manage directory harvest attacks from different senders or hosts, such as the MTA's for domains 194, 196, 198. For example, directory harvest attack limiter 144 can access database 120 to determine the current number of invalid recipient email addresses that have been received by server 100 from domain 198 in the current hour. Directory harvest attack limiter 144 can compare the current number of invalid recipient email addresses to a specified maximum number of invalid recipient email addresses for domain 198. When an email message is received by server 100 from domain 194 that includes an invalid recipient address, if the current number of invalid recipient email addresses is already equal to the specified maximum number of invalid recipient email addresses for domain 198, directory harvest attack limiter 144 directs server 100 no longer sends a rejection response message (e.g., a bounce message) back to the MTA for domain 198 that the recipient email address is invalid. Typically, the number of invalid recipient email addresses is counted and tracked for each hour for domain 198, so that every hour the current count of invalid recipient email addresses for domain 198 is reset to zero, thereby allowing server 100 to send a rejection response message back to the MTA for domain 198 for invalid recipient email addresses until the current number of invalid recipient email addresses once again reaches the specified maximum number of invalid recipient email, address for domain 198.

Although not illustrated in FIG. 1, server 100 can also include a host access table (HAT) that includes a set of rules for associating different senders to actions. The rules can also associate one or more parameters with each rule, such as to specify a maximum number of connections for a sender, the maximum number of recipients injected to server 100 per hour for a sender, and the maximum number of invalid recipient addresses per hour for a sender. Thus, the HAT can be used to implement one or more of email injector limiter 134, connection limiter 138, and directory harvest attack limiter 144 by setting an appropriate limit and having server 100 compare the appropriate limit to a matching type of current measurement to determine whether mail injection for the sender is to be limited or controlled.

Server 100 can include other modules, components, and functions than those described with respect to FIG. 1 herein. For example, server 100 can include a spam policy module and a virus policy module for applying spam and virus policies, respectively. Also, the individual components of server 100 as depicted in FIG. 1 can be combined with each other, such as by combining monitor 110 and aggregator 114, or the individual components can be implemented as several different components, such as by implementing aggregator 114 as a time aggregator for aggregating message information over time and a sender aggregator for aggregating message information for two or more senders.

Figure 2:
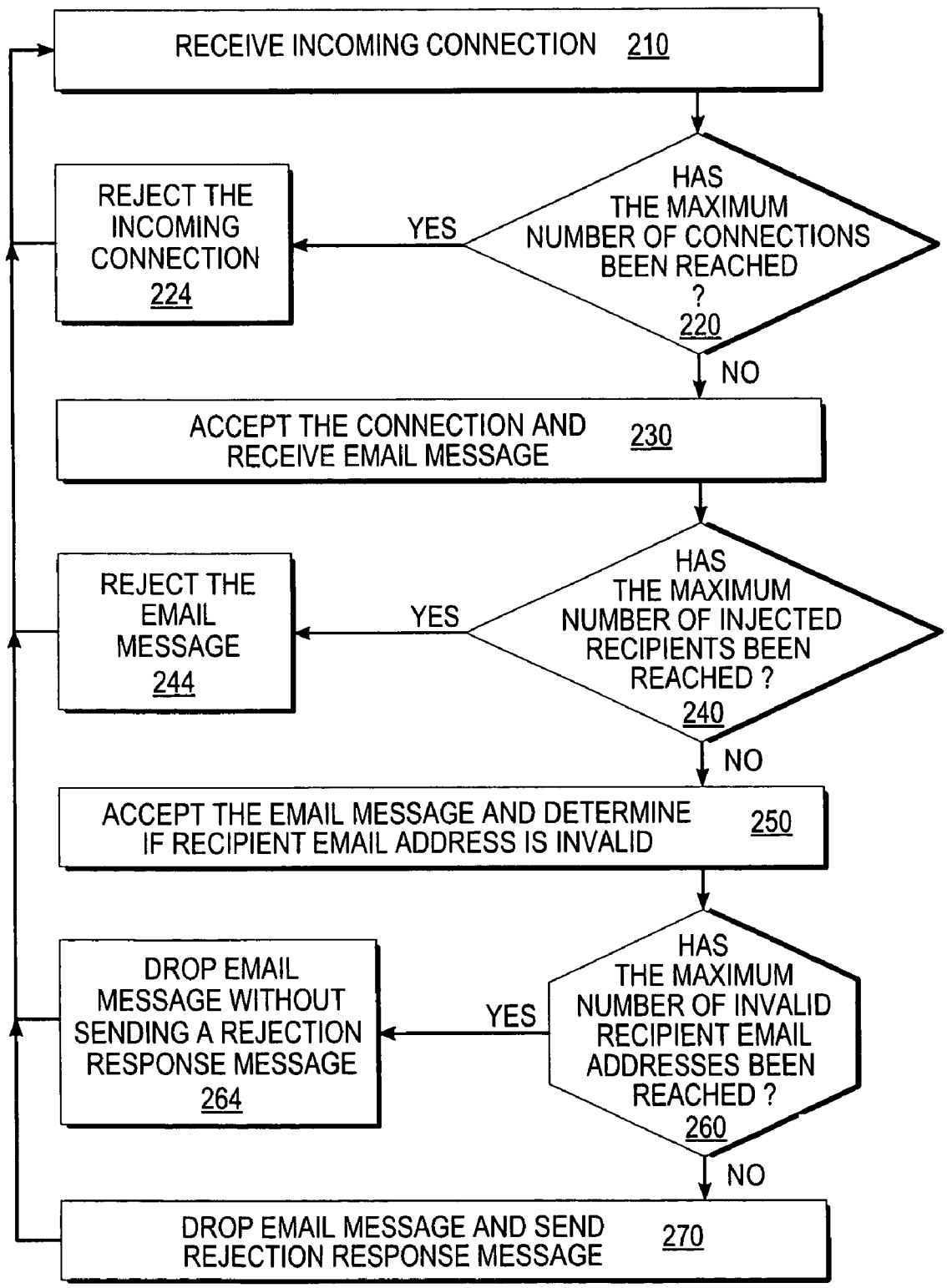
FIG. 2 is a flow diagram that depicts an approach for managing connections, email messages, and directory harvest attacks, according to an embodiment.

C. Functional Overview of Managing Connections, Email Messages, and Directory Harvest Attacks FIG. 2 is a flow diagram that depicts an approach for managing connections, email messages, and directory harvest attacks, according to an embodiment. For explanation purposes, FIG. 2 is described with reference to the system overview of FIG. 1, although the approach of FIG. 2 is not limited to the particular system depicted in FIG. 1. Also, FIG. 2 is described with reference to handling incoming connections and email messages at an MTA, although any type of electronic message and any server can be used with the approach depicted in FIG. 2. In addition, FIG. 2 is described with reference to connection limiter 138, email injector limiter 134, and directory harvest attack limiter 144, although other mechanisms for managing connections, electronic messages, and directory harvest attacks, such as the HAT, can be used. Finally, FIG. 2 is described for one incoming connection, one email message, and one recipient of the email message that is assumed to be invalid, although any number of incoming connections, email messages, recipients per email message, invalid recipient email addresses, and valid recipient email addresses can be accommodated by the approaches described with reference to FIG. 2.

In block 210, the MTA receives an incoming connection from a sender. For example, server 100 receives an incoming connection from sender A 192a of domain 192 via network 170.

In block 220, the MTA determines whether the maximum number of connections has been reached. For example, connection limiter 138 of server 100 can access database 120 to retrieve the current number of connections from domain 192 and then compare the retrieved value to a maximum number of connections that has been specified for senders associated with domain 192.

Note that in this example the maximum value is for all senders associated with domain 192, so that even if sender A 192a has no connections to server 100 but sender B 192b has the maximum allowed number of connections, the incoming connection from sender A 192a is still rejected since all senders for domain 192 are grouped together for purposes of applying the specified maximum number of allowed connections for domain 192. However, in other examples, each sender can have a specified maximum number of connections, or many senders can be grouped together for purposes of applying a specified maximum number of connections.

If the maximum number of connections has not been reached, the process continues to block 230. However, if the maximum number of connections has been reached, the process continues to block 224, where the MTA rejects the incoming connection. For example, server 100 can send a "connection rejected" message to the MTA for domain 192, and server 100 can include a brief message as to why the incoming connection was rejected, such as "Maximum number of connections exceeded." From block 224, the process returns to block 210 to process the next incoming connection.

In block 230, the MTA accepts the connection and receives an email message over the connection. For example, server 100 can accept the incoming connection from domain 192 and send a "connection accepted" message to the MTA for domain 192. For this example, after server 100 accepts the connections from the MTA for domain 192, the MTA for domain 192 sends an email message with one recipient email address associated with domain 150 to server 100.

In block 240, the MTA determines whether the maximum number of injected recipients has been reached. For example, email injector limiter 134 of server 100 can access database 120 to retrieve the current number of injected recipients from domain 192 in the current hour and then compare the retrieved value to a maximum number of injected recipients per hour that has been specified for senders associated with domain 192.

Note that in this example the maximum value is for all senders associated with domain 192, so that even if sender A 192a has not injected email messages to server 100 but sender B 192b has already injected the maximum allowed number of recipients this hour, the email message from sender A 192a is still rejected since all senders for domain 192 are grouped together for purposes of applying the specified maximum number of injected recipients for senders associated with domain 192. In other examples, each sender can have a specified maximum number of injected recipients per hour, or many senders can be grouped together for purposes of applying a specified maximum number of injected recipients per hour.

If the maximum number of injected recipients has not been reached, the process continues to block 250. However, if the maximum number of injected recipients has been reached, the process continues to block 244, where the MTA rejects the email message for the intended recipient. For example, server 100 can send a "message rejected" message to the MTA for domain 192, and server 100 can include a brief message as to why the email message was rejected, such as "Maximum number of recipients this hour exceeded." From block 244, the process returns to block 210 to process the next incoming connection.

Note that the number of injected recipients per hour is just one example of a quantity that can be used to control the flow of email messages to an MTA. As another example, the MTA can track the number of email messages injected to the MTA instead of the number of injected recipients (which typically is equal to or greater than the number of injected messages since each message has one or more designated recipients). The number of injected email messages can be compared to a specified maximum to determine whether to accept additional email messages for the particular sender. Yet another example is to track the total size of email messages injected for the sender per hour and compare that current value to a specified maximum for the sender.

In block 250, the MTA accepts the email message and determines if the recipient email address is invalid. For example, server 100 can accept the email message from sender A 192a and send a "message accepted" response to the MTA for domain 192. Then directory harvest attack limiter 144 of server 100 determines whether the recipient email address is invalid. For purposes of explanation of FIG. 2, assume that there is only one recipient email address and that the recipient email address is invalid (e.g., that the recipient email address is for a recipient D of domain 150 but that there is no such valid email address in domain 150). Note that if the recipient email address were valid, the email message would be processed for delivery to the designated email address, although whether the message is actually delivered to the valid email address can depend on other factors, such as the result of applying a spam policy, a virus policy, a content policy, or any other appropriate policy or other process for analyzing the email message, any of which may result in a determination that the email message is not to be delivered.

In block 260, the MTA determines whether the maximum number of invalid recipient email addresses has been reached. For example, directory harvest attack limiter 144 of server 100 can access database 120 to retrieve the current number of invalid recipient email addresses from domain 192 for the current hour and then compare the retrieved value to a maximum number of invalid recipient email addresses per hour that has been specified for senders associated with domain 192.

Note that in this example the maximum value is for all senders associated with domain 192, so that even if sender A 192a has not sent any email messages with invalid recipient email addresses to server 100 but sender B 192b has the sent the email messages that have reached the maximum allowed number of invalid recipient email address this hour, the email message with the invalid recipient email address from sender A 192a is still rejected since all senders for domain 192 are grouped together for purposes of applying the specified maximum number of invalid recipient email addresses for domain 192. In other examples, each sender can have a specified maximum number of invalid recipient email addresses, or many senders can be grouped together for purposes of applying a specified maximum number of invalid recipient email addresses.

If the maximum number of invalid recipient email addresses has not been reached, the process continues to block 270. However, if the maximum number of invalid recipient email addresses has been reached, the process continues to block 264, where the MTA drops the email message without sending a rejection response message (e.g., a "bounce" message) to sender A 192*a*.

For example, if server 100 has detected a directory harvest attack, as indicated by the maximum number of invalid recipient email addresses being reached, server 100 does not bounce any more messages, thereby preventing the originator of the directory harvest attack from being able to determine which recipient email addresses are invalid. From block 264, the process returns to block 210 to process the next incoming connection.

In block 270, the MTA drops the email message and sends a rejection response message. For example, server 100 drops the email message from sender A 192*a* but sends the MTA for domain 192 a rejection response message (e.g., a "bounce" message) that indicates that the recipient email address is invalid.

For example, if server 100 has not detected a directory harvest attack, as indicated by the maximum number of invalid recipient email addresses not being reached, server 100 bounces messages with invalid recipient email addresses so that the senders can be informed that the recipient email addresses are invalid. This allows the senders of the email messages to check the recipient email address for errors, such as a typographical mistake in the username, which the sender can correct and then resend the email message.

From block 270, the process returns to block 210 to process the next incoming connection, although if additional email recipients or email messages were present, such email messages and email recipients would be processed as described above in block 230 or block 250, respectively.

D. Sender Identifiers and Sender Identifier Groups

The approaches described herein for managing connections, email messages, and directory harvest attacks can be applied based on a sender identifier, which is an attribute that is associated with one or more senders. One or more actions, such as limiting the number of connections, limiting the rate of injection of recipients, and limiting directory harvest attacks, can be associated with a sender identifier, such as through a rule in a host access table (HAT) that maps sender identifiers to actions. As a specific example, each rule in the HAT can include one or more parameters, such as a maximum number of connections, a maximum number of injected recipients per hour, and a maximum number of invalid recipients, so that the specified maximums are applied to connections, email messages, and invalid :recipients for any senders that match the particular sender identifier for the HAT rule.

Any of a number of attributes can be used as a sender identifier, including but not limited to, one or more of the following: a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier (e.g., a SenderBase organization ID), a network owner, a reputation score, and a second range of reputation scores.

The flexibility in specifying the sender identifier allows the user to aggregate information in virtually any manner that the user desires for purposes of controlling the mail flow. For example, the user can list a single IP address on the left side of the HAT, and that single IP address gets up to the specified maximum number of recipients per time period for purposes of mail flow injection control. As another example, the user can specify a /24 CIDR block on the left side of the HAT, and then that group of IP addresses (up to 256 addresses) as a whole share the specified maximum number of recipients per time period. Thus, if just one of the addresses for the /24 CIDR block exceeds the limit, then neither that address nor any others in the /24 CIDR block can send messages for the rest of the time period, until the counter is reset (e.g., typically every hour).

As yet another example, a domain that is known to generate a lot of spam can be listed on the left side of the HAT and have a very low maximum number of recipients per time period threshold limit specified, thereby effectively preventing spam from that domain.

As yet another example, the mail flow monitor can help the user identify a spike in messages from a particular IP address, and the user can use a GUI button that is part of the mail flow monitor to add that IP address to the HAT and associate that added IP address with a policy that limits the number of recipients per time period to the user's desired level, or the user can even specify that the IP address should be blacklisted so that no messages are allowed from the IP address.

The mail flow monitor can track and record the number of recipients that are being rejected due to the maximum number of recipients per time period being exceeded by IP address or another sender identifier. As a result, the user can determine if a partner company or some other domain that the user wants to receive email messages from has been inadvertently limited in terms of the injection rate so that the partner company or domain can be whitelisted so that the email messages are no longer throttled or limited based on the HAT.

In some implementations, the SenderBase service is used to provide for more complex mail injection control. For example, the HAT can include a "use_sb" option (e.g., whether to use SenderBase) so that instead of using the left side of the rule in the HAT to match on, a new counter is determined based on the SenderBase information and matches are made on the SenderBase derived counter. As a specific example, SenderBase can provide information about who the organization is for an IP address, along with the SenderBase organization ID for the IP address and a specific CIDR block size (e.g., /24 is a typical value and may be used as the default value). As a result, the user can rely on SenderBase to categorize the information for the IP address and control mail flow based on the SenderBase derived counter.

As an example, consider the case in which SenderBase indicates that the company associated with a particular IP address owns the domain 1.2.x.y and all IP addresses below that, and that the company sells off those IP addresses to other companies in /28 CIDR blocks. The system can then distinguish between different /28 CIDR blocks that originate from the company, and thus for a particular IP address, the system can determine to which CIDR block the IP address belongs. As a result, the system can lump together all IP addresses for the CIDR block together and subject them to the same maximum recipient per time period limit. This allows the user to treat the IP addresses for one owner of a particular CIDR block acquired from the company separately from the other IP addresses of the company or from other CIDR blocks that the company sold. This can be beneficial when the company has sold some CIDR blocks to spammers, which the user wants to severely limit, and other CIDR blocks to more reputable organizations that the user does not wish to limit as harshly.

As yet another example, the user can rely on the SenderBase organization ID to control mail injection, thereby allowing the user to aggregate a number of disparate IP addresses that are associated with a single organization or company. For example, a particular organization may have two different subnets, and the user can establish a rule in the HAT that each subnet has a separate counter for determining the maximum number of recipients per time period. However, this requires that the user manage each subnet separately. Instead, the user can use the SenderBase organization ID, which is the same for each subnet, and have a single rule in the HAT based on the organization's SenderBase organization ID, and then a single counter and a single rule can be used to limit the recipients injected from both of the organization's subnets.

As another example, a company can have a large number of customers with IP addresses that are wildly disparate. However, because SenderBase associates the same organization ID for the company, regardless of which customers have which IP addresses, the user can have one entry in the HAT that indicates the company's SenderBase: organization ID, and all the IP addresses for that company's customers are subject to the same counter for purposes of determining the maximum number of messages per time period or the maximum number of connections at a given time, or even for counting the number of invalid email recipient addresses for purposes of detecting and preventing a directory harvest attack.

The SenderBase information can be obtained by the system for each request for a connection to the system, with SenderBase returning the available information for the queried IP address. As an alternative, the user can cache the SenderBase data to improve performance.

As yet another example, the user can use a reputation score from SenderBase instead of an IP address or other more common sender identifier. For example, upon receipt of a request for a connection, the system can query SenderBase and obtain the reputation score corresponding to the IP address. The score can be compared to a range specified by the user (e.g., is the score between −10 and −5, thus indicating a low reputation on the −10 to +10 reputation score scale). In such a situation, the action to take can be to blacklist the IP address, so that no further messages are accepted. This approach allows the user to rely on SenderBase and the reputation scores to determine how to control mail flow, such as in this example to blacklist likely spammers and other less than reputable IP addresses.

As yet another example, a HAT entry can be based on a remote blacklist function. As a specific example, the system can be configured to take the IP address of an incoming connection, reverse the numbers (e.g., an IP address of 1.2.3.4 becomes 4.3.2.1) and append the name of a query DNS server. If the DNS server sends a response back for the effective machine represented by the reversed IP address, that indicates that the DNS server has a record of the reversed IP address in the DNS server's database. Because such databases are typically full of less than reputable IP addresses, the HAT entry can specify that any such IP addresses be blacklisted. Similarly, a query can be sent to other servers, such as Bonded Sender that includes a list of reputable IP addresses, and any that are included in such a list can be specified in the HAT to be whitelisted.

The use of other server's databases that include blacklists, whitelists, or other maintained lists of IP addresses that are characterized in an organized manner allows the user of the MTA to write general rules in the HAT based on the results of queries to such databases, thereby minimizing the work of the user and relying on the ability of those other servers to characterize the plethora of IP addresses as either good or bad.

Examples of sender identifiers, which may also be referred to as "host specifications," are given below. Multiple identifiers can be used, as well as being grouped together.

```
n.n.n.n - IP address.
n.n.n. | n.n.n | n.n. | n.n | n. | n - partial IP addresses.
n.n.n.n-n | n.n.n-n. | n.n-n. | n-n. - range of IP addresses.
fqdn - fully qualified domain name.
.partialhost - everything with the partialhost domain.
n/c | n.n/c | n.n.n/c | n.n.n.n/c - CIDR address blocks.
sbo:<something> - SenderBase organization ID.
sbrs[n1:n2] - SenderBase reputation score
("x" matches if n1<= x < n2).
ALL - special keyword that matches ALL addresses (used as a
   catch-all for when no previous rule matches).
```

II. CONTROLLING THE CONNECTIONS TO A SERVER FROM DIFFERENT Senders

A. Introduction to Controlling Connections

Techniques are described for controlling the number of connections to a recipient domain or recipient host. For example, the system establishes a counter for the number of connections to a recipient host, such as an MTA, and when the number of connections exceeds a specified number, no further connections are allowed until the number of current connections drops below the specified number. As a specific example, a mail server may have a limit of 50 connections at any given time, so that when the $51^{st}$ connection is attempted, the mail server refuses to establish the connection with the sending host.

In some implementations, the number of allowed connections is counted based on one or more sender identifiers. For example, the number of connections from an IP address can be limited to a specified number, and the number of connections from another IP address can be limited to another specified number. In general, any type of sender identifier can be used, including but not limited to, one or more of the following: a network address, an IP address, a range of IP addresses, a list of IP addresses, a domain, a fully qualified domain name, a SenderBase organization ID, and a reputation score, such as a SenderBase reputation score.

In one embodiment, the maximum number of connections is specified by a parameter in the HAT. For example, a variable called "max_concurrency" is used to specify the number of connections for the associated sender identifier. In general, any type or combination of sender identifiers can be used on the left side of the HAT so that the system aggregates connections from all of the corresponding sender IP addresses and compares the aggregate number of connections to the specified maximum number of connections, and when the limit is exceeded, each connection is treated with the REJECT action.

In addition, in some implementations, one or more sender identifiers can be excluded from the counter that is compared to the maximum number of allowable connections. For example, the user can add an entry to the RAT to specify one or more IP addresses or other sender identifiers that are not to be counted against the maximum number of connections for the sender identifier that is specified in the HAT.

B. Controlling the Connections to a Server by Sender Identifier

Figure 3:
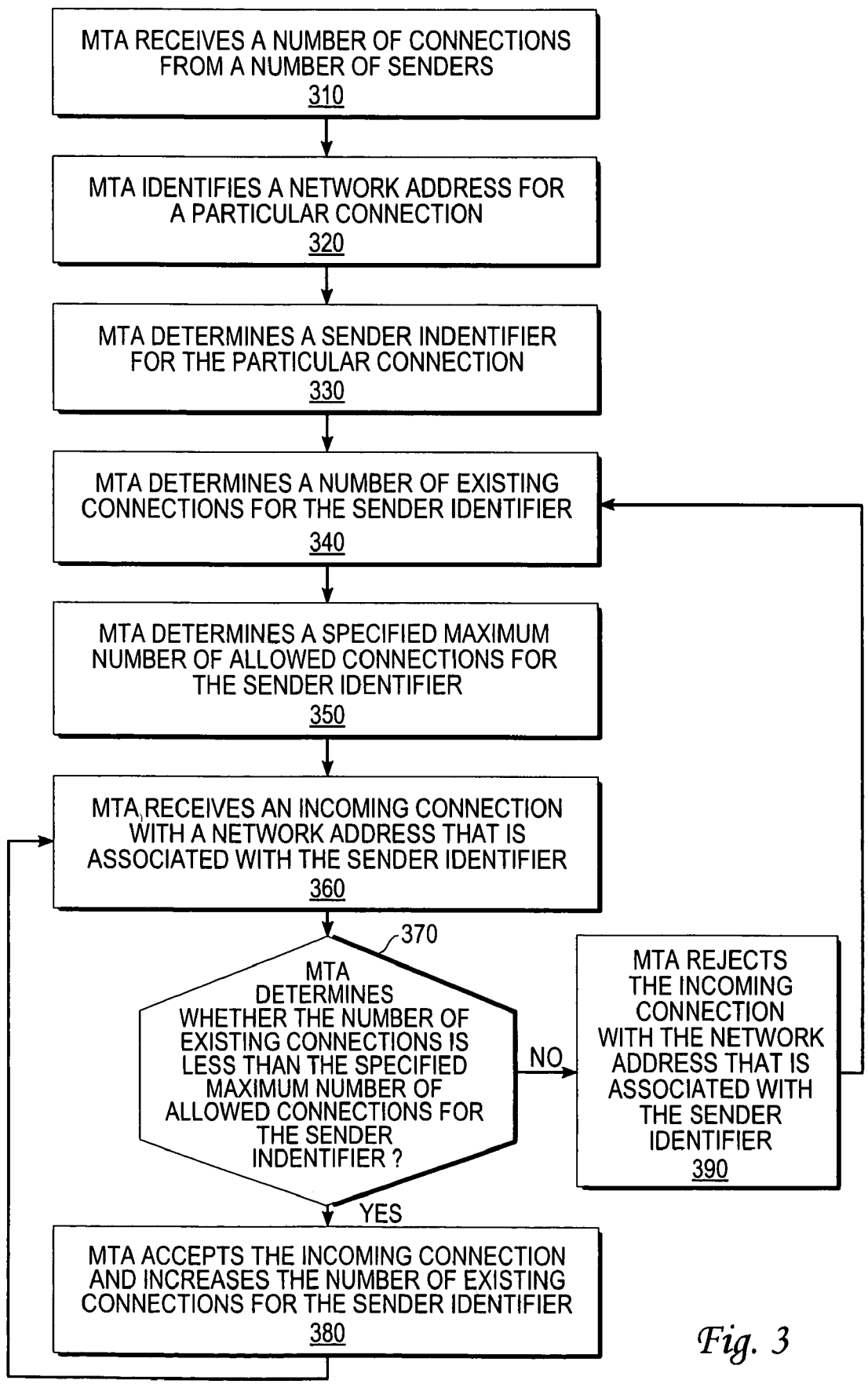
FIG. 3 is a flow diagram that depicts an approach for controlling the number of connections at a server from different senders, according to an embodiment.

FIG. 3 is a flow diagram that depicts an approach for controlling the number of connections at a server from different senders, according to an embodiment. For clarity, FIG. 3 is described with reference to one sender, one sender identifier, and one connection although any number of senders, sender identifiers, and connections can be accommodated by a particular implementation. Also, FIG. 3 is described with reference to one incoming connection from one sender, although any number of incoming connections from any number of senders can be used. Finally, FIG. 3 is described with reference to an MTA, although any server that handles incoming connections from any other servers can be used to implement the approaches described herein.

In block 310, the MTA receives a number of connections from a number of senders. For example, server 100 receives several connections from each of domains 192, 194, 198.

In block 320, the MTA identifies a network address for a particular connection. For example, server 100 the IP address for particular connection that is from domain 192 in the header information of the connection being used to transmit an email message from sender A 192*a* of domain 192 to recipient C 150*c* of domain 150. Although not illustrated in FIG. 3, the MTA can identify the IP address for any or all of the connections received in block 320

In block 330, the MTA determines a sender identifier for the particular connection. For example, server 100 can use the IP address as a sender identifier. As another example, server 100 can obtain the fully qualified domain name (FQDN) of the sender through a reverse domain name service (DNS) lookup with an existing DNS cache, and use the FQDN as a sender identifier. As yet another example, server 100 can submit a query to another server, such as a server that is part of the SenderBase service, to obtain the available information based on the IP address of the sender. Such information can include an organization name, an organization identifier, and a reputation score, and one or more of these types of information can be used as a sender identifier. For this example, the IP address of domain 192 is used as the sender identifier.

In block 340, the MTA determines a number of existing connections for the sender identifier. For example, server 100 can access database 120 to obtain a count of the current number of existing connections to server 100 that are associated with the IP address for domain 192. Although not illustrated in FIG. 3, the MTA can maintain a count of the number of existing connections to server 100 by any number of sender identifiers.

In block 350, the MTA determines a specified maximum number of allowed connections for the sender identifier. For example, server 100 can access database 120 that stores a maximum connection data for one or more sender identifiers, such as that the maximum number of connections for the IP address associated with domain 192 is 20. As another example, if server 100 includes a host access table (HAT), then server 100 can search the HAT based on the sender identifier being the IP address of domain 192 to identify a matching rule that specifies a maximum number of connections for the sender identifier. In general, any suitable approach for specifying the maximum number of connections can be used.

In block 360, the MTA receives an incoming connection with a network address that is associated with the sender identifier. For example, server 100 can receive an incoming connection from domain 192 that is trying to be established so that sender B 192*b* can send an email message to recipient A 150*a* of domain 150. As another example, if the sender identifier determined in block 330 were a SenderBase organization ID, then server 100 could use a SenderBase query based on the IP address of the incoming connection, and then if the information returned by the query included the same SenderBase organization ID, the incoming connection would be considered to be associated with the same sender identifier (e.g., the particular SenderBase organization ID).

In block 370, the MTA determines whether the number of existing connections is less than the specified number of allowed connections for the sender identifier. For example, server 100 compares the count of the current number of existing connections between the IP address for domain 192 and server 100, as determined in block 340, to the maximum number of allowed connections for domain 192, as determined in block 360.

If the number of existing connections is less than the specified number of allowed connections for the sender identifier, the process continues to block 380, and if not, the process continues to block 390. In this example, assumed that the number of existing connections was determined in block 320 to be 20. Because the existing number of connections is not less than the maximum number of connections (e.g., 20 as determined in block 360), the process continues to block 390. However, if the number of existing connections were only 15 and the maximum number of connections were 20, then the process would continue to block 380.

Note that the comparison of the current number of connections to the maximum number of connections can be implemented in any of a number of ways, not just that the current number of connections be less than the maximum number of connections. For example, block 370 can be implemented by determining whether the current number of connections for the sender identifier is equal to or greater than the maximum number of connections for the sender identifier. If so, the process continues to block 390, and if not, the process continues to block 380. In general, any value based on the number of existing connections for the sender identifier can be compared in any manner to a specified value for the sender identifier to determine whether or not the incoming connection should be accepted or rejected.

In block 380, because the maximum number of connections for the sender identifier has not been exceeded, the MTA accepts the incoming connection and increases the number of existing connections for the sender identifier. For example, server 100 accepts the incoming connection from domain 192, so that the email message from sender B 192*b* can be received and processed. Server 100 increases the count of the existing number of connections for the IP address for domain 192 by one (e.g., by updating an appropriate counter or by updating database 120, as appropriate), such that when the next incoming connection from the IP address for domain 192 is received, a similar check on the current number of existing connections can be made. Similarly, if any existing connections from the IP address for domain 192 are terminated, the count of the current number of connections is decreased. The tracking of the current number of connections by sender identifier can be performed by the mail flow monitoring techniques described further herein. When the incoming connection is accepted by the MTA, a suitable connection accepted message can be sent, such as a "accept connection" SMTP message from server 100 to the MTA for domain 192.

From block 380, the process returns to block 360 for the MTA to receive another incoming connection for the sender identifier. Note that if more sender identifiers were being used than the single sender identifier of this example, the process would return to block 320 or block 310.

In block 390, because the maximum number of connections for the sender identifier has been exceeded, the MTA rejects the incoming connection that has the network address associated with the sender identifier. For example, server 100 rejects an incoming connection from domain 192 when the number of current connections meets or exceeds the specified number of maximum connections for the IP address for domain 192. The MTA can send a suitable connection rejected message, such as a "reject connection" SMTP message from server 100 to the MTA for domain 192. The connection rejected message can include an explanation for the rejection, such as "Maximum number of connections exceeded."

From block 390, the process returns to block 340, where the MTA determines a number of existing connections for the sender identifier (e.g., to see if any of the current connections have been terminated so as to allow for a new incoming connection from domain 192 to be accepted). Alternatively, the process can return to block 320 or block 310.

Note that in this example, the sender identifier is the IP address for domain 192, so that if sender A 192a is responsible for 20 current connections to server 100 with a maximum number of connection of 20, then when sender B 192b attempts to send an email message to recipient A 150a, the incoming connection is rejected because the maximum number of connections is specified to be for the IP address of domain 192, which means that all senders within domain 192 essentially share the maximum number of connections that server 100 is permitting. Alternatively, server 100 could associate separate sender identifiers for sender A 192a and sender B 192b, so that each sender has a separate maximum number of connections that server 100 will allow. As yet another example, server 100 could lump all senders together, thereby specifying a maximum number of connections from all senders, such as any senders of domains 192, 194, 198, thereby liming the total number of connections to server 100 from all senders to the specified maximum number of senders.

C. Using the Host Access Table (HAT) for Controlling Connections

A host access table (HAT) as described herein is one example of a mapping of sender identifiers to actions that can include one or more parameters for use in controlling connections by an administrator of an MTA. However, any suitable mapping that associates one or more sender identifiers or sender identifier groups to one or more actions can be used in a particular implementation.

The following description of the HAT is just one example of how the HAT can be implemented, and the approaches described herein are not limited to this or any other particular implementation of the HAT in particular or of a mapping of sender identifiers to actions and associating parameters thereby in general.

In this example, a row in the HAT consists of four parts: (1) an entry name, referred to as a "label", (2) a host specification, referred to as "hosts", that can be implemented by listing one or more sender identifiers, sender identifier groups, or a combination thereof, (3) an access rule, referred to as "access" that specifies a particular action to be taken for the associated hosts, and (4) a parameter list, referred to as "params". These four items are defined as follows:

(1) "label" - a label is a name given to a HAT entry and in some implementations, obeys a naming convention such as that the label starts with a letter or underscore, but after the initial character, the label can include letters, numbers, underscores, or hyphens.
(2) "hosts" - a host specification, and can include more than one listed host.
(3) "access" - is the selected basic access rule (e.g., "ACCEPT", "RELAY", "REJECT", "TCPREFUSE", or "CONTINUE").
(4) "params" - a list of parameter name/value pairs.

In some implementations, the hosts are listed in order from top to bottom. When a search is made of the ordered list of rules from top to bottom, the first non-CONTINUE rule to match is used.

In most implementations, the following five actions are included in the HAT, although other implementations can include more actions, fewer actions, or different actions than those described below:

(1) ACCEPT - the connection is accepted, with injection limited by the recipient access table (RAT).
(2) RELAY - the connection is accepted, and injection to any recipient is allowed (the RAT is bypassed).
(3) REJECT - the connection is refused, with the sender getting a 4xx or 5xx SMTP message, but no messages are accepted (e.g., a polite refusal).
(4) TCPREFUSE - the connection is accepted but immediately dropped, so that the sender receives nothing in return (e.g., refused at the TCP level; a not so polite refusal).
(5) CONTINUE - the mapping is ignored, and processing of the HAT continues, and if the connection matches a later entry that is not "CONTINUE," that later matching entry is used instead.

One or more of the following parameters can be specified by host or sender identifier. In some implementations, the following parameters are allowed for the "ACCEPT" and "RELAY" actions, but not the other actions such as "REJECT" or "TCPREFUSE".

(1) max_concurrency - specifies the maximum number of connections allowed from the host.
(2) smtp_banner_text - specifies the SMTP banner displayed when a host first connects.
(3) smtp_banner_code - specifies the SMTP codes used in the SMTP banner.
(4) tls —specifies whether or not TLS (transport layer security) is to be used or required (allowed values include "on", "off", and "require").
(5) use_sb - specifies whether to query SenderBase for information and whether to use the SenderBase information to craft the name of the counter to be incremented (allowed values include "on" and "off").
(6) netmask - specifies the size of the mask to apply to the IP address to craft the name of the counter to increment; allowed values are numbers between 0 and 32; a value of 0 means that a single counter will result for all IP addresses that matched this or a similarly masked HAT entry.

Note that the parameter "tls" above is another example of a parameter that can be used to manage connections to a server. For example, even if the maximum number of current connections has not been reached, if the "tls" parameter is used to specify that TLS is required, and the incoming connection either cannot or will not use TLS, the incoming connection can be rejected.

III. CONTROLLING EMAIL MESSAGES AT A SERVER FROM DIFFERENT SENDERS

A. Introduction to Controlling Email Messages

The most basic approach to controlling the injection of mail to a system from a sender is to either allow all messages from the sender or to reject all messages from the sender. Such an "all or nothing" approach is simple and easy to implement, but it may not be appropriate in all situations, and thus, it is desirable to have the ability to define a "grey" area between allowing everything and allowing nothing such that some messages will always be allowed, but at a certain point, messages will be rejected or limited. Allowing some but not all messages may be referred to as injection control because the rate at which senders can send or "inject" email messages to an MTA is limited or controlled. Other equivalent terminology includes "throttling" the flow of messages because some but not all messages are allowed in a given time, and thus the overall rate at which email messages are being accepted by the MTA from the sender is being limited or throttled to a specified rate.

The ability to throttle mail injection, or to control the rate at which one or more senders can send messages to a recipient domain, can be useful for a number of reasons. For example, a high injection rate can be indicative of spam, which is generally undesirable. As a specific example, if a company with a mail gateway device that normally receives a few hundred email messages per hour suddenly begins to receive over a thousand message each hour from a particular IP domain, it is likely that the email messages are part of a spam campaign from the IP domain.

As another example, a large influx of otherwise desired messages over a short period of time can cause problems for the recipient domain, including crashing the recipient domains mail servers. As a specific example, if a large company works with an outside contractor to send press releases, copies of which are to be sent to all the employees of the large company, the mail servers at the large company could experience stability problems due to the large number of messages being sent in a short period of time. Since the large company wishes to have each employee receive the press release, but the large company also wants to avoid stability problems with its mail servers, the ability to control and limit the rate that the messages containing the press release are received can be beneficial.

The threshold point at which a sender, or a remote injector, of email messages is to be controlled depends on the particular implementation and can be configured by the user of the system, such as the administrator of an MTA, although a default value can also be used even if the user has not specified a value. For example, a sender injecting 200 messages/hour may be indicative of a spammer at a small company having only 50 employees, but for a large company with 10,000 employees, such an injection rate may be perfectly normal for mail from non-spam sources.

Once the threshold limit is reached on the rate that a sender is injecting messages, one of a number of approaches can be taken to limit the rate at which subsequent messages are injected. For example, the injection of the messages can be artificially slowed over each connection. However, a spammer can circumvent this approach by opening more connections, although as described herein, the number of connections can also be limited. As another example, the recipients can be rejected by the recipient domain, such as be sending a 452 SMTP error code that indicates that the sender has injected too many recipients. This allows the system to continue to count recipients, which can be done after the message is accepted but prior to forwarding the message to the recipient. As additional examples, TCP_REFUSE or accept_then_close can be used instead of sending a 4xx SMTP error code (e.g., a polite refusal, in contrast to the less polite TCP_REFUSE or accept_then_close approaches).

Mail injection can be controlled based on one or more rules, such as one or more entries in the host access table (HAT), which is described above. The HAT is used to associated sender identifiers with actions for managing connections to the server, and the HAT can be implemented as a list of rules that map the sender identifiers to the actions. The rules can also include parameters that can be used to control mail injection, as described further below.

As data is accumulated via the counters, that measured data is compared to the parameters in the HAT to determine if any actions are to be taken. It is possible that more than one action will apply to a particular situation. For example, a HAT entry may exist specifically for IP address 1.2.3.4, plus another entry for the CIDR block of 1.2.3/24, both of which would apply to a connection from IP address 1.2.3.4. As a result, the system determines which of the two entries to apply. In some implementations, the HAT is order specific such that the first entry in the HAT that matches to the connection is used. Thus, if the entry for CIDR block 1.2.3/24 is listed before the entry for IP address 1.2.3.4, the action for the entry for CIDR block 1.2.3/24 is used. In other implementations, each entry in the HAT includes a priority identifier, and the entry with the highest priority identifier is used.

Any of a number of attributes can be matched in the HAT, including but not limited to, one or more of the following: a network address, an IP address, an IP address range, a CIDR block, an exact FQDN match, a partial FQDN match, and a SenderBase organization ID. As a catch-all or default entry, a default value, such as "ALL," can be used for controlling the injection rate when no other HAT entry matches, and thus the "ALL" entry can catch senders that are otherwise unclassified (e.g., not matched by any other HAT entries).

For limiting injection and providing injection control, the HAT can include a parameter that specifies the maximum number of recipients in a particular time period, such as the maximum number of recipients per hour (e.g., max_rcpts_per hour). For example, once the specified limit is reached, the system does not accept any more recipients for the remainder of the time period (e.g., until the end of the hour for an hour-based counter). The HAT can also include a parameter (e.g., max_rcpts_per_hour_text) for the user to specify a custom SMTP response message to be used if a recipient is rejected due to such a rate limitation, as well as the SMTP code that should be returned (e.g., max_rcpts_per_hour_code for which the default can be set to SMTP code 452). The system can be configured to use a default text response if the user does not specify a custom response. For example, the default text response can be "Too many recipients injected this hour" for an hourly based injection rate counter/limitation.

In the situation in which the catch-all HAT entry "ALL" is used, and it is that entry that is matched on the counter that exceeds the specified limit, additional handling can be performed if the system is configured to work with SenderBase. For example, if SenderBase has supplied a Flow Control Coefficient, the rate limit specified for the "ALL" entry in the HAT can be multiplied by the coefficient prior to comparison to the counter. Thus, the coefficient is a positive floating point number that is greater than zero and can typically is less than or equal to one. However, it is possible that the coefficient could be greater than one, depending on the output from SenderBase and approach used to determine the coefficient.

Typically, the counter used for controlling mail injection is the rate at which recipients are accepted by the recipient host domain. A recipient is considered to be "accepted" if the recipient is not rejected due to rate limiting of the mail flow. As a result, if the recipient is rejected due to improper email address format or because the system is not supporting relaying, the counter is not incremented. However, in other implementations, the counter is incremented regardless of the reason for the recipient being rejected.

B. Controlling the Injection of Email Messages by Sender Identifier

Figure 4:
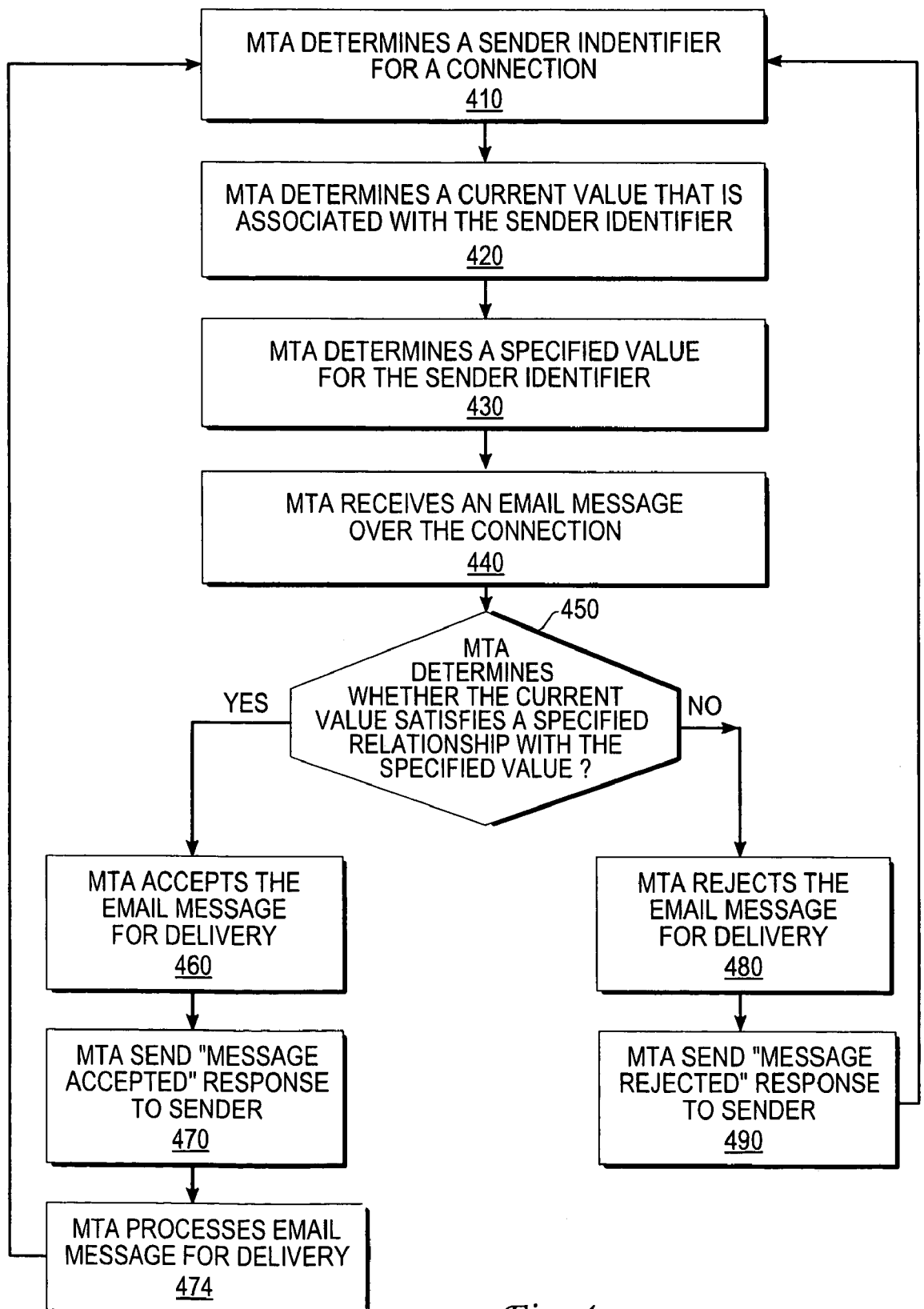
FIG. 4 is a flow diagram that depicts an approach for controlling the flow of email messages at a server from different senders, according to an embodiment.

FIG. 4 is a flow diagram that depicts an approach for controlling the flow of email messages at a server from different senders, according to an embodiment. For clarity, FIG. 4 is described with reference to one sender, one sender identifier, one connection, one email message, and one recipient of the email message, although any number of senders, sender identifiers, connections, email messages, and recipients per email message can be accommodated by a particular implementation. Finally, FIG. 4 is described with reference to an MTA, although any server that handles incoming connections from any other servers can be used to implement the approaches described herein.

In block 410, the MTA determines a sender identifier for a connection. For example, the sender identifier can be determined as in FIG. 3 as part of determining whether the connection should be established when server 100 receives an incoming connection from domain 192. Alternatively, if a sender identifier has not been previously determined for the connection, server 100 can determine an appropriate sender identifier as discussed above. As a specific example, assume that the connection from domain 192 was accepted according to FIG. 3 using the IP address for domain 192 as the sender identifier and that the connection is to be used for sending an email message from sender A 192a to recipient C 150c of domain 150.

In block 420, the MTA determines a current value that is associated with the sender identifier. For example, server 100 can access database 120 to obtain a count of the number of recipients injected by the IP address for domain 192 in the current hour. As another example, server 100 can obtain a count of the number of messages received in the current 10 minute period from the IP address for domain 192. Yet other examples include the total cumulative size of email messages received from the IP address for domain 192 for the current day. In general, any parameter or any parameter over any time period can be used.

In block 430, the MTA determines a specified value for the sender identifier. For example, server 100 can access database 120 that stores maximum values for one or more sender identifiers, such as that the maximum number of recipients per hour for the IP address of domain 192 is 100. As another example, if server 100 includes a HAT, then server 100 can search the HAT based on the sender identifier being the IP address for domain 192 to identify a matching rule that specifies a maximum number of injected recipients per hour. In general, any suitable approach for specifying the maximum value can be used.

In block 440, the MTA receives an email message over the connection. For example, server 100 receives the email message from sender A 192a for recipient C 150c.

In block 450, the MTA determines whether the current value satisfies a specified relationship with the specified value. For example, server 100 can compare the current number of rejected recipients from the IP address for domain 192 for the current hour and compare that current value to a specified maximum number of injected recipients per hour from a matching rule in the HAT. As a specific example, if the current number of injected recipients this hour is 100, the specified maximum number of injected recipients per hour is 100, and the specified relationship is that the current value be less than the maximum value, then the specified relationship is not satisfied because 100 is not less than 100. In general, any suitable comparison of a current value to a specified value can be used.

Note that the comparison of the current value to the maximum value can be implemented in any of a number of ways, not just that the current value be less than the maximum number of connections. For example, block 450 can be implemented by determining whether the current value for the sender identifier is equal to or greater than the maximum value for the sender identifier. If so, the process continues to block 480, and if not, the process continues to block 460. In general, any current value for a sender identifier can be compared in any manner to a specified value for the sender identifier to determine whether or not the MTA should accept or reject the email message.

If in block 450, the MTA determines that the current value satisfies the specified relationship with the specified value, the process continues to block 460, and if not, the process continues to block 480.

In block 460, because the current value did satisfy the specified relationship with the specified value, the MTA accepts the email message for delivery. For example, server 100 accepts the email message from sender A 192 that is addressed to recipient C 150c for delivery because the maximum number of injected recipients this hour for domain 192 has not been exceeded.

In block 470, the MTA sends a "message accepted" response to the sender. For example, server 100 sends an SMTP code during an SMTP conversation to the MTA for domain 192 that indicates that the email message has been accepted.

In block 474, the MTA processes the email message for delivery. For example, server 100 can apply one or more policies to the email message, such as a spam policy, a virus policy, or a content policy. Depending on the results of the applied policies (e.g., whether or not the email message is determined to be spam, infected with a virus, or include undesirable content), the MTA may or may not deliver the email message from sender A 192a to recipient C 150c. From block 474, the process returns to block 410 to handle the next connection.

In block 480, because the current value did not satisfy the specified relationship with the specified value, the MTA rejects the email message for delivery. For example, server 100 rejects the email message from sender A 192 that is addressed to recipient C 150c for delivery because the maximum number of injected recipients for this hour for domain 192 has been exceeded.

In block 490, the MTA sends a "message rejected" response to the sender. For example, server 100 sends an SMTP code during an SMTP conversation to the MTA for domain 192 that indicates that the email message has been rejected. Server 100 can also include a text message to the MTA for domain 192 with an explanation for the rejection of the email message, such as "Too many recipients injected this hour." From block 490, the process continues back to block 410 to handle the next connection.

C. Using the Host Access Table (HAT) for Controlling Mail Injection

The HAT described above with reference to managing connections can be used to also managing email messages, thereby providing the administrator of the MTA with a way to control the injection of email messages to the MTA.

The following parameters are examples of those that can be used to manage the email messages at an MTA:

---

(7) max_message_size - specifies the maximum message size from the host.
(8) max_msgs_per_session - specifies the maximum number of messages that may be injected per session (typically counts successfully injected messages).
(9) max_rcpts_per_msg - specifies the maximum number of recipients allowed per message.
(10) max_rcpts_per_hour - specifies the maximum number of recipients that will be accepted for the given host, per hour (e.g., for injection control).
(11) max_rcpts_per_hour_code - specifies the SMTP response code to be given to a host who has exceed the maximum recipient per hour limit; can use a default of 452 per RFC2821.
(12) max_rcpts_per_hour_text - specifies the SMTP response message to be given a host who has exceed the maximum recipient per hour limit.

---

The parameters above can be used instead of or with the parameters described above for controlling connections to a server.

IV. LIMITING DIRECTORY HARVEST ATTACKS

A. Introduction to Limiting Directory Harvest Attacks

Techniques are described that allow the system to track the number of invalid recipient addresses, and when a specified number of invalid recipient addresses have been received, the system no longer sends a bounce message to the sender. For example, a spammer can use a directory harvest attack to generate a list of valid email addresses for a host domain. Because the recipient host typically generates a bounce message when a message is addressed to an invalid email address, the spammer can determine valid email addresses based on the lack of a bounce message, thereby constructing a directory of valid email addresses at the recipient host. While directory harvest attacks can be prevented by never sending bounce messages, there will be messages that include invalid addresses, due to typographical errors in entering the address for example, for which a bounce message would be desired. The approach described herein allows a limited number of bounce messages, but at a certain point, bounce messages are no longer returned to the sender of the emails having invalid email addresses, based on the assumption that when the specified limit is reached, the likely cause of so many invalid recipient addresses is that a directory harvest attack is occurring.

For example, the HAT can include a rule that associates a sender identifier with a variable, such as max_invalid_rcpts_per_hour, that specifies the maximum allowed number of invalid email recipient addresses in a given time period, such as one hour. A counter is used to track the number of invalid email addresses from the sender. So long as the counter does not exceed the specified limit, invalid addresses are treated in the typical fashion, with an SMTP response being sent back to inform the sender that the email address is invalid (e.g., a bounce message). However, when the counter exceeds the specified maximum number of invalid email addresses during the time period, bounce messages are no longer sent to the sender and the messages are dropped. At the end of the time period, the counter is reset to zero and begins tracking the number of invalid recipients from the sender once again.

As a result, when a directory harvest attack occurs, some of the initial messages sent by the sender are treated in the normal fashion with bounce messages generated and sent for any invalid addresses. The spammer can determine based on the initial messages some valid and invalid email addresses. However, after the limit is reached and the invalid recipient address messages begin to simply be dropped, the spammer no longer receives any bounce messages, and thus the spammer is incorrectly led to believe that all the messages are addressed to valid email addresses, when in fact many or perhaps even most are not. When the spammer uses the subsequently created list of allegedly valid email addresses, most will then bounce at a later time during a spam mailing campaign, or will be treated again as a subsequent directory harvest attack.

The specified limit on the number of invalid recipient addresses can be set by the user, such as the administrator for the MTA, and the MTA can be configured with a default value and whether to have directory harvest attack prevention enabled or not. A limit of zero can be used to disable the limit. As an example, a typical recommended value for the maximum number of invalid recipients can be 10 invalid recipients per hour per sender identifier (e.g., HAT entry).

Sender identifiers for directory harvest prevention work in the same manner as for mail flow injection control and limiting the number of connections. Thus, the sender is keyed off of the string value in the HAT host entry that matches the incoming connection, or the constructed string value if the use SenderBase (e.g., "use_sb") option is active.

In some implementations, the analysis of whether recipient addresses is performed outside of the SMTP conversation. Thus, whether the recipient address is invalid is determined after the SMTP conversation. Any bounce messages generated for invalid recipient addresses must be sorted by the spammer to determine why the attempted delivery failed, which servers to further deter the directory harvest attack.

For purposes of designating the start of a directory harvest attack, some implementations may use the time at which the first invalid recipient email address that exceeds the specified limit occurs. The detection of a directory harvest attack can be logged and reported to SenderBase, if desired. The identification of a directory harvest attack can include additional information, such as the IP address of the sender from which the invalidly addressed messages originate, the reversed DNS results for the sender's IP address, the HAT entry that matched the sender, and the threshold limit for the number of invalid recipients.

Optionally, an alert message can be sent to the user or administrator of the recipient host, and the mail flow monitoring system can track the number of recipients being rejected after the start of a directory harvest attack. For the alert sent to the user, one or more of the following items of information can be included: notification of a potential directory harvest attack, the fact that a message has been dropped (instead of bounced), the IP address of the sender of the dropped message, the reversed DNS results of the sender's IP address, the HAT entry that matched the sender, the threshold/limit set for the number of invalid recipients per period of time, the Envelope Sender from the message envelope, the Envelope Recipient(s) from the message envelope, and the Message Headers.

Figure 5:
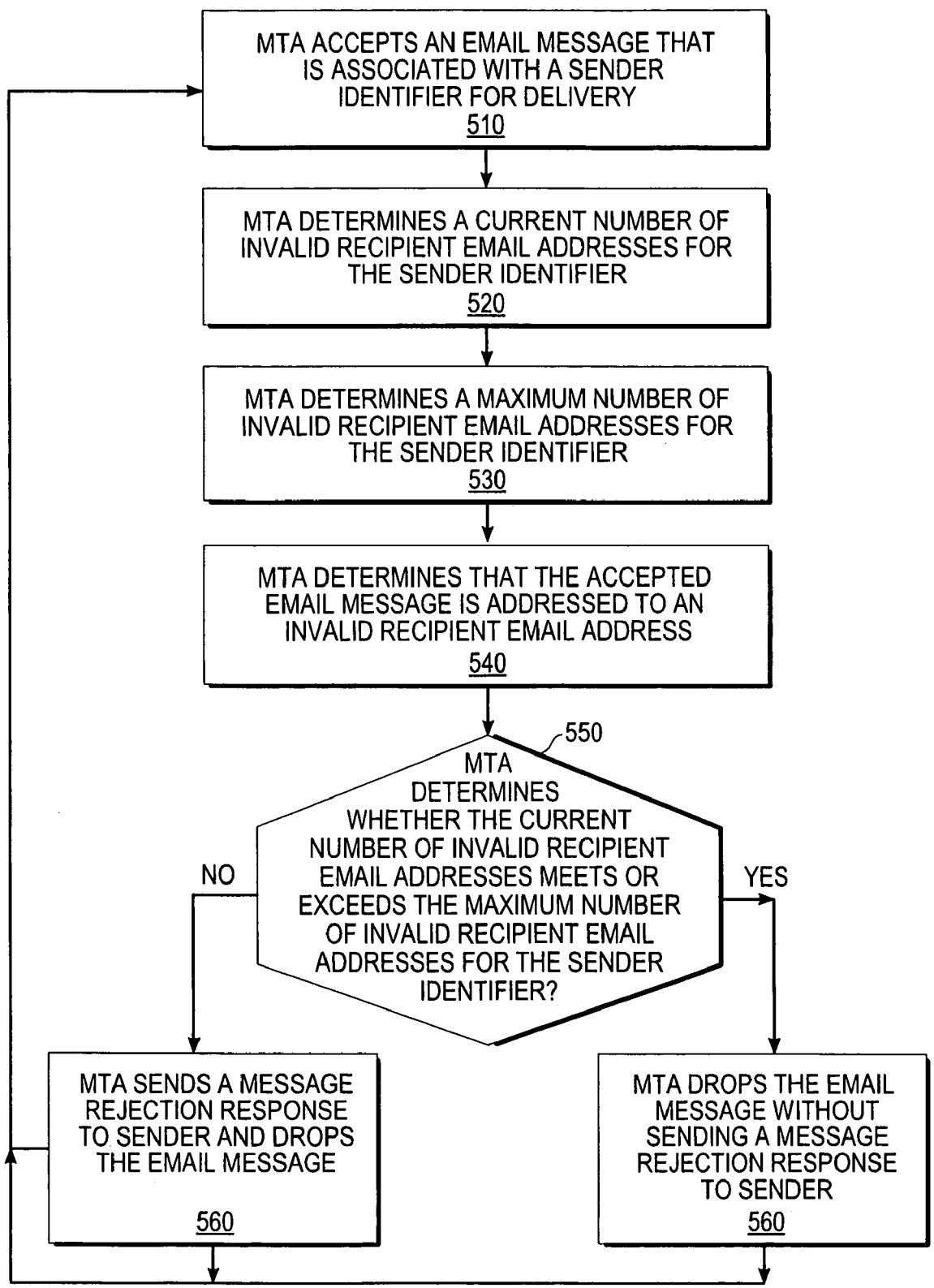
FIG. 5 is a flow diagram that depicts an approach for limiting directory harvest attacks, according to an embodiment.

B. Limiting Directory Harvest Attacks by Tracking Invalid Recipient Email Addresses FIG. 5 is a flow diagram that depicts an approach for limiting directory harvest attacks, according to an embodiment. For clarity, FIG. 5 is described with reference to one sender, one sender identifier, one connection, one email message, and one recipient of the email message that is misidentified with an invalid recipient email address, although any number of senders, sender identifiers, connections, email messages, recipients per email message, and valid and invalid recipient email addresses can be accommodated by a particular implementation. Finally, FIG. 5 is described with reference to an MTA, although any server that handles incoming connections from any other servers can be used to implement the approaches described herein.

In block 510, the MTA accepts an email message for delivery. For example, the email message can be accepted over a connection associated with an IP address for domain 192 as the sender identifier as in FIG. 4 as part of determining whether the email message should be accepted from domain 192. Alternatively, the email message can be accepted for delivery without applying the approach of FIG. 4 or a similar approach, and the sender identifier can be determined as described with reference to FIG. 3 or by any other suitable approach.

In block 520, the MTA determines a current number of invalid recipient email addresses for the sender identifier. For example, server 100 can access database 120 to obtain a count of the number of invalid email recipient addresses in the current hour for the IP address of domain 192.

In block 530, the MTA determines a maximum number of invalid recipient email addresses for the sender identifier. For example, sever 100 can access database 120 that stores maximum values for one or more sender identifiers, such as that the maximum number of invalid recipient email addresses per hour for the IP address of domain 192 is 5. As another example, if server 100 includes a HAT or RAT, then server 100 can search the HAT based on the sender identifier being the IP address for domain 192 to identify a matching rule that specifies a maximum number of invalid recipient email addresses per hour. In general, any suitable approach for specifying the maximum value can be used.

In block 540, the MTA determines that the accepted email message in block 510 is addressed to an invalid recipient email address. For example, server 100 determines that the email message from sender A 192a is addressed to a recipient D of domain 150, but that there is no matching email address for a recipient D in the email address directory for domain 150; hence, the recipient email address of the email message is invalid.

In block 550, the MTA determines whether the current number of invalid recipient email addresses meets or exceeds the maximum number of invalid recipient email addresses for the sender identifier. For example, server 100 can compare the current number of invalid recipient email address for the current hour for domain 192 as determined in block 520 to the maximum number of invalid recipient email addresses of 5 for domain 192 as determined in block 530. The selection of the maximum number of invalid recipient email addresses for a particular time period can depend on the administrator's desire to balance protection against directory harvest attacks (e.g., a low value) with antagonizing bona fide users that are sending legitimate email messages that just have an invalid recipient email addresses for some reason and allowing such users to know of the problem (e.g., :a higher value). The administrator can use historical information, such as that stored on database 120, to help determine a suitable value for a given sender identifier for the maximum number of invalid recipient email addresses for a particular time period.

If in block 550, the MTA determines that the current number of invalid recipient email addresses meets or exceeds the maximum number of invalid recipient email addresses for the sender identifier (e.g., a directory harvest attack is detected), the process continues to block 570, and if not (e.g., a directory harvest attack is not detected), the process continues to block 560.

Note that the comparison of the current number of invalid recipients to the maximum number of invalid recipients can be implemented in any of a number of ways, not just that the current number of invalid recipients meets or exceeds the maximum number of invalid recipients. For example, block 550 can be implemented by determining whether the current number of invalid recipients for the sender identifier is less than the maximum number of invalid recipients for the sender identifier. If so, the process continues to block 560, and if not, the process continues to block 570. In general, any value based on the number of invalid recipients for the sender identifier can be compared in any manner to a specified value of invalid recipients for the sender identifier to determine whether or not a directory harvest attack is detected and thus whether or not rejection response messages (e.g., "bounce" messages) should be sent by the MTA.

In block 560, which is reached due to a directory harvest attack not being detected, the MTA sends a message rejection response to the sender and drops the email message. For example, server 100 sends a rejection response message (e.g., a "bounce" message) to the MTA for domain 192 that the email message is addressed to an invalid email recipient address, and then server 100 drops the email message. As a result, the sender of the email message with the invalid recipient email address will be informed of the problem. If the sender is a bona fide sender (e.g., a user that mistyped the email message), then the sender can check the email message, correct the error in the recipient email address, and then resend the email message. Then the process returns to block 510 where the MTA accepts another email message.

In block 570, which is reached due to a directory harvest attack being detected, the MTA drops the email message without sending a message rejection response:to the sender. For example, server 100 just drops the email message without sending a rejection response message (e.g., a "bounce" message) to the MTA for domain 192. As a result, the sender directing the directory harvest attack against server 100 cannot determine whether the recipient email address used in the email message is valid or not, thus thwarting the directory harvest attack.

C. Using the Recipient Access Table (RAT) for Limiting Directory Harvest Attacks A recipient access table as described herein is one example of a mapping of recipient identifiers to actions that can be used to implement the approaches described herein with respect to managing directory harvest attacks. However, any suitable mapping that associates one or more recipient identifiers or recipient identifier groups to one or more actions can be used in a particular implementation. In addition, as described above, a parameter can be added to a rule in the HAT, such as max_invalid_recpts_per_hour, to associate a specified maximum value with one or more sender identifiers.

The following description of the RAT is just one example of how the RAT can be implemented, and the approaches described herein are not limited to this or any other particular implementation of the RAT in particular or of a mapping of recipient identifiers to actions in general.

In this example, the RAT specifies which recipients will be accepted. The RAT specifies the recipient address, which may be a partial address or hostname, and whether to accept the recipient address or to reject the recipient address.

Optionally, the SMTP response to the "RCPT TO" command can be included for the recipient. Each injector has its own RAT. The hosts are listed in order from top to bottom, and in some implementations, the first rule to match is used.

The mapping of recipient identifiers to actions can be implemented as a set of rules, such as those found in a recipient access table (RAT). In most implementations, the following two actions are included, although other implementation can include more or fewer actions than those described below:

(1) ACCEPT - the connection is accepted, with injection limited by the recipient access table (RAT).
(2) REJECT - the connection is refused, the sender gets a 4xx or 5xx SMTP message, but no messages are accepted.

One or more of the following parameters can be specified for each rule in the RAT:

(1) smtp_banner_text - specifies the SMTP banner displayed when an email message is rejected.
(2) smtp_response_code - specifies the SMTP codes used in the SMTP response.
(3) smtp response_text - specifies the SMTP text used in the SMTP response when an email message is accepted.

Typically, the banner text is used for a "REJECT" action, such as to provide the injector with a brief message relating to why the email message is rejected (e.g., "Email for the xyz-domain.com is not allowed."). Similarly, the response text is typically used for an "ACCEPT" action, such as to provide the injector with a brief message relating to why the email message is accepted (e.g., "Email for the postmaster is accepted."). The SMTP response code allows the administrator to specify in the RAT which SMTP code is to be used when accepting or rejecting a message based on a particular rule as opposed to a default SMTP code that the MTA is configured to otherwise provide. Note that any type of parameter can be used for any action in the RAT, not just those described herein.

When using the RAT to help manage directory harvest attacks, the administrator can use an "ACCEPT ALL" rule in the RAT that effectively precludes the application of any other rules in the RAT. This allows all email messages to be analyzed as part of detecting directory harvest attacks. Otherwise, some email messages with invalid recipient email addresses could be rejected based on one or more rules in the RAT prior to determining whether or not the recipient email addresses are valid or not.

As a result of using the "ACCEPT ALL" rule in the RAT, the only limitation on delivery of email messages to recipients is if the email messages are undeliverable, such as occurs for an invalid recipient email address. If a directory harvest attack is detected, then subsequent invalid recipient email addresses will not result in rejection response messages being sent to the senders. Otherwise, invalid recipient email addresses will have rejection response messages sent to the senders.

D. Command Line Interface for Limiting Directory Harvest Attacks

The following is a CLI example for establishing the parameters for directory harvest attack prevention.

```
Enter the maximum number of recipients per message. Type
DEFAULT to inherit the
    value from the default settings.
    [1000]>
Would you like to specify a custom SMTP response?  [N]>
Do you want to enable rate limiting per host? (Yes/No/Default) [Y]>Yes
Enter the maximum number of recipients per hour from a remote host.
[100]> 1000
Would you like to specify a custom SMTP limit exceeded response? [Y]>
Enter the SMTP code to use in the response. 452 is the standard code.
[452]>
Enter your custom SMTP response. Press Enter on a blank line to finish.
Too many recipients received this hour
Would you like to enable Directory Harvest Attack Prevention
per host (Yes/No/Default) [ ]>Y
Enter the maximum number of invalid recipients per hour from a remote
host.
[10]>
```

In addition, an optional web interface can be used by the user to configure directory harvest attack prevention, along with other features as described herein.

V. IMPLEMENTATION MECHANISMS AND EXAMPLES

A. Aggregated Time-Based Counters

Generally, the first step in managing connections, email messages, and directory harvest attacks is determining what is happening, such as by counting the number of messages received per hour from a sender, the number of connections at a given time from a sender, or the number of invalid recipient email addresses for email messages from a sender. Once the measurement is made, the system can determine what, if any, actions to take to control the flow of messages to the system.

Any number of attributes or events can be counted. For example, every connection to a MTA from another MTA has a connection event, and every connection event has one or more message events, and every message event has one or more recipient events. In one embodiment, a counter is based on the recipient events. For example, the number of messages for recipients from a sender over a specified time period is determined (e.g., the number of recipients from sender X per hour). This can be useful for dealing with spam, since spammers typically send each message with a large number of recipients, such as 50 recipients per message. Thus, counting recipients instead of messages can be desirable when controlling mail flow to deal with spam.

In another embodiment, a counter is based on the number of connection events. For example, the number of connections currently open to an MTA from a sender is determined. This can also be useful in controlling spam as spammers typically send many messages over many connections.

In yet another embodiment, a counter is based on the number of bounce messages due to invalid email addresses. For example, the number of bounce messages generated due to messages from a sender being addressed to invalid email addresses are counted. This can be useful in preventing directory harvest attacks.

A time based aggregate counter can be used for each parameter of interest, such as the key value for the entries in the HAT. For example, if the HAT includes two entries, 1.2.3.4 and 1.2.3/20, a connection from IP address 1.2.3.4 will start with a counter key of "1.2.3.4," whereas a connection from IP address 1.2.3.4 will start with a counter keyed by "1.2.3/20." In other implementations, multiple counters can be used and incremented if a connection matches on more than one entry.

If a HAT entry lists multiple values for the same behavior, each value can be treated separately. For example, if a HAT entry is for "1.2.3.4, 1.2.3.5," the appropriate key would be either of the two listed IP addresses instead of a string comprised of the whole HAT key entry. If the HAT includes the "ALL" catch-all entry, and the "ALL" entry is matched, the counter key can be initially set to the IP address of the incoming connection.

In addition, other parameters can be used. For example, a "use_sb" option can be used to apply SenderBase logic to the IP address, and the counter key can be modified based on the available SenderBase information. For example, the following rules can be applied:

(1) If the SenderBase organization ID and subdivision mask are received: from SenderBase, the subdivision mask can be applied to the IP address to generate a CIDR block, and the counter key is the thus generated CIDR block.
(2) If the SenderBase organization ID is received, but not the subdivision mask, the organization ID can be used as the counter key.
(3) If neither the SenderBase organization ID or subdivision mask are received, a user-supplied netmask can be used by default, and if the user has not specified a netmask, the system can be configured to use a default value of "/24," and the resulting CIDR block is used for the counter key.

If the user has supplied a netmask, but has not chosen to use SenderBase, the user supplied netmask can be applied to the IP address to create a CIDR block that is used as the counter key.

Counters can be stored in a variety of ways, such as through the use of a data dictionary that is keyed off the HAT table criteria that is matched. When an incoming connection is made and the matching HAT criteria is determined, the thread processing the connection looks up a reference to the appropriate counter, which is held by the thread until the end of the connection session, thereby avoiding the need to perform key lookups every time a recipient is processed.

When a reference is retrieved from the data dictionary, the system determines if the counter dictionary is expired (e.g., over an hour old for an hourly based counter). If the counter is expired, a new counter object is returned and the old dictionary is deleted, such that all counters are reset to zero. Thus, the birth time of the data dictionary is set to the most recent hour's beginning. For example, if after a period of inactivity, a connection comes in at 4:15 PM, but the birth time of the dictionary is listed as 3:00 PM, the old dictionary is deleted and the new dictionary is retroactively given a birth date of 4:00 PM.

One or more user options can be used with the techniques herein for controlling message flow. For example, the user can be given the option to turn the use of SenderBase with mail injection control on or off. The MTA can be configured with an appropriate default value, such as that the SenderBase option is set to "on" for a new public injector but set to "off" for a new private injector.

A timeout variable can be used to determine the on/off state for using SenderBase. For example, a timeout of zero can specify that the user has turned off SenderBase support. A timeout of greater than zero specifies that SenderBase support is active, with the timeout value indicating how long the system will wait (e.g., the number of seconds) for a response from SenderBase before giving up. If SenderBase support is "off" or a query to SenderBase fails, the system can be configured to not perform further queries to SenderBase for connections for the injector. If a HAT entry contains an "sbo:" host, that host does not match any incoming connections because the SenderBase Organization ID cannot be determined for the connection. If a HAT entry has the "use_sb" option, the netmask provided by the user for that entry (or "/24" if none) can be used instead, just as if no data if received from SenderBase.

Another possible user option can be to enable a cache time for the SenderBase results. For example, a default time equal to the time to live (TTL) provided by SenderBase can be used, and the user can adjust the value to either zero to preclude caching any results or a non-zero value of the user's choosing, which is used in place of the TTL value from SenderBase.

Actions taken as part of mail flow control can be logged. For example, the actions taken against a connection can record the relevant parameters that supported the action, such as "ICID X from 1.2.3.4 limit N exceeded for HAT entry '1.2.3/24'". As another example, actions taken against an individual recipient can be logged to record the relevant parameters that support the action, such as "ICID X MID Y 'bob@example.com' limit N exceeded for HAT entry '1.2.3/24'".

B. Connection Attributes

Upon acceptance of a connection, one or more attributes of the connection can be determined and subsequently used to identify senders and associate sender identifiers to them, for which counters can be established and tracked to allow for the control of the flow of messages. For example, the following attributes can be determined for a connection:
(1) IP address
(2) Fully qualified domain name (FQDN)
(3) SenderBase data, including:
 (a) SenderBase organization name
 (b) SenderBase organization identity/identifier
 (c) SenderBase organization subdivision mask
 (d) SenderBase organization flow control coefficient.

The IP address is determined when establishing the connection and can be used to obtain the other connection attributes. For example, to determine the FQDN, a reverse DNS lookup is used, with an existing DNS cache, to determine the name. If the IP address can be resolved to a name, a second DNS lookup is done on the retrieved name, and compared to the original IP address. If the IP addresses match, the FQDN is kept. On a per-injector basis, the user may configure the MTA to reject connections that do not properly reverse DNS, based on one of the following options: ignore the error (can be set as the default); immediately TCPREFUSE the connection; or REJECT data from the connection with a response having the appropriate SMTP error code (which the user can define).

If the system is configured to work with SenderBase, the recipient host can connect to the SenderBase server and submit a query for the available information based on the IP address. If the user has not configured the recipient host to use SenderBase or if SenderBase is not available, a default CIDR block can be used as the subdivision mask. The user can specify the CIDR block, and the system can be configured with a default value, such as "/24." When using SenderBase, a timeout can be configured to avoid slowing the injection rate of the host recipient due to the queries to the SenderBase server. The user can specify the timeout, and the recipient host can be configured to have a default value, such as 10 seconds, and a timeout value of "0" can specify that SenderBase lookups are to be disabled.

Figure 6:
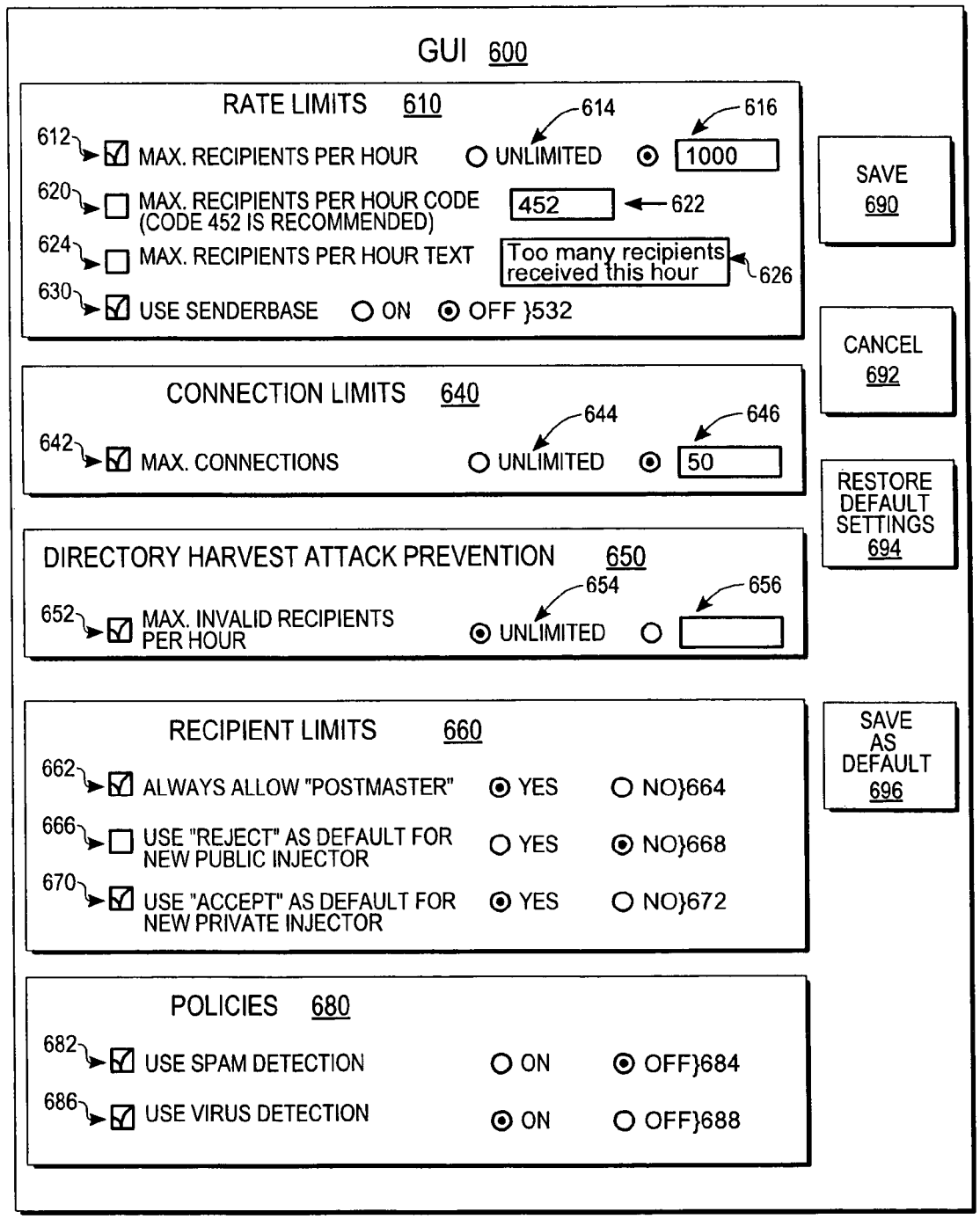
FIG. 6 is a block diagram depicting an example of a graphical user interface for use in managing connections, email messages, and directory harvest attacks, according to an embodiment.

C. Graphical User Interface for Managing Connections, Email Messages, and Directory Harvest Attacks FIG. 6 is a block diagram depicting an example of a graphical user interface (GUI) 600 for use in managing connections, email messages, and directory harvest attacks, according to an embodiment. GUI 600 can be displayed by an MTA, such as server 100 through a display to a user (e.g., the email administrator for server 100). Note that FIG. 6 includes a representative sampling of the types of interface controls for several selected features of the approaches described herein, but in practice, any suitable interface control or widget for any number of the features described herein can be implemented.

GUI 600 includes several graphical widgets that include one or more options for the following features: rate limits 610, connection limits 640, directory harvest attack prevention 650, recipient limits 660, and policies 680. Each of these features is described further below. By selecting the various features and options, server 100 can automatically add or modify one or more rules in the HAT or RAT to implement the desired functionality, as described above. In addition, the HAT and RAT can be configured to be modified directly by a user instead of through the use of a GUI such as GUI 600.

GUI 600 also includes the following set of buttons: save 690, cancel 692, restore default settings 694, and save as default 696. Save 690 is a graphical button that can be selected by a user, such as an administrator, to save the options and inputs entered by the administrator through GUI 600. Cancel 692 exits GUI 600 without saving any changes that may have been made to the options and inputs of GUI 600. Restore default settings 694 restores the options and inputs of GUI 600 to the specified default settings. Save as default 696 saves the current options and inputs as the specified default.

Rate limits 610 includes a checkbox 612 for specifying whether or not the maximum recipients per hour should be limited. If checkbox 612 is checked, the rate at which recipients are accepted is limited by server 100, but if checkbox 612 is not checked, the rate at which recipients are accepted is not limited by server 100. Checkbox 612 is associated with a selection button 614 that specifies the rate to be unlimited and a selection button 616 that specifies the rate to be the value entered in the associated text input box.

Rate limits 610 includes a checkbox 620 for specifying whether or not a maximum recipients per hour code should be used, with the notation illustrated that SMTP code 452 is recommended. Checkbox 620 is associated with a text input box 622 that allows the mail administrator to enter the SMTP code to be sent to the sender of an email message when the email message is rejected because the specified maximum number of recipients per hour is exceed.

Rate limits 610 includes a checkbox 624 for specifying whether or not a text string should be included when email messages are rejected for exceeding the specified injection rate. Checkbox 624 is associated with a text input box 626 that the administrator can use to provide a text message to be included with the SMTP response for rejected email messages based on the maximum number of recipients per hour being exceeded.

Rate limits 610 includes a checkbox 630 to specify whether or not SenderBase should be used when applying the rules in the HAT. Checkbox 630 is associated with selection buttons 632 that allow administrator to specify whether the SenderBase option is "on" or "off." For example, if SenderBase is specified to be used by checking checkbox 630 and clicking the "on" button of buttons 632, server 100 will send a query to SenderBase using the incoming IP address of a sender, and then use the information returned by SenderBase for the sender when identifying which rule in the HAT should be applied. While FIG. 6 uses SenderBase, any type of information service can be used instead to provide information about senders.

Connection limits 640 includes a checkbox 642 to specify whether or not the maximum number of connections to the MTA should be limited. Checkbox 642 is associated with a selection button 644 to specify that the maximum number of connections is unlimited and a button 646 to specify the maximum number of connections in the associated text input box.

Directory harvest attack prevention 650 includes a checkbox 652 to specify whether or not the maximum number of invalid recipients per hour should be applied. Checkbox 652 is associated with a selection button 654 to specify that the maximum number of invalid recipients is unlimited and a selection button 656 to specify a maximum number of invalid recipients per hour through the associated text input box.

Recipient limits 660 includes a checkbox 662 to specify whether or not to always allow email messages addressed to the "postmaster" username for the domain or domains served by the MTA. Checkbox 662 is associated with selection buttons 664 that allow the administrator to indicate that this option should or should not be used by checking "yes" or "no," respectively.

Recipient limits 660 includes a checkbox 666 to specify whether or not the "reject" action should be used as the default RAT rule for new public injectors. Checkbox 666 is associated with selection buttons 668 that allow the administrator to indicate "yes" or "no" for using the "reject" action for new public injectors.

Recipient limits 660 includes a checkbox 670 to specify whether or not the "reject" action should be used as the default RAT rule for new private injectors. Checkbox 670 is associated with selection buttons 672 that allow the administrator to indicate "yes" or "no" for using the "reject" action for new private injectors.

Policies 680 includes a checkbox 682 to specify whether or not spam detection is to be used, along with selection buttons 684 that allow the administrator to turn spam detection "on" or "off."

Policies 680 includes a checkbox 686 to specify whether or not virus detection is to be used, along with selection buttons 684 that allow the administrator to turn virus detection "on" or "off."

D. Example HAT

The following is an example HAT that illustrates one implementation: of the approaches described herein, although other implementations can include more features than those of the following example, and yet other implementations can include fewer or even none of the features of the following example.

On the right hand side of the following example HAT, actions can be listed, such as the basic access rules, or a variable can be used, as denoted by a leading $ as part of the variable name. Once a variable is specified, the variable can be used on the right hand side, with the values assigned to the variable being substituted automatically, which can provide a convenient form of shorthand notation.

The following is an example HAT:

```
# This is an example HAT table. Comments like these will be lost during
# the import process.
# Here we define three variables, "$BLACKLIST", "$WHITELIST", and "$GREYLIST"
# Variable definition lines may not have labels.
$BLACKLIST    REJECT    { smtp_banner_text="You have been blacklisted."
}
$WHITELIST    ACCEPT    { max_concurrency = 600,
                          max_message_size = 20M,
                          smtp_banner_code = 220,
                          smtp_banner_text = "Hello there." }
$GREYLIST     ACCEPT    { max_message_size = 5M,
                          max_rcpts_per_hour = 5k,
                          max_rcpts_per_hour_text =
"You have exceeded 5,000 recipients this hour.
If you feel this limit is too low, please contact mailadmin@mycompany.com",
                          use_sb = Y,
                          netmask = 24
                          }
# This next line is an example of a simple entry. It uses "IronPort_SB"
# as the label, uses an SenderBase ID as the host, uses the $WHITELIST
# predefined behavior as the action, and has the line comment of
# "IronPort Organization". This comment will be saved in the system and
# will always be mapped to this entry.
IronPort_SB: sbo:4988397762      $WHITELIST    (IronPort Organization)
# This next example is indicative of what might have been merged in from an
# older HAT table. It has no label and does not refer to any predefined
# behavior.
10.1.1.2       RELAY
# This is an entry with no hosts.
EmptyList:     $GREYLIST
# This example shows how one can assign a behavior to multiple hosts at once.
# Note the comments applied to each host in the group in parenthesis. These
# comments will be mapped to those hosts and saved internally. The comments
# on the end of the line, using # signs, are also legal, but will not be
# saved during the import process.
Personal_IPs:
10.1.1.7 (Joe's Computer),        # Joe's computer
10.1.2.255/24 (Tom's Computer)    # Tom's computer
                  ACCEPT { max_message_size=20M }
# This example shows separation with only whitespace (no commas)
Cut_and_Pasted_from_SenderBase:
1.2.3.4
1.2.3.5
1.2.3.7
1.2.3.8
                  $BLACKLIST
# We don't like these people. Uses a predefined behavior.
Blacklisted: 10.1.1.3 (SpamCo), 10.1.1.18 (Spamatron) $BLACKLIST
# This example shows the use of a SenderBase Reputation score...
Looks_Like_Spam:
   sbrs[-10:-7.5] (Catch low reputations)
       $BLACKLIST
# The "ALL" entry must always appear last, and defines the behavior for any
# incoming connection that doesn't match the previous rules.
ALL            $GREYLIST (Rate limit everyone else.)
```

For new injectors, default HATs can be established. For example, a new public injector can use "ALL ACCEPT" while a new private injector can use "ALL RELAY."

A HAT can be imported into the system, and comments made with the # sign are stripped out. The file can be internally represented with two data structures, one containing the list of behavior definitions, and the other containing the list of the mappings between hosts and behaviors.

Behavior definitions can be stored as a dictionary that is keyed off the names of the definitions. The value of each key is a tuple of a behavior code and a dictionary of parameters. The five behavior codes are "CONTINUE", "ACCEPT", "RELAY", "REJECT", and "TCPREFUSE". Any entry with a behavior that is not "CONTINUE" is one that may be matched during IP address processing.

The following is an example of a set of behavior definitions, following by a representation of the data structure.

```
$BLACKLIST    REJECT    { smtp_banner_text="You have been
blacklisted."}
$WHITELIST    ACCEPT    { max_concurrency = 600,
                          max_message_size = 20M,
                          smtp_banner_code = 220,
                          smtp_banner_text = "Hello there." }
```

-continued

```
$GREYLIST    ACCEPT   { max_message_size = 5M,
                        max_rcpts_per_hour = 5k,
                        max_rcpts_per_hour_text =
"You have exceeded 5,000 recipients this hour.
If you feel this limit is too low, please contact
mailadmin@mycompany.com"
                      }
behaviors =   { 'BLACKLIST':
                  ('REJECT', {'smtp_banner_text':'You
                  have been blacklisted.'}),
                'WHITELIST':
                  ('ACCEPT', {'max_concurrency':600,
                    'max_message_size':12582912,
                    'smtp_banner_code':220,
                    'smtp_banner_text':'Hello there.' }),
                'GREYLIST':
                  ('ACCEPT', {'max_message_size':5242880,
                    'max_rcpts_per_hour':5120,
                    'max_rcpts_per_hour_text':'You
have exceeded 5,000 recipients this hour.\nIf you feel this limit
is too low, please contact mailadmin@mycompany.com'}),
              }
```

The mapping of hosts to behaviors can be implemented as an ordered list. Each element of the list is a tuple containing: (1) the label (or None if there is no label), (2) a list of lists of hosts (each nested list is an aggregate), (3) the behavior (either a string, if referring to a behavior definition, or a behavior tuple, as above, if the definition is "inline"), and (4) an entry comment (or None, if there is not comment associated with the entry).

Each host is represented itself as a tuple of three values: the type (e.g., IP address, hostname, or SenderBase organization ID), the host itself (e.g., an IP address, CIDR block, domain name, etc.), and a comment (or None, if there is no associated comment).

The following shows an example set of HAT mappings, followed by the representation of the data structure.

```
Personal_IPs:
  10.1.1.7 (Joe's Computer),        # Joe's computer
  10.1.2.255/24 (Tom's Computer)    # Tom's computer
           ACCEPT { max_message_size=20M }
Blacklisted:    .spamco.com (SpamCo), sbo:1234 (Spamatron)
$BLACKLIST (Spammers)
HAT_mappings =    [ ("Personal_IPs",
                    [("10.1.1.7", "Joe's Computer"),
                     ("10.1.2.255/24", "Tom's Computer")],
```

-continued

```
                    "ACCEPT",
                    {"max_message_size":20971520},
                    None),
                   ("Blacklisted",
                    [(".spamco.com", "SpamCo"),
                     ("sbo:1234", "Spamatron")],
                    "$BLACKLIST",
                    "Spammers"),
                  ]
```

E. Example RAT

The following is an example RAT.

| yahoo.com | ACCEPT | |
|---|---|---|
| example.com | REJECT | smtp_response_code=554 |
| | | smtp_banner_text="Go away." |
| postmaster@ | ACCEPT | smtp_response_code=250 |
| | | smtp_response_text="Postmaster mail accepted." |
| ALL | REJECT | |

For new injectors, default RATs can be established. For example, a new public injector can use "ALL REJECT" while a new private injector can use "ALL ACCEPT."

Generally, the format of the RAT is the same as for the HAT except for the address and access fields.

F. Additional Parameters for Use in the HAT and RAT

The following is a list of parameters that can be used in the HAT and RAT. For each parameter, the list includes the parameter name (which can include letters, digits, and underscores) followed by an "=" sign, and then the value. The value can be a number or a string, and numbers can be followed by the letter "M" which multiplies the number by 1,048,576. Numbers followed by the letter k are multiplied by 1,024. A simple string value is just a sequence of alphanumeric characters (with no spaces). If a more complex string is needed, then it can be enclosed with double quotes. Backslash is the escape character used in a quoted string. Parameters can be continued on the next line as long as there is some whitespace at the beginning of the line. Quoted strings do not need the whitespace, but if it exists, then it will be removed. This syntax is defined in ABNF form (RFC2234).

| VCHARC | = %x21-7E | ; visible (printing) characters |
|---|---|---|
| ALPHA | = %x41-5A \| %x61-7A | ; A-Z / a-z |
| SP | = %x20 | |
| HTAB | = %x09 | ; horizontal tab |
| DIGIT | = %x30-39 | ; 0-9 |
| ALNUM | = ALPHA \| DIGIT | |
| float | = [- \| +]? DIGIT+ ["." DIGIT+]? | |
| space | = SP \| HTAB | |
| line_break | = CR \| LF \| CRLF \| comment | |
| WSP | = space \| line_break | |
| allowed_policy | = 'ACCEPT' \| 'RELAY' \| 'CONTINUE' | |
| denied_policy | = 'REJECT' \| 'TCPREFUSE' | |
| policy | = allowed_policy \| denied_policy | |
| line_label | = [A-Za-z_]+[A-Za-z0-9_-]* | |
| behavior_label | = $[A-Za-z_]+[A-Za-z0-9_-]* | |
| range | = DIGIT{1,3} "-" DIGIT{1,3} | ; values from 0 to 255 |
| Snum | = DIGIT{1,3} | ; representing a decimal integer |
| | | ; value in the range 0 through 255 |

-continued

```
ip-addr          = Snum ["." Snum] {3}
ip-block         = Snum ["." Snum] {0,3} ["."]?
ip-range         = [Snum "."] {0,3} range
netsize          = DIGIT{1,2}        ; value in range 0 through 32
ip-cidr          = Snum ["." Snum]{0,3} "/" netsize
sub-domain       = ALNUM [ALNUM | "-" | "_"]* ALNUM
glob-hostname    = ["." sub-domain]+
fqdn             = sub-domain ["." sub-domain]+   ; Note: This is a loose
                                                  ; specification of a fqdn.
senderbase_id    = "sbo:" DIGIT+      ; SenderBase IDs are integers
senderbase_rep   = "sbrs[" space* float space* : space* float space* "]"
host             = ip-addr | ip-block | ip-range |
                   ip-cidr | fqdn | glob-hostname | senderbase_id
host_block       = [host paren_comment? [[',' | WSP] WSP* host
                   paren_comment?]*]? |
                   'ALL'
definition       = policy [space+ param_block]? WSP* paren_comment? line_break
policy_definition = policy [space+ param_block]? WSP* line_break
rightside        = definition | label WSP* paren_comment? line_break
label_definition = behavior_label WSP+ policy_definition
host_line        = [line_label:]? host_block WSP+ rightside
unit             = 'k' | 'M' | 'G'
number           = [0-9]+ unit?
quote            = %0x27
dquote           = %0x22
qchar            = %x01-21 | %x23-%x26 | %x28-%x5b | %x5d-%xff
                     ; Any characters except \, ", and '
string           = Any number of printable characters except quotes, which
                     must be escaped if they match the quotes used to delimit
                     the string. (How to best represent this?)
comment          = WSP* '#' string line_break
paren_comment    = WSP* '(' [%x01-%x28|%x29-%x5b|%x5d-%xff|\\|\)]* ')'
                     ; Any characters except \ and ), but allow \\ and
                     ; \) as escape patterns for those characters
squote_string    = quote [qchar | dquote | line_break | escape quote]* quote
dquote_string    = dquote [qchar | quote | line_break | escape dquote]* dquote
quoted_string    = squote_string | dquote_string
option           = 'on' | 'off ' | 'require'
numerical_param  = 'max_concurrency' | 'max_message_size' |
                   'max_msgs_per_session' | 'max_rcpts_per_msg' |
                   'smtp_banner_code' | 'rate_limit' |
                   'max_rcpts_per_hour' | 'max_rcpts_per_hour_code' |
                   'netmask'
string_param     = 'smtp_banner_text' | 'max_rcpts_per_hour_text' |
                   'tls' | 'use_sb'
param            = numerical_param space* '=' space* number |
                   string_param space* '=' space* quoted_string
params           = param [[',' | WSP] WSP+ param]*
param_block      = '{' WSP* params WSP* '}'
table            = entry*
entry            = comment | label_definition | host_line
```

G. Collecting and Aggregating Message Information

(1) Introduction to Managing Message Information

Although some senders inject messages into an MGA that are desirable, many other senders are injecting messages into the MGA that are undesirable, such as spam messages or virus infected messages. An MGA administrator would like to be able to distinguish the flow of messages from different senders, such as IP addresses, domains, CIDR blocks, etc., and to easily see patterns among such observed message flows so that the administrator can control the flow of messages differently depending on who the sender is and what kind of messages are being sent to the MGA.

Techniques are provided for gathering data about the flow of messages into a system and generating graphical representations of the data to allow a user to identify patterns in the message flows and thereby take action based on the identified pattern. For example, the number of messages being received at an MGA from a particular IP address can be tracked and displayed on a graph that is part of a graphical user interface (GUI). The administrator of the mail server can inspect the graph to identify any patterns or abnormalities, such as a spike in the incoming flow of messages from the IP address. The administrator can then take action, such as throttling the rate at which e-mails are allowed to be received at the email server because of the unusual spike in the number of messages being received, which could indicate that the influx of emails are unsolicited commercial emails, such as spam.

The administrator takes the action by clicking on a button in the GUI, such as a "BLACKLIST" button or a "THROTTLE" button, that when selected by the administrator causes the email server to modify the server's configuration information to add the IP address to a blacklist or merely to be rate limited, respectively, that identifies IP addresses from which messages are to be controlled by either not accepting additional messages or by limiting the rate at which messages are accepted from the sender (e.g., by adding to or modifying the HAT). If an unusual mail flow pattern is desirable, such as a spike being caused at a large company when an outside contractor is sending all of the company's employees copies of a press release, the administrator can click on a "WHITELIST" button to allow all such messages to be accepted, thereby avoiding such messages from inadvertently being treated as spam.

In addition, approaches are described that track the application of policies to the flow of messages, such as actions specified in the HAT or RAT, by sender identifiers and generate reports based on the results. For example, the mail flow monitoring system can present the user with a graphical representation of the mail flow over time for one or more sender identifiers or for all mail flow into the system, along with a breakdown of how many of the messages were blacklisted, whitelisted, greylisted (e.g., subject to injection control), or other categories of treatment or lack thereof.

Mail flow monitoring functions can include a number of items. For example, detailed information can be provided about incoming messages, outgoing messages, and processing statistics. Other sources can be accessed for data, such as SenderBase that supplies network owner names and global information for a sender profile. Data can be aggregated and tabular results presented by grouping data on IP address, domain, network owner, or any other sender identifier, along with time series data by the same groupings.

Mail flow monitoring can be implemented in a hierarchical fashion, such as a low level that interacts with a data store or real time data inputs, a middle level that composes tables and aggregates, and a high level interface that finalizes the data for presentation via a graphical user interface.

(2) Collecting Data on Message Flows

Mail flow data can be collected by measuring inbound and outbound traffic flows, including bytes, recipients, messages, connections, success conditions, failure conditions, and actions taken, such as those specified in the HAT and the RAT. Typically, such measurements are collected by IP address over short time intervals (e.g., one minute intervals). The per measurement interval counters are aggregated over time to represent traffic over longer time intervals and over IP addresses to represent traffic and product reports by domain name, IP address, subnet, a range of IP addresses, a fully qualified domain name, any level domain, a CIDR block or portion of a CIDR block, a SenderBase organization ID or a SenderBase reputation score.

In one embodiment, a queue is used to collect data on message flows.: For example, collecting data in real time as part of processing incoming messages can at time affect performance to an unacceptable degree, based on the user's needs. By using a queue into which information for each connection and/or message is placed, the data can be processed outside of the normal message processing, thereby avoiding processing impact from the data collection process. However, the delay in placing information into the queue and the offline processing of the queue is not great, typically on the order of seconds or a minute or two, and thus the data is generated and can be displayed and reported substantially in real time as the data is collected an processed.

As a specific example, the processing of the data in the queue can perform an aggregation of the information in periodic intervals, such as one minute snapshots. The aggregated data from the single minute snapshots can then be further aggregated over longer periods, such as to provide hourly summaries or daily reports. Any level of data, from the lowest level information from the smallest aggregation interval to all data collected, can be reported and displayed to the user.

Mail flow data can also be aggregated, displayed, and reported based on the concept of a "primary domain." For example, yahoo.com, aol.com and honda.co.jp are examples of primary domains that are affiliated with a particular organization, such as Yahoo!, America Online, and Honda of Japan, respectively. By associating individual IP addresses that connect to the system with the corresponding domain name, mail flow data that is collected based on IP addresses can be aggregated based on the associated primary domains that based on some or all of the IP addresses associated with the primary domain.

In addition, data can be aggregated, displayed, and reported based on the network owners for individual IP addresses based on a database that includes a mapping of IP addresses to network owners, such as the SenderBase service. For example, when a connection is received from an IP address at the MGA, the system can issue a query to SenderBase to obtain the information for the IP address, such as the network owner, SenderBase organization ID, and perhaps even a reputation score. As a result, a network owner that has a many IP addresses that are not otherwise organized in a manner that would allow for the IP addresses to be tacked back to the network owner without the user of such a database can have all of the network owner's IP addresses grouped together, and the system can aggregate, report, and display data for the network owner based on some or all of the IP addresses associated with the network owner.

(3) Types of Counters for Collecting Data

Any of a number of different counters can be used for collecting data about the flow of messages through the system, and the counters can be based on any kind of sender identifier, such as those described herein. For example, counters can be used to track the actions taken based on rules in the HAT and RAT, such as a counter for the number of recipients that are blocked from a sending IP address based on injection control or the number of connections refused from a domain due to the maximum number of connections being exceeded. As another example, counters can track the number of messages identified by the system as spam, such as by the Brightmail anti-spam engine, or the number of messages determined to be infected with a virus, such as by Sophos anti-virus engine.

Counters can be established for different actions taken based on sender identifiers. For example, one counter can track the number of messages rejected for a CIDR block that is listed for a rule in the HAT, while another counter can track the number of messages rejected for a specified domain name that is listed in the HAT. In general, a counter can be used for any sender identifier listed on the left side of the HAT and RAT and count the number of messages affected by the action or rule specified on the right side of the HAT and RAT.

(4) Reporting and Displaying Data on Message Flows

A graph can display the number of recipients injected over the last day, along with the result of the connection attempts by connection policy (e.g., accepted, throttled, relayed, or blocked/rejected) over the same day. In addition, a mail flow summary can be provided that shows the total overall mail flow statistics as well as a breakdown by domain or other sender identifier. Furthermore, the display of the mail flow information via the GUI can include other functions, such as a quick search function that allows the user to specify an IP address for which the system generates a graphical display and/or report of mail flow information based on the specified search criteria. Finally, the display, can include a quick report function to generate a report based, such as the top IP addresses by the number of recipients blocked.

As another example, a current mail flow graph can display the total rate at which recipients are being injected into the MGA, along with how many of the injected:recipients are being blocked as spam, such as by using Brightmail, and how many of the injected recipients are being blocked based on a reputation filter, such as by comparing reputation scores, such as from SenderBase, for the senders of the messages to a specified limit. Also, a summary of the breakdown of the treatment of the recipients can be displayed, such as the percentage of recipients that have been blocked due to a blacklist, those that are allowed based on a whitelist, those that have been subject to injection control (e.g., throttling, or greylisted), and those whose disposition is otherwise unknown or not included in the other categories. In addition, the display of the mail flow information via the GUI can include other functions, such as a quick search function that allows the user to specify an IP address or sender type for which the system generates a graphical display and/or report of mail flow information based on the specified search criteria. Finally, the display, as illustrated in FIG. 6, can include a quick report function to generate a report based on a sender identifier based on one or more search criteria.

(5) Identifying Patterns

The use of a GUI for displaying mail flow data, such as in the forms of graphs and tables, allows the user to identify patterns, such as that a virus attack is underway or a spam campaign has targeted the recipients for the MGA. For example, a mail flow graph can depict a large increase in the number of recipients blocked based on the reputation filter during Friday and Saturday. The user can then request a report on the IP addresses from which the reputation filter blocked messages were received, and then add some or all of the IP addresses thereby identified to the HAT with an appropriate rule, such as that the IP address is to be blacklisted or subject to mail injection rate limitations.

(6) Alerts and Alarms

In some implementations, the mail flow monitoring portion of the system can compare mail flow data to thresholds, limits, or other specified values, and generate an alert message to the administrator of the MGA or present an alarm message on a display. For example, the system can compute a thirty day average, such as that the MGA is having 100 recipients/day injected from a particular IP address. The system can then compare the mail flow from the particular IP address for the current day to the thirty-day average. If the difference between the data for the current day and the thirty day average exceeds a specified amount, such as a threshold level of a 500% increase, the system can send an alert message to one or more individuals associated with the MGA and/or display an alarm message on a display associated with the MGA. The alert or alarm allows the user of the MGA to review the mail flow data and take an action. For example, a 500% increase in the number of injected recipients from a particular IP address may indicate a hit and run type of spam campaign, and as a result, the user can take an appropriate action, such as using mail flow injection control to limit the number of recipients being injected to the MGA to a particular amount, such as the thirty day average, or such as blacklisting the IP address for the next several hours.

(7) Taking Actions

In some implementations, the system for displaying mail flow monitoring data includes one or more graphical objects, such as buttons, that allow the user to take actions based on the information being displayed. For example, if the display includes a mail flow graph that depicts the number of messages being received over that last six hours from an IP address and that shows an unusually large spike in the number of messages received over the last thirty minutes, the user can click on one or more buttons that cause the system to take a specified action. As a specific example, if the user determines that the spike is likely the result of a virus attack or a hit and run spammer, the user can click on a button on the display labeled "BLACKLIST" to have the IP address showing the spike in messages blacklisted. Such a capability can be referred to as a "one button blacklist" feature, and can be implemented by making a change to the HAT.

As another specific example, the user can click on a button labeled "WHITELIST" to have the messages allowed, such as when the user determines the IP address is that of a trusted partner who is unlikely to be the source of virus infected messages or spam. As yet another example, the user can click on a button labeled "GREYLIST" to have the flow of messages from the IP address limited, such as by employing one of the mail injection control approaches described herein to limit the rate at which recipients are injected to the MGA by the IP address.

The system can implement the action represented by the user's use of such graphical objects, such as the buttons described above, by one of a number of approaches. For example, when a button is clicked by the user, the system can generate an appropriate rule and add the rule to the HAT or RAT, such as that the identified IP address be blacklisted, whitelisted, or greylisted.

H. Managing Information Relating to Electronic Messages (1) Overview

This section describes approaches and techniques for collecting, aggregating, and managing information relating to the senders of electronic messages. In one aspect, the techniques include obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and providing the message volume information related to the one or more message senders.

In another aspect, the approaches include receiving one or more messages from a particular message sender, sending a request for message volume information related to the particular message sender, receiving the message volume information related to the particular message sender, where the message volume information related to the particular message sender was determined by obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and limiting delivery of messages from the particular message sender based on the message volume information related to the particular message sender.

In another aspect, the approaches include receiving one or more messages from a particular message sender, sending a request for message volume information related to the particular message sender, receiving the message volume information related to the particular message sender, where the message volume information related to the particular message sender was determined by obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and blocking delivery of a particular message from the particular message sender based on the message volume information related to the particular message sender.

(2) Example Information about an Email Sender

Example information that a data processing unit may collect for message senders are: time of the first request for information about that email sender, volume over time of requests for information about that email sender, percentage of total volume of all requests for information about that email sender, network owner of the IP address from which the message is sent, network topology information for the area of the network in which the IP address of the email sender is located, category of enterprise or organization to which the email sender belongs, time that the IP address of the sender last changed ownership, geographical location of the email sender, geographical information about the path the email message has taken, or any other appropriate information.

The time of the first request for information about a particular email sender may be obtained by keeping information related to each request for information for each sender about which information is requested. Whenever information is requested for a sender, a record or set of records related to the request for information may be recorded or modified. For example, if no information for that sender has been recorded previously, then a new record or set of records is created and the time of the first request is recorded.

A data processing unit collects the volume over time of requests for information about an email sender or group of senders. The calculation of volume over time may be performed in any appropriate manner and for any appropriate time periods. For example, the volume over time may be calculated as the number of requests for information about a particular sender or group of senders over a day, week, month, 30-day period, or year. As another example, the volume over time is calculated as a percentage as follows:

$$\text{Percent volume over time } T = $$
$$\text{(number of information requests for a particular}$$
$$\text{sender or group of senders for time } T)/$$
$$\text{(total number of information requests for all senders for time } T)$$

Alternatively, the volume over time may be calculated as an estimate of total number of messages a particular sender or group of senders has sent on the entire Internet as follows:

$$\text{Estimated Total Number of Messages over Time } T = $$
$$\text{Estimated Total Number of Messages on}$$
$$\text{Internet over time } T * \text{Percent volume over time } T$$

Alternatively, the volume over time may be calculated logarithmically to provide a magnitude value as follows:

$$\text{Magnitude value for time } T = 10 + \log_{10} \text{ (Percent volume over time } T)$$

Another example of a volume over time calculation is the fluctuation in volume over time. For example, one or more of the following can be used: determine the fluctuation in volume over time as a percentage or absolute change in any appropriate volume calculation over time T1 as compared to time T2, where T1<T2; determine a percentage or absolute change in any appropriate volume calculation over time T1 as compared to time T2, where T1 and T2 do not overlap; determine a percentage or absolute change in any appropriate volume calculation over time T1 as compared to time T2, where T1<T2 and T2 represents the entire time range for which information about a sender or group of senders has been collected; or any other appropriate calculation.

A data processing unit determines the network owner associated with a message sender based on the IP address from which the message is sent. Also, a network owner can be determined by geographical location, domain name, or any other appropriate identifier associated with the sender. In other implementations, a network owner is determined by querying a list or data structure of known network owners of IP addresses, or a determination of network owner may be based on domain name, geographical location, or any appropriate information.

Network owners are typically broken up into one or more groups, herein called network operators. For example, an Internet Service Provider (ISP) may be listed as the network owner for a large block of IP addresses. In such an example, the network operators of portions of the IP addresses owned by the network owner (the ISP) may be used by an email gateway or other server or application to indicate blocking a message, bouncing a message, throttling messages from a sender or group of senders, or displaying the information based on the network owner or network operator.

The network operators of IP addresses within a set of IP addresses owned by a single network owner are estimated by assigning separate blocks of IP addresses to separate operators, receiving information from the network owner indicating which IP addresses are operated by which network operators, or estimating network operators based on domain names associated with the IP addresses. For example, an ISP is a network owner and owns a block of IP addresses at "152.2.*.*". In such an example, the block of IP addresses may be broken up into blocks of 256 IP addresses: "152.2.1.*", "152.2.2.*", ..., "152.2.256.*"

The decision whether to break up a network owner may be based on the number of IP addresses owned by the network owner or by the category of the ISP. For example, if an ISP owns 1024 IP addresses, it may be useful to divide the 1024 IP addresses into four sets of 256 IP addresses and assign a network operator to each. In such an example, any blocking, throttling, or other action taken based on the network operator will not effect all of the potential message senders with IP addresses owned by the ISP, but will effect only a portion of the senders. As another example, an email-marketing firm that owns 1024 IP addresses may not have its 1024 IP addresses divided into multiple network operators. In such an example, any and all messages may be considered to come from the same company and should be, if appropriate, blocked, throttled, or any appropriate action taken. Assigning a network operator to a set of IP addresses comprises assigning a new network owner corresponding to the network operator for the set of IP addresses.

The data processing unit obtains network topology information for the area of the network in which the IP address of the email sender is located. In some implementations, network topology information that is associated with a particular sender includes network owners of IP addresses near the IP address of the particular sender, network owners of other IP addresses associated with the same geographical area, or any appropriate network topology information. For example, a particular sender has a particular IP address. If that IP address is near one or more other IP addresses that are suspected spam senders, then the IP address may be rated as more likely to produce spam. As a specific example, an IP address is near another if the two IP addresses have the same high-order significant bits, where the number of bits that are high-order significant bits may be any number of bits, including from 1 bit to 31 bits.

The data processing unit obtains the category of the enterprise or organization associated with the email sender. For example, the categories associated with email message senders can be airlines, Fortune 500 companies, Fortune 1000 companies, Fortune 1500 companies, ISPs, banks, or any appropriate category.

The data processing unit records the change of ownership of an IP address. In some implementations, the change of ownership is recorded by clearing previous information about the IP address or indicating that the owner of the IP address is unknown. Information that may be cleared about the IP address or other indicator may include the first recorded request about a message, volume of requests, or any other appropriate information. In one embodiment, the information request handler keeps track of the number of times that an IP address changes owners. The information about change of ownership combined with other information, such as message volume information, may be used to indicate that a sender may be sending spam.

The data processing unit records geographical location of the email sender. For example, the geographical location of the email sender is determined by the IP address, domain name, or a look up table indicating the geographical location of the email sender. Geographical information may be useful in determining which messages are valid. As another example, if a particular email recipient never receives email from China,: then a message from China may be more likely to be spam.

The data processing unit obtains geographical information about the path the email message has traveled, or the geographical path, based on the header information in the email message. The header information in the email message may indicate a path the email message has taken since it was sent. Geographical information may be determined based on the header information in any appropriate manner, including determined by the IP address, domain name, or other look up table indicating the geographical location of gateways the email message has traversed.

The techniques described herein are in no way limited to using the types of information that are described herein. Any appropriate type of information related to the email sender, email messages, or email recipient may be used. For example, information related to email messages may include information in the content of the message, such as the existence of keywords or tokens. An example of email recipient information may be the amount of spam a particular email recipient receives. For example, if 90% of the email that a particular email recipient receives is spam, then that information may be used to aid in the estimation of whether an email directed to that recipient is spam.

(3) Example Process for Managing Information Related to Electronic Messages

The following is an example of a process for collecting, processing, and making available information related to electronic messages.

First, data related to information about email senders is obtained. Various types of data that may be obtained from the following: an email gateway, an information request handler, an email client, or any other appropriate source. As a specific example, data is obtained by requesting the information from the information source. Alternatively, the information source may provide the information based on any appropriate event or based on any appropriate schedule instead of being provided in response to a request. The data may also be obtained by performing a DNS zone transfer. Additionally, multiple sets of data for one or more email senders may be obtained from multiple sources or from the same source at two or more different times.

Next, the data related to information about email senders is processed. For example, multiple sets of data related to email senders obtained from multiple sources or obtained from the same source at different times may be taken in aggregate and processed. As another example, processing the data includes determining one or more of the following: a volume of messages over time, the percentage of message sent by a message sender compared to all messages sent, a magnitude value, a change of absolute or percentage of total messages of a particular time period as compared to a different time period, a change of absolute or percentage of total messages during a particular time period as compared to absolute or percentage of total messages since the first request for information about the sender was received, or any other appropriate calculation. As another example, a data processing unit calculates a magnitude value for a particular network owner associated with a particular message sender and determines the change in the magnitude value as compared to the magnitude value for the previous day.

In some implementations, processing information related to a message sender includes storing information related to the message sender in a database, flat file, or other storage mechanism. For example, processing information related to a message sender includes determining the network owner or network operator associated with the message sender. As another example, the IP address, domain name, geographical location, or network topology of the message sender is used to determine the network owner or network operator associated with the message sender. The decision whether to associate a network owner or network operator with a message sender is based on whether the IP address or domain name of the message sender is in a set of IP addresses or domain names associated with the network owner or network operator.

The determination of which network operator to associate with a message sender is made by dividing the set of IP addresses for a network owner associated with a message sender into two or more network operators and determining which network operator to associate with a message sender based on which network operator is associated with a set of IP addresses containing the IP address of the message sender. A network owner is divided into network operators based on the category of the network owner, based on the number of IP addresses associated with the network owner, based on information about one or more network operators within the network operator, or any other appropriate decision. For example, a message sender is associated with an IP address, which is associated with a particular network owner. The particular network owner is an ISP that owns 1024 IP addresses. The network owner is split into four network operators, each corresponding to 256 IP addresses. The message sender's IP address fall into the range associated with a particular network operator, and the message sender is associated with the particular network operator.

Processing the data related to information about email senders includes determining or storing category information for network owners and network operators. Determining the category information for network owners or network operators may include receiving the category information through a GUI, via an electronic interface, or from an email gateway, information request handler, email client, or any appropriate source. Alternatively, the category information may be determined automatically using an automatic categorizer based on keyword detection, Naïve Bayes, or any other appropriate categorization mechanism. Determining the category information includes accessing a list containing category information and cross-referencing it to message senders, network owners, or network operators. The category information includes a list of airlines, Fortune 500 companies, Fortune 1000 companies, Fortune 1500 companies, ISP's, or any other appropriate category.

Processing the data related to information about email senders includes determining information related to the history of an IP address associated with the message sender. The information about the history of the of the IP address includes determining when a first request for information was made about the message sender, how many requests have been made about the sender, how many requests over time have been made about the sender, how often the IP address has changed network owners, when the IP address last changed ownership, and any other appropriate information. For example, a data processing unit processes data related to an IP address history in order to determine and store when a request for information about the email sender was first made.

Processing the data related to information about email senders includes determining geographical information. An external electronic service is queried to determine the geographical location of a message sender. The geographical location of a message sender is determined by looking up the location of the IP address associated with the message sender in a lookup table or by querying an electronic service, and then the geographical path of a message is determined. The geographical locations of hubs, routers, or gateways through which the email traveled are determined. The information about hubs, routers, or gateways through which the email traveled is determined by parsing the message header. For example, a data processing unit parses the header of a message from a message sender in order to determine the geographical location of all hubs, routers, and gateways through which the email has traveled.

Next, information related to email senders is made available. The information is made available via a graphical user interface or an electronic interface, and the information is made available by responding to requests for information about message senders, by sending it to an interested party based on particular rules, or by making the data available in a public or private website.

The graphical user interface, by which the information related to email senders is made available, can be from a web site, a graphical interface to a computer program, or any other appropriate graphical interface. Single items or multiple data items as described herein are presented in the graphical user interface.

The information related to email senders may also be made available via an electronic interface. For example, the electronic interface is a DNS-like interface. Alternatively, any appropriate electronic interface may be used, including a web service, a rsync gateway, a FTP server, a HTTP server, a HTTPS server, a defined remote procedure call interface, a TCP/IP sockets interface, a UDP interface, or any other appropriate interface.

I. Determining a Reputation Score for a Sender

In some implementations, a reputation of a message sender is determined by obtaining two or more lists from two or more list providers, then determining which lists of the two or more lists indicate the message sender, and then determining a reputation score for the message sender based on which lists of the two or more lists indicate the message sender.

In addition, an indication can be provided that a message is unsolicited based on a reputation score. Also, information from the two or more lists can be stored in an aggregate list data structure, and determining what lists indicate the message sender includes querying the aggregate list data structure. In a related feature, a particular list is one of the two or more lists and the particular list contains one or more entries, and storing information from the two or more lists in the aggregate list data structure includes determining the difference of the particular list with a previous version of the particular list, storing entries of the particular list that were not in the previous version of the particular list in the aggregate list data structure, and removing from the aggregate list data structure entries that are not in the particular list but were in the previous version of the particular list.

In yet another related feature, determining the reputation score includes determining an individual score for each list of the two or more lists and determining an output score based on the individual score for each list in the two or more lists. Also, determining the output score includes determining an aggregate score based on the individual score for each list of the two or more lists, determining a normalized score based on the aggregate score, and determining the output score based on the normalized score.

In some implementations, the individual score for each list in the two or more lists each includes an individual probability and a list of probabilities includes the individual probability for each list in the two or more lists, and determining the aggregate score based on the individual score for each list of the two or more lists includes performing a Chi Squared calculation on the list of probabilities. In related features, the approach includes one or more of the following: receiving a request for the reputation of the message sender; receiving the request for the reputation of the message sender by receiving a request formatted as a DNS request; the message sender is associated with a particular IP address; determining what lists of the two or more lists indicate the message sender includes determining for a particular list of the two or more lists whether the particular IP address of the message sender is contained in an IP address range indicated by the particular list; and if a particular list indicates an IP address range, setting a bit corresponding to the particular list in a particular list bit mask data structure corresponding to the IP address range.

In some implementations, setting the bit corresponding to the particular list is performed for each list of the two or more lists, and the sender corresponds to a particular IP address, the particular IP address is contained within a first IP address range that has associated with it a first list bit mask, and the IP address is contained within a second IP address range associated with a second list bit mask. In addition, determining which lists of the two or more lists indicate the message sender can be accomplished by performing an "or" operation on the first list bit mask and second list bit mask to produce a third list bit mask and determining what bits are set in the third list bit mask.

Some implementations can include receiving a message from a message sender, obtaining a reputation score of the message sender, where the reputation score of the message sender was determined by obtaining two or more lists from two or more list providers, determining which lists of the two or more lists indicate the message sender, determining the reputation score for the message sender based on which lists of the two or more lists indicate the message sender, and if the reputation score is worse than a first predefined threshold, indicating that the message is unsolicited.

Related features include one or more of the following: if the reputation score is better than a second predefined threshold, an indication is made that the message is valid, where the first predefined threshold is different from the second predefined threshold; if the reputation score is better than the first predefined threshold and worse than the second predefined threshold, indicating that the message is not estimated as either valid or invalid; sending a request for the reputation score of the message sender; obtaining the reputation score of the message sender by receiving a response to the request for the reputation score of the message sender; and sending the request for the reputation score of the message sender includes sending a particular request formatted as a DNS request.

The following example for determining a reputation score is described assuming that the sender is associated with an IP address. The techniques described herein, however, are in no way limited to use of IP address as an identifier of a sender. In other embodiments, the sender is identified by domain name, email address, geographical location, or any appropriate mechanism.

First, a score is obtained corresponding to each list. For example, this score is obtained by determining, for each blacklist, whether the sender's IP address is in the particular list. If the IP address is indicated in the particular list, then the score for the list represents a certain percentage likelihood that the message is an unsolicited electronic message (often higher than 50%). If the IP address is not indicated in the particular list, then the score for the list still represents a certain percentage likelihood that the message is an unsolicited message (often less than 50%).

In another example, this score is obtained by determining, for each "white" list, whether the sender's IP address is in the particular list. A white list is a list of IP addresses and ranges that are believed to be associated with senders of legitimate electronic messages. If the IP address is indicated in the particular list, then the score for the list represents a certain percentage likelihood that the message is unsolicited (often less than 50%). If the IP address is not indicated in the particular list, then the score for the list represents a certain percentage likelihood that the message is unsolicited (often higher than 50%).

In other examples, a white list or blacklist will contain ranges of IP addresses and exceptions to those IP addresses, thereby including all IP addresses in a range except those that are excluded. The white lists and blacklists contain integer or floating point values indicating scores for IP address ranges and IP addresses, and these scores are used to determine an aggregate score for an IP address with respect to the lists. Also, an aggregate list data structure is queried to determine which lists indicate the sender.

Next, an aggregate score is generated based on the scores for each list determined above. For example, the score for each list is a percentage likelihood that a message is unsolicited and the aggregate score is an aggregate percentage likelihood that is generated based on the individual percentages likelihoods. As another example, this aggregate percentage likelihood is based on a weighted average of the individual percentages likelihoods, a sum or product of the individual percentages likelihoods, a polynomial of the individual percentages likelihoods, or any appropriate calculation. As yet another example, the aggregate percentage is based in part on the Chi Squared function over the probabilities, a Robinson calculation, a Bayes calculation, or any other appropriate mechanism. As a specific example, the Chi Squared function is depicted in the Python Programming Language (www.python.org) code.

Next, the aggregate score is mapped to a normalized score. For example, the aggregate score is an aggregate percentage, and the normalized score is a mapped percentage that has the range from 0% to 100%, and this step is performed by mapping the aggregate percentage to the normalized range from 0% to 100%. As another example, this mapping is linear, piecewise linear, cubic, polynomial, or uses any other appropriate function. As a specific example, a piecewise linear method of mapping the aggregate function is used and comprises determining the known lowest possible probability (LP), the known average probability (AP), the known highest possible probability (HP), and linearly mapping percentages from LP to AP to 0% to 50% and percentages from AP to HP to 50% to 100%. In equation form, with aggregate probability represented as P, this can be represented as follows:

Mapped Percentage (MP) = { if (P < AP); (P − LP) * 50 / (AP − LP)
{ else; (P − AP) * 50 / (HP − AP) + 50.

For example, if LP is 30%, AP is 40% and HP is 80%, then percentages from 30% to 40% would map to 0% to 50% and percentages from 40% to 80% would map to 50% to 100%. In such an example, 35% would map to 25% and 60% would map to 75%.

In related examples, LP is determined by performing the calculations of the previous step using the lowest possible score (e.g. percentage) for each of the lists, and HP is determined by performing the calculations of the previous step using the highest possible score (e.g. percentage) for each of the lists, and AP is determined by performing the calculations of the previous step using a random sample of possible values and averaging the result.

Next, the normalized score is mapped to an output score. In one embodiment, a mapped percentage is mapped to an output (mapped) score. In various embodiments, this mapping is linear, piecewise liner, cubic, piecewise cubic, polynomial, or piecewise polynomial, exponential, piecewise exponential, or any appropriate mapping. In one embodiment, this mapping is performed by using a piecewise function such as:

Mapped Score (MS) = { if MP < .5 ; (−log (MP)/ log (2) − 1) / lo_k
{else ; 1.0/hi_k * (1− 1/log(2) *
(log (1/(1−MP) ), where lo_k and hi_k are constants. It may be beneficial to use hi_k and lo_k values approximately in the range of 0.5 and 2.0. It may be beneficial to use hi_k and lo_k values approximately in the range of 0.6 and 1.0. Hi_k and lo_k may each have the same value or may have different values.

These examples of determining a reputation score for an electronic message sender are based on which lists indicate the IP address of the sender. A result of this example is the determination of a composite score for the sender of the email messages.

J. Logging the Entire Byte Stream of SMTP Conversations

The ability to log the entire byte stream of an SMTP conversation can be a useful feature in a number of situations, such as to diagnose problems or to verify the proper functioning of the mail gateway appliance. As a specific example, a user may be unable to send mail to a particular domain, resulting in the user receiving SMTP 421 messages that the service is temporarily unavailable. By logging the entire byte stream of the SMTP conversation, the user can determine that the domain expected the sender to close the connection before trying to send the message again, and because the user was not closing the connection before making the next attempt to send the message, the error was occurring. As another example, logging the entire byte stream of the SMTP conversation can allow the provider of a mail gateway appliance to verify during testing that injection control is working properly.

In some implementations, the user can create a list of IP addresses or domains for which the entire byte stream of the SMTP conversation is to be logged. When a connection is established, the system compares the incoming sender's IP address against the list to determine whether to make a complete log of the SMTP conversation. If the conversation is to be logged, any data sent to the sender and any data received from the sender is written to the log for later evaluation.

VI. HARDWARE OVERVIEW

A. General Hardware Overview

The approach for managing connections, email messages, and directory harvest attacks described herein may be implemented in a variety of ways and the invention is not limited to any particular implementation. The approach may be integrated into an electronic mail system or a mail transport agent, or may be implemented as a stand-alone mechanism. Furthermore, the approach may be implemented in computer software, hardware, or a combination thereof.

Figure 7:
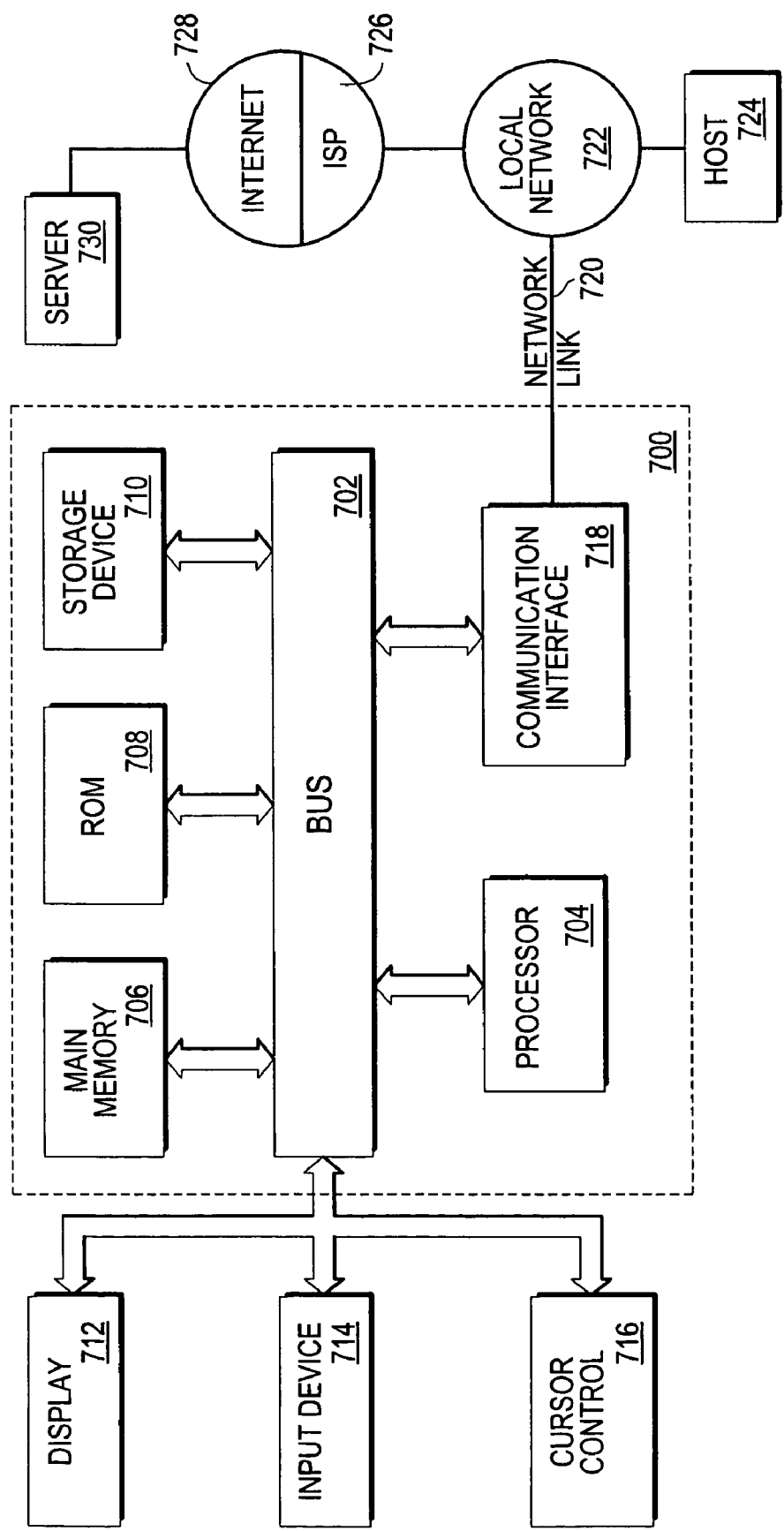
FIG. 7 is a block diagram that depicts a computer system upon which embodiments of the invention may be implemented.

FIG. 7 is a block diagram that depicts a computer system 700 upon which an embodiment may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

B. Hardware Examples

The techniques disclosed herein can be implemented on devices that are used as a mail server between one network and another, such as between the network of a company and the Internet. Such devices may be referred to as mail gateway appliances (MGA's) or more generally as mail transfer agents (MTA's) because they act as a gateway between the networks and act as a mail server for sending and receiving email messages. As examples, the IronPort A-Series Appliances and C-Series Appliances produced by IronPort Systems, Inc., of San Bruno, Calif., can be used to implement one or more of the techniques described herein. These appliances are described in more detail below. However, the techniques described herein can be used with any suitable mechanism, not just IronPort's MTA's or any other manufacturer's MTA's.

The IronPort A-Series family includes two mail transport agents, the A30 and A60, which provide high performance email delivery to a large number of recipients, such as for commercial email delivery of transaction confirmations or customer newsletters. The A30 can deliver 600,000 email messages per hour, and the A60 can deliver 1,000,000 messages per hour, both of which are much greater than can be achieved by traditional open-source mail transport agents (MTAs), such as general-purpose servers running sendmail or qmail. Mail transport agents such as the IronPort A-Series family of Messaging Gateway Appliances™ are sometimes referred to as "injectors" because such mail transport agents inject messages into another mail transport agents, such as by sending email through the Internet from a sender that is associated with one mail transport agent to a recipient that is associated with another mail transport agent.

The IronPort C-Series family includes three email security appliances, the C10, C30 and C60, which provide threat protection, block spam and viruses, and enable corporate email policy enforcement. The email security appliances in the C-Series family are deployed between an organization's firewall and groupware servers, such as Exchange™, Notes™, and GroupWise™, to power and protect email flowing in from or out to the Internet.

The different A-Series and C-Series appliances include some or all of the following IronPort technologies: Stackless Threads™, I/O-Driven Scheduling™, AsyncFS™, Reputation Filters™, and SenderBase™.

The IronPort Stackless Threads™ technology allows a C-series email security appliance to handle up to 10,000 simultaneous connections. With Stackless Threads, each thread is allocated memory as needed, in contrast to traditional approaches in which each thread is allocated a fixed and dedicated memory stack that is typically very generous to avoid stack overflow errors. The allocation of memory on an as needed basis with Stackless Threads more efficiently uses memory and increases concurrency while eliminating the risk of security holes and system crashes from stack overflows.

The IronPort I/O-Driven Scheduling™ technology optimally schedules service for each connection. As with Stackless Threads, IronPort's I/O Driven Scheduling allocates system resources as needed. Tasks are scheduled around the availability of transmission control protocol (TCP) connections for reading or writing, so that when a TCP connection becomes available, I/O-Driven Scheduling grants system resources to the associated task until such time as the connection is no longer capable of I/O. This approach avoids the needless rotation through multiple tasks that is characteristic of traditional preemptive multitasking operating systems in which a scheduler cycles through each task to ensure that no task is starved and to allocate a predetermined time slice of the CPU. Such traditional approaches are inefficient for Internet message delivery that is typically not bound by CPU processing, and thus the traditional approaches incur a substantial performance decrease due to excessive context switching. In addition, with I/O-Driven Scheduling, the thread switches happen at the completion of an I/O read or write, so that threads are not left hanging in the middle of an operation and the memory management in each thread is simplified.

The IronPort AsyncFS™ technology provides an asynchronous file system, which is optimized for message queuing. In traditional messaging systems, each message is allocated a separate and unique file that must be written, read, and deleted. Managing these files in traditional approaches becomes prohibitive when receiving hundreds of thousands of messages per hour, and in addition, modifying any file involves multiple disk accesses to update data within a file and multiple disk accesses to update inodes (e.g., maps of pointers to each bloc of data within a file that are stored on disk). With AsyncFS, messages are stored in batches, not individual files, which reduces the number of basic read/write operations. Furthermore, each queue data structure, which governs the order of message delivery, doubles as an inode that maps where messages are stored on disk. These "inode queues" are stored in RAM instead of on disk, further reducing the read/write operations. In the event of a system disruption or failure that removes the inode queues from RAM, AsyncFS reads message data from disk as it rebuilds the inode queues in RAM and resume message delivery.

IronPort's Reputation Filters™ are used to intelligently throttle, or even block, suspicious senders. The appliance receives inbound mail and performs a threat assessment of the sender, resulting in a reputation score generated by SenderBase, as described below. The appliance then applies mail flow policies that are specified by an administrator to the inbound mail based on the reputation score. More suspicious senders are automatically throttled or blocked, and recognized senders (e.g., customers or corporate partners) are granted more generous policies, such as bypassing spam filters, larger message sizes, and TLS encryption. Reputation Filters™ allow for a flexible response, thereby minimizing the effects of denial of service attacks, directory harvest attacks, and fraudulent mail, along with reducing false positives.

IronPort's Reputation Filters™ work with SenderBase™, a sender reputation service created by IronPort, and Bonded Sender™, an email certification program created by IronPort. SenderBase provides objective data about the identity of email senders to allow email administrators to identify and block IP addresses from which unsolicited commercial email originates or to verify the authenticity of legitimate incoming email from business partners, customers, or other important sources. SenderBase includes an open database that has been adopted by more than 13,000 ISPs, corporations, and universities. SenderBase processes queries for more than 600 million messages per day to provide a real-time view into the global volume of mail being sent by any given IP address. SenderBase measures other parameters, such as whether an IP address is an open proxy, if mail receivers are sending spam complaints about the IP address, if its DNS resolves properly and accepts return mail, its country of origin, and its presence on a variety of blacklists. The parameters are used as input to a statistical algorithm that scores the reputation of the sender on a scale of −10 to +10.

The different A-Series and C-Series appliances include one or both of the following nonIronPort technologies: the Sophos™ anti-virus technology and the Brightmail™ anti-spam technology. The C-Series appliances and optionally the A60 appliance include the Sophos™ anti-virus technology. Sophos employs multiple techniques to detect and clean all major forms of viruses, including advanced emulation technology to detect polymorphic viruses and an on-line decompressor for scanning multi-layer attachments. Administrators can take any of several actions to handle messages that are identified as being infection by Sophos. For example, actions include cleaning the message, dropping the attachment, modifying the subject header, deleting the entire infected message, sending an optional notification, or a combination of these actions. The Sophos engine shares information with the IronPort C-Series Mail Flow Monitor to provide real time and historical reports. During a virus outbreak, the period from the start of the outbreak until an anti-virus identify file is deployed can be covered by IronPort's content scanning technology to identify viruses based on known patterns, or messages can be deleted or archived until new identity files are updated.

The C-Series IronPort appliances include the Brightmail™ anti-spam technology, which is optimized to work with IronPort's AsyncOS™. Brightmail uses real-time methods to identify spam through Brightmail's Probe Network™ and generates approximately 30,000 new rules a day. Automatic rule updates are used, with rules automatically downloaded from the Brightmail servers typically every ten minutes to provide real-time protection. Administrators can take any of several actions to handle messages that are flagged as spam by Brightmail. The actions include sending the messages to a per-recipient web quarantine, marking up the subject header, adding an additional "X-header," sending the message to an alternate folder in the user's mailbox, deleting or bouncing the message, or a combination of these actions. The Brightmail system shares information with the IronPort C-Series Mail Flow Monitor to provide real-time and historical reports that are available at any time.

VII. EXTENSIONS AND ALTERNATIVES

In the foregoing description, the invention has been described with reference to specific embodiments thereof. It will, however, be evident that various modifications and changes may be made thereto without departing from the broader spirit and scope of the invention. For example, although examples have illustrated the use of network addresses and IP addresses as a particular type of network address, these types of sender identifiers are used for explanation purposes only and embodiments of the invention are not limited to any particular type of network address or more generally any type of sender identifier. As another example, while the examples are described with reference to email or email messages, the approaches described herein can be applied to any type of electronic message, not just email messages. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method for managing a mail transfer agent (MTA), comprising:

based on a plurality of connections received at said MTA, determining a number of connections that are associated with a first sender identifier;

based on said number of connections being less than or equal to a specified number of connections, accepting an additional connection that is associated with said first sender identifier;

based on said number of connections being greater than said specified number of connections, rejecting said additional connection;

determining message information for a plurality of email messages that are received at said MTA;

based on said message information, determining that a second sender identifier of said plurality of sender identifiers is associated with at least one email message of said plurality of email messages;

based on said at least one email message, determining a number of recipients of email messages that are associated with said second sender identifier and that are being received at said MTA in a first time period; and based on said number of recipients of email messages being greater than a maximum number of recipients of email messages, refusing to accept email messages that are associated with said second sender identifier until said first time period expires; and after expiration of said first time period of time, accepting email messages that are associated with said second sender identifier;

determining that a third sender identifier of said plurality of sender identifiers is associated with a subset of email messages of said plurality of email messages;

based on said subset of email messages, determining a number of invalid recipient email addresses for a second time period;

receiving an additional email message that is associated with said third sender identifier;

determining that said additional email message is addressed to one or more invalid recipient email addresses for said MTA;

based on said number of invalid recipient email addresses being less than or equal to a maximum number of invalid recipient email addresses, generating and sending a message rejection response for said additional email message; and based on said number of invalid recipient email addresses being greater than said maximum number of invalid recipient email addresses, dropping said additional email message without sending said message rejection response; and after expiration of said second time period, accepting one or more additional email messages that are both associated with said third sender identifier and addressed to one or more invalid recipient email addresses for said MTA; and for at least one electronic message from the plurality of email messages, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said first sender identifier, said second sender identifier, and said third sender identifier are each selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections;

wherein the method is performed by one or more computing devices.

2. A method for managing connections for receiving electronic messages at a server, comprising:

receiving at said server a plurality of connections;

identifying a particular sender identifier of a plurality of sender identifiers, wherein said particular sender identifier is associated with at least one connection of said plurality of connections;

receiving a plurality of email messages at the server;

for at least one email message from said plurality of email messages, determining a set of recipient email addresses to which said at least one email message was addressed and determining a set of recipient identifiers that are associated with said set of recipient email addresses; and for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

based on said plurality of connections, determining a number of connections that are associated with said particular sender identifier;

receiving at said server an incoming connection that is associated with said particular sender identifier;

based on said number of connections satisfying a specified relationship with a specified number of connections, accepting said incoming connection; and based on said number of connections not satisfying said specified relationship with said specified number of connections, rejecting said incoming connection;

wherein said number of connections satisfies said specified relationship with said specified number of connections when said number of connections is less than or equal to said specified number of connections;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections;

wherein the method is performed by one or more computing devices.

3. The method as recited in claim 2, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

4. The method as recited in claim 2, wherein: accepting said incoming connection comprises:

creating an additional connection based on said incoming connection; and accepting one or more electronic messages over said additional connection;

rejecting said incoming connection comprises:

creating said additional connection based on said incoming connection;

refusing to accept any electronic messages over said additional connection; and terminating said additional connection.

5. The method as recited in claim 2, wherein rejecting said incoming connection further comprises:
creating an additional connection based on said incoming connection;
based on an electronic message that is received over said additional connection, identifying an additional particular recipient identifier of a plurality of recipient identifiers;
inspecting a mapping to identify an action of a plurality of actions, wherein said mapping associates said plurality of recipient identifiers with said plurality of actions, and wherein said action is associated said additional recipient identifier of said plurality of recipient identifiers;
based on said additional particular recipient identifier matching said additional specified recipient identifier, processing said electronic message even though said number of connections does not satisfy said specified relationship with said specified number of connections; and
based on said additional particular recipient identifier not matching said additional specified recipient identifier, dropping said electronic message and terminating said additional connection;
wherein said number of connections satisfies said specified relationship with said specified number of connections when said number of connections is less than or equal to said specified number of connections.

6. A method for managing a plurality of electronic messages received at a server, comprising:
determining message information for said plurality of electronic messages;
based on said message information, determining a particular sender identifier of a plurality of sender identifiers, wherein said particular sender identifier is associated with at least one electronic message of said plurality of electronic messages;
based on said at least one electronic message, determining a current value that is associated with said particular sender identifier; and
based on said current value satisfying a specified relationship with a specified value, limiting how many electronic messages that are associated with said particular sender identifier are accepted by said server;
for said at least one electronic message, determining a set of recipient email addresses to which said at least one email message was addressed and determining a set of recipient identifiers that are associated with said set of recipient email addresses;
for each recipient identifier in said set of recipient identifiers inspecting a mapping to identify a particular action from a plurality of actions, and based on said mapping, processing said at least one email message according to the particular action;
wherein said mapping associates said plurality of recipient identifiers with said plurality of actions;
wherein said particular sender identifier is selected from the group consisting of a classless inter-domain routing (CIDR) block, and a partial CIDR block;
based on a particular recipient identifier matching a specified recipient identifier, processing said electronic message even though said number of connections does not satisfy said specified relationship with said specified number of connections;
wherein the method is performed by one or more computing devices.

7. The method as recited in claim 6, wherein:
said particular sender identifier is a group sender identifier that is associated with a first sender identifier and a second sender identifier; and
both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

8. The method as recited in claim 6, wherein:
said current value is a number of recipients of electronic messages that are received at said server in a current time period and that are associated with said particular sender identifier;
said specified value is a maximum number of recipients of electronic messages; and
said current value satisfies said specified relationship with said specified value when said number of recipients of electronic messages is less than or equal to said maximum number of recipients of electronic messages;
wherein said current time period is one minute.

9. The method as recited in claim 8, wherein limiting how many electronic messages are accepted from said at least one network address comprises:
refusing to accept electronic messages from said at least one network address until said current time period expires; and
after expiration of said current time period of time, accepting one or more additional electronic messages from said at least one network address.

10. The method as recited in claim 6, wherein:
said current value is a number of electronic messages that are received at said server and that are associated with said particular sender identifier;
said specified value is a maximum number of electronic messages; and
said current value satisfies said specified relationship with said specified value when said number of electronic messages is less than or equal to said maximum number of electronic messages.

11. The method as recited in claim 10, wherein:
said number of electronic messages is determined for a specified period of time; and
limiting how many electronic messages that are associated with said particular sender identifier are accepted comprises:
refusing to accept electronic messages that are associated with said particular sender identifier until said specified period of time has expired; and
after expiration of said specified period of time, accepting electronic messages that are associated with said particular sender identifier.

12. A method for limiting a directory harvest attack against a server, comprising:
accepting a plurality of electronic messages that are associated with a plurality of sender identifiers;
identifying a particular sender identifier of said plurality of sender identifiers, wherein said particular sender identifier is associated with a subset of electronic messages of said plurality of electronic messages;

based on said subset of electronic messages, determining a current value that is based on those electronic messages that are addressed to one or more invalid recipient electronic addresses for said server;

receiving an additional electronic message that is associated with said particular sender identifier;

determining that said additional electronic message is addressed to one or more invalid recipient electronic addresses for said server;

based on said current value satisfying a specified relationship with a specified value, generating and sending a message rejection response to a sender of said additional electronic message; and based on said current value not satisfying said specified relationship with said specified value, dropping at least said additional electronic message without sending said message rejection response to said sender;

for said at least one electronic message, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said current value satisfies said specified relationship with said specified value when said current value is less than or equal to said specified value;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connection;

wherein the method is performed by one or more computing devices.

13. The method as recited in claim 12, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

14. The method as recited in claim 12, wherein:

said current value is a number of invalid recipient electronic addresses that are received at said server in a current time period and that are associated with said particular sender identifier;

said specified value is a maximum number of invalid recipient electronic addresses;

said current value satisfies said specified relationship with said specified value when said number of invalid recipient electronic addresses is less than or equal to said maximum number of invalid recipient electronic addresses; and said current value does not satisfy said specified relationship with said specified value when said number of invalid recipient electronic addresses is greater than said maximum number of invalid recipient electronic addresses;

wherein said current time period is one minute.

15. The method as recited in claim 14, wherein dropping at least said additional electronic message comprises:

dropping said additional electronic message and any other additional electronic messages that are associated with said particular sender identifier until said current time period expires; and after expiration of said current time period, accepting one or more electronic messages that are both associated with said particular sender identifier and that are addressed to one or more invalid recipient electronic addresses for said server.

16. The method as recited in claim 12, wherein:

determining that said additional electronic message is addressed to one or more invalid recipient electronic addresses for said server comprises determining that said additional electronic message is addressed to one or more invalid recipient electronic addresses for said server after completion of a simple mail transfer protocol (SMTP) conversation between said server and said sender of said additional electronic message;

generating said message rejection response for said additional electronic message comprises generating a message rejection electronic message for additional electronic message after completion of said SMTP conversation; and dropping said additional electronic message comprises dropping said additional electronic message after completion of said SMTP conversation.

17. A machine-readable non-transitory volatile or non-volatile storage medium storing one or more sequences of instructions for managing connections for receiving electronic messages at a server, wherein execution of the one or more sequences of instructions by one or more processors causes the one or more processors to perform the steps of:

receiving at said server a plurality of connections;

identifying a particular sender identifier of a plurality of sender identifiers, wherein said particular sender identifier is associated with at least one connection of said plurality of connections;

based on said plurality of connections, determining a number of connections that are associated with said particular sender identifier;

receiving at said server an incoming connection that is associated with said particular sender identifier;

based on said number of connections satisfying a specified relationship with a specified number of connections, accepting said incoming connection; and based on said number of connections not satisfying said specified relationship with said specified number of connections, rejecting said incoming connection;

receiving a plurality of electronic messages;

for at least one electronic message from the plurality of electronic messages, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections.

18. The machine-readable medium as recited in claim 17, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

19. The machine-readable medium as recited in claim 17, wherein:

wherein the instructions for accepting said incoming connection further comprise instructions which, when executed by the one or more processors, cause the one or more processors to perform the steps of:

creating an additional connection based on said incoming connection; and accepting one or more electronic messages over said additional connection;

wherein the instructions for rejecting said incoming connection further comprise instructions which, when executed by the one or more processors, cause the one or more processors to perform the steps of:

creating said additional connection based on said incoming connection;

refusing to accept any electronic messages over said additional connection; and terminating said additional connection.

20. The machine-readable medium as recited in claim 17, wherein the instructions for rejecting said incoming connection further comprise instructions which, when executed by the one or more processors, cause the one or more processors to perform the steps of:

creating an additional connection based on said incoming connection;

based on an electronic message that is received over said additional connection, identifying an additional particular recipient identifier of a plurality of recipient identifiers;

inspecting a mapping to identify an action of a plurality of actions, wherein said mapping associates said plurality of recipient identifiers with said plurality of actions, and wherein said action is associated with said additional specified recipient identifier of said plurality of recipient identifiers;

based on said additional particular recipient identifier matching said additional specified recipient identifier, processing said electronic message even though said number of connections does not satisfy said specified relationship with said specified number of connections; and based on said additional particular recipient identifier not matching said additional specified recipient identifier, dropping said electronic message and terminating said additional connection.

21. A machine-readable non-transitory volatile or non-volatile storage medium storing one or more sequences of instructions for managing a plurality of electronic messages received at a server, wherein execution of the one or more sequences of instructions by one or more processors causes the one or more processors to perform the steps of:

determining message information for said plurality of electronic messages;

based on said message information, determining a particular sender identifier of a plurality of sender identifiers, wherein said particular sender identifier is associated with at least one electronic message of said plurality of electronic messages;

based on said at least one electronic message, determining a current value that is associated with said particular sender identifier; and based on said current value satisfying a specified relationship with a specified value, limiting how many electronic messages that are associated with said particular sender identifier are accepted by said server;

for said at least one electronic message, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said particular sender identifier is selected from the group consisting of a classless inter-domain routing (CIDR) block, and a partial CIDR block;

based on a particular recipient identifier matching said specified recipient identifier, processing said electronic message even though said number of connections does not satisfy said specified relationship with said specified number of connections.

22. The machine-readable medium as recited in claim 21, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

23. The machine-readable medium as recited in claim 21, wherein:

said current value is a number of recipients of electronic messages that are received at said server in a current time period and that are associated with said particular sender identifier;

said specified value is a maximum number of recipients of electronic messages; and said current value satisfies said specified relationship with said specified value when said number of recipients of electronic messages is less than or equal to said maximum number of recipients of electronic messages;

wherein said current time period is one minute.

24. The machine-readable medium as recited in claim 23, wherein the instructions for limiting how many electronic messages are accepted from said at least one network address further comprise instructions which, when executed by the one or more processors, cause the one or more processors to perform the steps of:

refusing to accept electronic messages from said at least one network address until said current time period expires; and after expiration of said current time period of time, accepting one or more additional electronic messages from said at least one network address.

25. The machine-readable medium as recited in claim 21, wherein:

said current value is a number of electronic messages that are received at said server and that are associated with said particular sender identifier;

said specified value is a maximum number of electronic messages; and said current value satisfies said specified relationship with said specified value when said number of electronic messages is less than or equal to said maximum number of electronic messages.

26. The machine-readable medium as recited in claim 25, wherein: said number of electronic messages is determined for a specified period of time; and the instructions for limiting how many electronic messages that are associated with said particular sender identifier are accepted further comprise instructions which, when executed by the one or more processors, cause the one or more processors to perform the steps of: refusing to accept electronic messages that are associated with said particular sender identifier until said specified period of time has expired; and after expiration of said specified period of time, accepting electronic messages that are associated with said particular sender identifier.

27. A machine-readable non-transitory volatile or non-volatile storage medium storing one or more sequences of instructions for limiting a directory harvest attack against a server, wherein execution of the one or more sequences of instructions by one or more processors causes the one or more processors to perform the steps of:

accepting a plurality of electronic messages that are associated with a plurality of sender identifiers;

identifying a particular sender identifier of said plurality of sender identifiers, wherein said particular sender identifier is associated with a subset of electronic messages of said plurality of electronic messages;

based on said subset of electronic messages, determining a current value that is based on those electronic messages that are addressed to one or more invalid recipient electronic addresses for said server;

receiving an additional electronic message that is associated with said particular sender identifier;

determining that said additional electronic message is addressed to one or more invalid recipient electronic addresses for said server;

based on said current value satisfying a specified relationship with a specified value, generating and sending a message rejection response to a sender of said additional electronic message; and based on said current value not satisfying said specified relationship with said specified value, dropping at least said additional electronic message without sending said message rejection response to said sender;

for at least one electronic message, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said current value satisfies said specified relationship with said specified value when said current value is less than or equal to said specified value;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections.

28. The machine-readable medium as recited in claim 27, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

29. The machine-readable medium as recited in claim 27, wherein:

said current value is a number of invalid recipient electronic addresses that are received at said server in a current time period and that are associated with said particular sender identifier;

said specified value is a maximum number of invalid recipient electronic addresses;

said current value satisfies said specified relationship with said specified value when said number of invalid recipient electronic addresses is less than or equal to said maximum number of invalid recipient electronic addresses; and said current value does not satisfy said specified relationship with said specified value when said number of invalid recipient electronic addresses is greater than said maximum number of invalid recipient electronic addresses;

wherein said current time period is one minute.

30. The machine-readable medium as recited in claim 29, wherein the instructions for dropping at least said additional electronic message further comprise instructions which, when executed by the one or more processors, cause the one or more processors to perform the steps of:

dropping said additional electronic message and any other additional electronic messages that are associated with said particular sender identifier until said current time period expires; and after expiration of said current time period, accepting one or more electronic messages that are both associated with said particular sender identifier and that are addressed to one or more invalid recipient electronic addresses for said server.

31. The machine-readable medium as recited in claim 27:

wherein the instructions for determining that said additional electronic message is addressed to one or more invalid recipient electronic addresses for said server further comprise instructions which, when executed by the one or more processors, cause the one or more processors to perform the step of determining that said additional electronic message is addressed to one or more invalid recipient electronic addresses for said server after completion of a simple mail transfer protocol (SMTP) conversation between said server and said sender of said additional electronic message;

wherein the instructions for generating said message rejection response for said additional electronic message further comprise instructions which, when executed by the one or more processors, cause the one or more processors to perform the step of generating said message rejection response for said additional electronic message comprises generating a message rejection electronic message for additional electronic message after completion of said SMTP conversation; and wherein the instructions for dropping said additional electronic message further comprise instructions which, when executed by the one or more processors, cause the one or more processors to perform the step of dropping said additional electronic message comprises dropping said additional electronic message after completion of said SMTP conversation.

32. An apparatus comprising:

a processor; and a memory coupled to the processor, the memory containing one or more sequences of instructions for managing connections for receiving electronic messages at a server, wherein execution of the one or more sequences of instructions by the processor causes the processor to perform the steps of:

receiving at said server a plurality of connections;

identifying a particular sender identifier of a plurality of sender identifiers, wherein said particular sender identifier is associated with at least one connection of said plurality of connections;

based on said plurality of connections, determining a number of connections that are associated with said particular sender identifier;

receiving at said server an incoming connection that is associated with said particular sender identifier;

based on said number of connections satisfying a specified relationship with a specified number of connections, accepting said incoming connection; and based on said number of connections not satisfying said specified relationship with said specified number of connections, rejecting said incoming connection;

receiving a plurality of electronic messages;

for at least one electronic message from the plurality of electronic messages, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections.

33. The apparatus as recited in claim 32, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

34. An The apparatus as recited in claim 32, wherein:

wherein the instructions for accepting said incoming connection further comprise instructions which, when executed by the processor, cause the processor to perform the steps of:

creating an additional connection based on said incoming connection; and accepting one or more electronic messages over said additional connection;

wherein the instructions for rejecting said incoming connection further comprise instructions which, when executed by the processor, cause the processor to perform the steps of:

creating said additional connection based on said incoming connection;

refusing to accept any electronic messages over said additional connection; and terminating said additional connection.

35. The apparatus as recited in claim 32, wherein the instructions for rejecting said incoming connection further comprise instructions which, when executed by the processor, cause the processor to perform the steps of:

creating an additional connection based on said incoming connection;

based on an electronic message that is received over said additional connection, identifying an additional particular recipient identifier of a plurality of recipient identifiers;

inspecting a mapping to identify an action of a plurality of actions, wherein said mapping associates said plurality of recipient identifiers with said plurality of actions, and wherein said action is associated with an additional specified recipient identifier of said plurality of recipient identifiers;

based on said additional particular recipient identifier matching said additional specified recipient identifier, processing said electronic message even though said number of connections does not satisfy said specified relationship with said specified number of connections; and based on said additional particular recipient identifier not matching said additional specified recipient identifier, dropping said electronic message and terminating said additional connection.

36. An apparatus comprising:

a processor; and a memory coupled to the processor, the memory containing one or more sequences of instructions for managing a plurality of electronic messages received at a server, wherein execution of the one or more sequences of instructions by the processor causes the processor to perform the steps of:

determining message information for said plurality of electronic messages;

based on said message information, determining a particular sender identifier of a plurality of sender identifiers, wherein said particular sender identifier is associated with at least one electronic message of said plurality of electronic messages;

based on said at least one electronic message, determining a current value that is associated with said particular sender identifier; and based on said current value satisfying a specified relationship with a specified value, limiting how many electronic messages that are associated with said particular sender identifier are accepted by said server;

for said at least one electronic message from the plurality of email messages, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections.

37. The apparatus as recited in claim 36, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

38. The apparatus as recited in claim 36, wherein:

said current value is a number of recipients of electronic messages that are received at said server in a current time period and that are associated with said particular sender identifier;

said specified value is a maximum number of recipients of electronic messages; and said current value satisfies said specified relationship with said specified value when said number of recipients of electronic messages is less than or equal to said maximum number of recipients of electronic messages;

wherein said current time period is one minute.

39. The apparatus as recited in claim 38, wherein the instructions for limiting how many electronic messages are accepted from said at least one network address further comprise instructions which, when executed by the processor, cause the processor to perform the steps of:

refusing to accept electronic messages from said at least one network address until said current time period expires; and after expiration of said current time period of time, accepting one or more additional electronic messages from said at least one network address.

40. The apparatus as recited in claim 36, wherein:

said current value is a number of electronic messages that are received at said server and that are associated with said particular sender identifier;

said specified value is a maximum number of electronic messages; and said current value satisfies said specified relationship with said specified value when said number of electronic messages is less than or equal to said maximum number of electronic messages.

41. The apparatus as recited in claim 40, wherein:

said number of electronic messages is determined for a specified period of time; and the instructions for limiting how many electronic messages that are associated with said particular sender identifier are accepted further comprise instructions which, when executed by the processor, cause the processor to perform the steps of:

refusing to accept electronic messages that are associated with said particular sender identifier until said specified period of time has expired; and after expiration of said specified period of time, accepting electronic messages that are associated with said particular sender identifier.

42. An apparatus comprising:

a processor; and a memory coupled to the processor, the memory containing one or more sequences of instructions for limiting a directory harvest attack against a server, wherein execution of the one or more sequences of instructions by the processor causes the processor to perform the steps of:

accepting a plurality of electronic messages that are associated with a plurality of sender identifiers;

identifying a particular sender identifier of said plurality of sender identifiers, wherein said particular sender identifier is associated with a subset of electronic messages of said plurality of electronic messages;

based on said subset of electronic messages, determining a current value that is based on those electronic messages that are addressed to one or more invalid recipient electronic addresses for said server;

receiving an additional electronic message that is associated with said particular sender identifier;

determining that said additional electronic message is addressed to one or more invalid recipient electronic addresses for said server;

based on said current value satisfying a specified relationship with a specified value, generating and sending a message rejection response to a sender of said additional electronic message; and based on said current value not satisfying said specified relationship with said specified value, dropping at least said additional electronic message without sending said message rejection response to said sender;

for at least one electronic message from the plurality of email messages, determining a set of recipient email addresses to which said at least one email message was addressed and determining a set of recipient identifiers that are associated with said set of recipient email addresses;

for each recipient identifier in said set of recipient identifiers inspecting a mapping to identify a particular action from a plurality of actions, and based on said mapping, processing said at least one email message according to the particular action;

wherein said mapping associates said plurality of recipient identifiers with said plurality of actions;

wherein said current value satisfies said specified relationship with said specified value when said current value is less than or equal to said specified value;

wherein said particular sender identifier is selected from the group consisting of a classless inter-domain routing (CIDR) block, and a partial CIDR block;

based on a particular recipient identifier matching a specified recipient identifier, processing said electronic message even though said number of connections does not satisfy said specified relationship with said specified number of connections.

43. The apparatus as recited in claim 42, wherein:

said particular sender identifier is a group sender identifier that is associated with a first sender identifier and a second sender identifier; and both said first sender identifier and said second sender identifier are selected from the group consisting of a network address, an Internet Protocol (IP) address, a partial IP address, a first range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a second range of reputation scores.

44. The apparatus as recited in claim 42, wherein:

said current value is a number of invalid recipient electronic addresses that are received at said server in a current time period and that are associated with said particular sender identifier;

said specified value is a maximum number of invalid recipient electronic addresses;

said current value satisfies said specified relationship with said specified value when said number of invalid recipient electronic addresses is less than or equal to said maximum number of invalid recipient electronic addresses; and said current value does not satisfy said specified relationship with said specified value when said number of invalid recipient electronic addresses is greater than said maximum number of invalid recipient electronic addresses;

wherein said current time period is one minute.

45. The apparatus as recited in claim 44, wherein the instructions for dropping at least said additional electronic message further comprise instructions which, when executed by the processor, cause the processor to perform the steps of:

dropping said additional electronic message and any other additional electronic messages that are associated with said particular sender identifier until said current time period expires; and after expiration of said current time period, accepting one or more electronic messages that are both associated with said particular sender identifier and that are addressed to one or more invalid recipient electronic addresses for said server.

46. The apparatus as recited in claim 42, wherein:

wherein the instructions for determining that said additional electronic message is addressed to one or more invalid recipient electronic addresses for said server further comprise instructions which, when executed by the processor, cause the processor to perform the step of determining that said additional electronic message is addressed to one or more invalid recipient electronic addresses for said server after completion of a simple mail transfer protocol (SMTP) conversation between said server and said sender of said additional electronic message;

wherein the instructions for generating said message rejection response for said additional electronic message further comprise instructions which, when executed by the processor, cause the processor to perform the step of generating said message rejection response for said additional electronic message comprises generating a message rejection electronic message for additional electronic message after completion of said SMTP conversation; and wherein the instructions for dropping said additional electronic message further comprise instructions which, when executed by the processor, cause the processor to perform the step of dropping said additional electronic message comprises dropping said additional electronic message after completion of said SMTP conversation.

\* \* \* \* \*

UNITED STATES PATENT AND TRADEMARK OFFICE
CERTIFICATE OF CORRECTION

PATENT NO. : 7,849,142 B2
APPLICATION NO. : 11/139114
DATED : December 7, 2010
INVENTOR(S) : Paul J. Clegg et al.

It is certified that error appears in the above-identified patent and that said Letters Patent is hereby corrected as shown below:

In item (56) References Cited, under Other Publications, delete duplicate entries as follows:
On page 3, first column, under Other Publications:
First Entry, Delete "Y. Rckhter & T. Li. eds, An Architecture for IP Address Allocation with CIDR, RFC 1518, Sep. 1993*" (Duplicate entry)
Fourth Entry, Delete "R. Hinden, ed., Applicability statement for the Implementation of Classless Inter-Domain Ruting (CIDR), RFC 1517, Sep. 1993*" (Duplicate entry)
Fifth Entry, Delete "Y. Rekhter & T. Li. eds, An Architecture for IP Address Allocation with CIDR, RFC 1518, Sep. 1993*" (Duplicate entry)
On page 3, second column, under Other Publications:
Sixth Entry, Delete "Wong, J. 1998, Preventing Spams and Relays, Linux J. 1998, 56es (Dec. 1998), 10." (Duplicate entry)
Ninth Entry, Delete "R. Hinden, ed., Applicability statement for the Implementation of Classless Inter-Domain Ruting (CIDR), RFC 1517, Sep. 1993*" (Duplicate entry)
On page 4, second column, under Other Publications:
Last Entry, Delete "Wong, J. 1998, Preventing Spams and Relays, Linux J. 1998, 56es (Dec. 1998), 10." (Duplicate entry)

Signed and Sealed this
Twenty-ninth Day of March, 2011

David J. Kappos
*Director of the United States Patent and Trademark Office*

CERTIFICATE OF CORRECTION (continued)
U.S. Pat. No. 7,849,142 B2

In item (56) References Cited, under Other Publications, please insert the following:
Insert -- INTERNATIONAL BUREAU, "International Bureau Preliminary Report on Patentability," PCT/US2005/018999, dated 28 February 2007, 5 pages. --

Insert -- Current claims, PCT/US2005/018999 (60063-0056), 14 pages. --

Insert -- AVERY,MIKE, "Networking: Product Reviews: MimeSweeper neatly cleans up e-mail Web Content." Info World June 23, 1997, reproduced by High Bean Research LLC., 3 pages. (Reference on CD-ROM) --

Insert --Cashramspam.com, "CashRamSpam.com," file://C:\DOCUME~1\LOCALS~1\temp\2OJL2VHQ.htm, printed 2/19/2003, 9 pages. (Reference on CD-ROM) --

Insert -- "Check Point Firewalls," [Online], retrieved from the internet URL: <http://www.trellisnet.com/Security/Checkpoint/firewalls.asp>, Trellis Network Services, Retrieved on 2004-5-18, pp. 1-3. (Reference on CD-ROM) --

Insert -- "Check Point Signs Technology licensing Agreement with RSA Data Security," Check Point Software Technologies LTD., September 18, 1995, 2 pages. (Reference on CD-ROM) --

Insert -- "Check Point Software technologies to Secure Backweb's Internet Broadcasting Software," Check Point Software Technologies LTD., reproduction of article from Internet World dated December 11, 1996, 2 pages. (Reference on CD-ROM) --

Insert -- "Control Data Systems Partners With Check Point Software To Resell FireWall-1," Check Point Software Technologies LTD., February 21, 1996, 2 pages. (Reference on CD-ROM) --

Insert -- Google Groups, "PMDF and VSWEEP Virus Scanner," Message 1 thread from Eileen Byrne Telecom 617-386-2181, dated November 13, 1995, 2 pages. (Reference on CD-ROM) --

Insert -- Google Groups, "Virus Scanning", Message 1 Thread from John F. Reddington dated July 25, 1995, 5 pages. (Reference on CD-ROM) --

Insert -- Google Groups, "Virus Scanning", Sara.Appleyard, September 8, 1996, 5 pages. (Reference on CD-ROM) --

Insert -- "Integralis Announces MIMEsweeper Compatible with Check Point FireWall-1 on Single NT Server," Checkpoint Software Technologies LTD., September 16, 1996, 2 pages. (Reference on CD-ROM) --

Insert -- LEMOS, ROBERT, "Paying Up for a Spam Seal of Approval," June 24, 2002, http://news.com.com/2100-1001-938976.html, printed 2/19/2003, pp. 1-3. (Reference on CD-ROM) --

CERTIFICATE OF CORRECTION (continued)
U.S. Pat. No. 7,849,142 B2

[Continued] In item (56) References Cited, under Other Publications, please insert the following:

Insert -- MASON, JUSTIN, "SpamAssasin Prehistory: filter.plx," [Online], [retrieved on 2005-06-20]. Retrieved from the internet:http://spamassasin.apache.org/prehistory/. (Reference on CD-ROM) --

Insert -- MCCULLAGH, DECLAN, "Spam Blocker charges for e-mail," CNET Newsc.com, February 19, 2003, Retrieved from <http://www.dotcomeon.com/payformail.htm>, printed 6/30/2005, 2 pages. (Reference on CD-ROM) --

Insert -- MIMEsweeper 2.3 Press Release, "Integralis announces version 2.3 of MIMEsweeper with new email security features," reproduced from Email World, June 13, 1996, 2 pages. (Reference on CD-ROM) --

Insert -- "New Product 'E-Mail Virus Wall' protects companies from e-mail-borne viruses, including new macro viruses," Business Wire, p 02160157, February 16, 1996, 3 pages. (Reference on CD-ROM) --

Insert -- NICHOLAS, NICK, "Realtime Blackhole List, Spamware Defined," downloaded on 5/27/04 from <http://mail-abuse.org/rbl/spamware.htm, 2 pages. (Reference on CD-ROM) --

Insert -- OMNIVA, "Omniva Policy Manager," Technical White Paper, Ominiva Policy Systems, January 2004, pp. 1-23. (Reference on CD-ROM) --

Insert -- POSTINI INC., "Postini Perimeter Manager: The Industry's Leading Email Security and Management Solution." Postini Inc., 2004, 4 pages. (Reference on CD-ROM) --

Insert -- "Prevention of Forged-Spam email via Sendmail (Relay Disable)" <http://docsrv.sco.com/MM_admin/mmadminC.spam_forge.html>, November 1999. (Reference on CD-ROM) --

Insert -- "Product Overview- IronMail: The Secure Email Gateway Appliance," CipherTrust, 2 pages. (Reference on CD-ROM) --

Insert -- PROLIN, P. et al., "Network Security Probe", Telecom Bretagne, November 1994, pp. 229-240. (Reference on CD-ROM) --

Insert -- "Raptor Systems and Trend Micro to Develop Integrated Firewall/Virus Wall; Security Partnership to Protect Against Unauthorized Access and Viruses," Business Wire, p 05030072, May 3, 1996, 2 pages. (Reference on CD-ROM) --

Insert -- RHYOLITE SOFTWARE, "Distributed Checksum Clearinghouse," [Online] [Retrieved on 2005-06-20], retrieved from the internet: http://www.rhyolite.com/anti-spam/dcc, pp. 1-5, (Reference on CD-ROM) --

CERTIFICATE OF CORRECTION (continued)
U.S. Pat. No. 7,849,142 B2

[Continued] In item (56) References Cited, under Other Publications, please insert the following:

Insert -- SULLIVAN, ANDY "Buffalo Spammer' Sentenced to 3-1/2 to 7 years", U.S. National-Reuters downloaded on 05/27/2004 from <http://news.yahoo.com/news?tmpl=story&u=/nm/20040527/us_nm/tech_spam_dc>, 2 pages_ (Reference on CD-ROM) --

Insert -- "Surf Control E-mail Filter," http://www.surfcontrol.com/uploadedfiles/SEF_datasheet.pdf, SurfControl plc., 4 pages. (Reference on CD-ROM) --

Insert -- "Symantic Ships Norton Antivirus for Internet Email Gateways," PR Newswire, p 0224SFM068, February 24, 1997, 4 pages. (Reference on CD-ROM) --

Insert -- "The Elm Filter System Guide," CETS Answers, Computing and Educational Technology Services, University of Pennsylvania, June 24, 2003, 8 pages. (Reference on CD-ROM) --

Insert -- "The Elm Filter System Guide, What the Filter Program is, and How to Use It," San Diego State University ROHAN Academic Computing, May 29, 1996, pp 1-8, available online at http://www-rohan.sdsu.edu/filter.html --

Insert -- THORUD, G., "Message Handling Systems," Telektronikk, Vol. 90, No. 2, 1994, pp. 86-88. (Reference on CD-ROM) --

Insert -- TREND MICRO, "Policy-based Antivirus and Content Security for the Messaging Gateway," White Paper, Trend Micro InterScan Messaging Security Suite, June 2002, pp. 1-20. (Reference on CD-ROM) --

Insert -- TRUMBO, JAN et al., "FEATURES: Big, Bad E-mail," Network Computing, October 8, 1996, 4 pages, available at <http://www.nwc.com/716/716f2.html> --

Insert -- 1997 Press Release, "Trend Micro Sues Integralis for Gateway Anti-VirusPatent Infringement, Seeks to End Sales of E-mail, Internet Gateway Product," Trend Micro, July 8, 1997, 2 pages. (Reference on CD-ROM) --